US012424196B2

(12) United States Patent
Yuan et al.

(10) Patent No.: US 12,424,196 B2
(45) Date of Patent: Sep. 23, 2025

(54) SIGNAL PROCESSING APPARATUS, METHOD, AND SYSTEM

(71) Applicant: HUAWEI TECHNOLOGIES CO., LTD., Guangdong (CN)

(72) Inventors: Tingqiu Yuan, Shenzhen (CN); Libin Zhang, Beijing (CN); Huimin Zhang, Shenzhen (CN); Chang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/852,980

(22) Filed: Jun. 29, 2022

(65) Prior Publication Data

US 2022/0335923 A1 Oct. 20, 2022

Related U.S. Application Data

(63) Continuation of application No. PCT/CN2019/130893, filed on Dec. 31, 2019.

(51) Int. Cl.
*G10K 11/178* (2006.01)

(52) U.S. Cl.
CPC .. *G10K 11/17823* (2018.01); *G10K 11/17881* (2018.01); *G10K 11/17825* (2018.01); (Continued)

(58) Field of Classification Search
CPC ....... G10K 11/17823; G10K 11/17881; G10K 2210/1081
See application file for complete search history.

(56) References Cited

U.S. PATENT DOCUMENTS 5,432,858 A * 7/1995 Clair, Jr. ................ H04R 27/02 381/79
5,834,647 A 11/1998 Gaudriot et al.
(Continued)

FOREIGN PATENT DOCUMENTS

| | | | |
|---|---|---|---|
| CN | 106448645 | A | 2/2017 |
| CN | 106575499 | A | 4/2017 |
| JP | 106102885 | A | 4/1994 |

OTHER PUBLICATIONS

Wang lin, Research on Key Technologies in Multichannel Speech Signal Processing, 2010, 2 pages (abstract).
(Continued)

*Primary Examiner* — Ping Lee

(57) ABSTRACT

A signal processing apparatus is configured to preprocess a sound wave signal and output a processed audio signal through an electromagnetic wave. The signal processing apparatus includes: a receiving unit, configured to receive at least one sound wave signal; a conversion unit, configured to convert the at least one sound wave signal to at least one audio signal; a positioning unit, configured to determine position information related to the at least one sound wave signal; a processing unit, configured to determine a sending time point of at least one audio signal based on the position information and a first time point, where the first time point is a time point at which the receiving unit receives the at least one sound wave signal; and a sending unit, configured to send the at least one audio signal through the electromagnetic wave.

16 Claims, 10 Drawing Sheets

(52) U.S. Cl.
CPC ................ *G10K 2210/1081* (2013.01); *G10K 2210/3026* (2013.01); *G10K 2210/3027* (2013.01); *G10K 2210/3044* (2013.01); *G10K 2210/3055* (2013.01)

(56) References Cited

U.S. PATENT DOCUMENTS

| | | | | |
|---|---|---|---|---|
| 2010/0223552 | A1* | 9/2010 | Metcalf | H04S 3/008 715/716 |
| 2015/0296294 | A1 | 10/2015 | Paquier et al. | |
| 2016/0192090 | A1 | 6/2016 | Gran et al. | |
| 2020/0312295 | A1* | 10/2020 | Bodon | H04R 1/1083 |

OTHER PUBLICATIONS

Zhang zheng, Research on Acoustic Signal Directional Picking Based on Microphone Array, Issue 02, 2019, 2 pages (abstract).
Liu chao , Study of Sound Source Localization Algorithm Based on Microphone Array, 2015, 2 pages (abstract).
DeepTech, Sense noise at the speed of light! This out-of-ear device outperforms all noise-cancelling headphones currently on the market ,https://www.sohu.com/a/255668057_354973, Sep. 23, 2018, 10 pages.
Ling nizhan, Active Noise Control (ANC) theory and Matlab code implementation, https://www.cnblogs.com/LXP-Never/archive/2019/10/18/11693567.html, Oct. 18, 2019,9 pages.
Wjzblog, ANC noise reduction learning, https://blog.csdn.net/weixin_42183571/article/details/80615660, Jun. 7, 2018, 3 pages.

* cited by examiner

SIGNAL PROCESSING APPARATUS, METHOD, AND SYSTEM

CROSS-REFERENCE TO RELATED APPLICATIONS

This application is a continuation of International Application No. PCT/CN2019/130893, filed on Dec. 31, 2019, the disclosure of which is hereby incorporated by reference in its entirety.

TECHNICAL FIELD

This disclosure relates to the field of signal processing, and in particular, to a signal processing apparatus, method, and system.

BACKGROUND

According to a sound wave cancellation principle, an active noise reduction headset superimposes a noise reduction signal with a noise, to cancel out the noise, where the noise reduction signal has a same frequency and amplitude as the noise, but a phase of the noise reduction signal differs from a phase of the noise by 180°. Active noise reduction headsets sold in the market rely on microphones on the headsets to detect incoming noises, and then a digital signal processor (DSP) calculates phase-inverted sound waves to cancel out the incoming noises. However, because the microphone is excessively close to ears, headsets in the market have only dozens of microseconds to sample, process, and play signals. Such a short period of time greatly limits performance of an active noise reduction headset, and reduces an upper limit of an active noise reduction frequency of the headset.

A microphone that is usually embedded in a headset is removed and becomes an external microphone, so that the headset has more time to process a signal. The external microphone may obtain noise information in advance, and transmit the obtained noise information to the headset via Wi-Fi. Because a speed of a wireless signal is greatly faster than a speed of sound, the headset has more time to process the signal and calculate a noise reduction signal.

However, because noise information received by the headset via Wi-Fi is inconsistent with noise information actually received by the headset, a noise reduction signal calculated by the headset based on the noise information received via Wi-Fi cannot well cancel out a noise actually received by the headset. In this solution, only that the headset has more time to process a signal is considered, but a noise reduction effect cannot be ensured.

SUMMARY

Embodiments of this disclosure provide a signal processing apparatus, method, and system, to enhance a noise reduction effect.

To achieve the foregoing objective, embodiments of this disclosure provide the following technical solutions.

A first aspect of this disclosure provides a signal processing method. The method may include: A signal processing apparatus receives a first sound wave signal. The signal processing apparatus may receive the first sound wave signal by using a microphone or a microphone array. The signal processing apparatus processes the first sound wave signal based on first information to obtain a first audio signal. The first information may include position information of an electronic device relative to the signal processing apparatus. For example, the first information may be a distance between the signal processing apparatus and the electronic device, or the first information may be spatial coordinates of the electronic device and the signal processing apparatus in a same spatial coordinate system. The signal processing apparatus sends the first audio signal to the electronic device through an electromagnetic wave. The first audio signal is used by the electronic device to determine a noise reduction signal, the noise reduction signal is for performing noise reduction processing on a second sound wave signal received by the electronic device, and the second sound wave signal and the first sound wave signal are in a same sound field. Scenarios to which the technical solutions provided in this disclosure are applicable include but are not limited to an office scenario and a home scenario. For example, in an office scenario, a user wears a noise reduction headset in an office, and a signal processing apparatus is installed at a door of the office or on a window of the office. The signal processing apparatus may be a sensor or the like. In a home scenario, the signal processing apparatus may be any signal processing apparatus supporting wireless transmission at home. For example, the signal processing apparatus may be a television, a home gateway, a smart desk lamp, or a smart doorbell. It can be learned from the first aspect that the electronic device may obtain noise information in advance based on the first audio signal. In addition, because the signal processing apparatus processes the first audio signal based on the distance between the signal processing apparatus and the electronic device, a noise reduction signal determined by the electronic device based on the first audio signal can be superimposed with and cancel out a signal that is sent by a noise source and received by the electronic device. This enhances a noise reduction effect.

Optionally, with reference to the first aspect, in a first example implementation, the method may further include: The signal processing apparatus performs phase inversion processing on the first sound wave signal.

Optionally, with reference to the first aspect or the first example implementation of the first aspect, in a second example implementation, that the signal processing apparatus processes the first sound wave signal based on first information to obtain a first audio signal may include: The signal processing apparatus performs transfer adjustment on the first sound wave signal based on the first information. It can be learned from the first example implementation of the first aspect that the signal processing apparatus may perform transfer adjustment on the first sound wave signal based on the first information. This provides a specific manner of adjusting the first sound wave based on the first information.

Optionally, with reference to the first example implementation of the first aspect, in a third example implementation, the method may further include: The signal processing apparatus determines a first time point. The first time point is a time point at which the signal processing apparatus receives the first sound wave signal. The signal processing apparatus sends the first time point and the first information to the electronic device. The first time point and the first information are used by the electronic device to determine, based on a speed of sound, to play the noise reduction signal. It can be learned from the second example implementation of the first aspect that the signal processing apparatus sends the first time point and the first information to the electronic device, so that the electronic device can determine the noise reduction signal based on the first time point and the first information. This improves solution diversity.

Optionally, with reference to the first aspect, in a fourth example implementation, the method may further include: The signal processing apparatus determines a first time point. The first time point is a time point at which the signal processing apparatus receives the first sound wave signal. That the signal processing apparatus processes the first sound wave signal based on first information to obtain a first audio signal may include: The signal processing apparatus performs transfer adjustment on the first sound wave signal based on the first information. The signal processing apparatus determines, based on a difference between first duration and second duration, a time point for sending the first audio signal. The first duration is determined by the signal processing apparatus based on the first information and a speed of sound, the second duration is a difference between a second time point and a first time point, and the second time point is a time point that is determined by the signal processing apparatus and at which the electronic device receives the first audio signal.

Optionally, with reference to the fourth example implementation of the first aspect, in a fifth example implementation, that the signal processing apparatus sends the first audio signal to the electronic device through an electromagnetic wave may include: When the first duration is greater than the second duration, the signal processing apparatus sends the first audio signal to the electronic device through the electromagnetic wave.

Optionally, with reference to the first aspect or the first example implementation of the first aspect, in a sixth example implementation, that the signal processing apparatus processes the first sound wave signal based on first information to obtain a first audio signal may include: The signal processing apparatus performs transfer processing on the first sound wave signal based on the first information and second information. The second information is position information of the noise source relative to the signal processing apparatus.

Optionally, with reference to the sixth example implementation of the first aspect, in a seventh example implementation, the method may further include: The signal processing apparatus determines a first time point. The first time point is a time point at which the signal processing apparatus receives the first sound wave signal. The signal processing apparatus sends the first time point, the first information, and the second information to the electronic device. The first time point, the first information, and the second information are used by the electronic device to determine, based on a speed of sound, to play the noise reduction signal.

Optionally, with reference to the first aspect or the first example implementation of the first aspect, in an eighth example implementation, the method may further include: The signal processing apparatus determines a first time point. The first time point is a time point at which the signal processing apparatus receives the first sound wave signal. That the signal processing apparatus processes the first sound wave signal based on first information to obtain a first audio signal may include: The signal processing apparatus determines a first distance and a second distance based on the first information and second information. The first distance is a distance between the noise source and the electronic device, the second distance is a distance between the noise source and the signal processing apparatus, and the second information is position information of the noise source relative to the signal processing apparatus. The signal processing apparatus performs transfer adjustment on the first sound wave signal based on a difference between the first distance and the second distance. The signal processing apparatus processes the first audio signal based on a difference between third duration and second duration, to determine a time point for sending the first audio signal. The third duration is a ratio of the difference between the first distance and the second distance to a speed of sound, the second duration is a difference between a second time point and a first time point, and the second time point is a time point that is determined by the signal processing apparatus and at which the electronic device receives the first audio signal.

Optionally, with reference to the eighth example implementation of the first aspect, in a ninth example implementation, that the signal processing apparatus sends the first audio signal to the electronic device through an electromagnetic wave may include: When the third duration is greater than the second duration, the signal processing apparatus sends the first audio signal to the electronic device through the electromagnetic wave.

Optionally, with reference to any one of the first example implementation of the first aspect to the fifth example implementation of the first aspect, in a tenth example implementation, the method may further include: The signal processing apparatus determines a first time point. The first time point is a time point at which the signal processing apparatus receives the first sound wave signal. The signal processing apparatus sends the first time point to the electronic device. The first time point is used by the electronic device to determine to play the noise reduction signal.

Optionally, with reference to the first aspect or the first example implementation of the first aspect to the tenth example implementation of the first aspect, in an eleventh example implementation, the method may further include: The signal processing apparatus obtains a first topological relationship between the signal processing apparatus and the electronic device. The signal processing apparatus determines the first information based on the first topological relationship. The first information is the distance between the electronic device and the signal processing apparatus, or the first information is the coordinates of the electronic device and the signal processing apparatus in the same coordinate system.

Optionally, with reference to the first aspect or the first example implementation of the first aspect to the tenth example implementation of the first aspect, in a twelfth example implementation, the signal processing apparatus prestores the first information. The first information is the distance between the electronic device and the signal processing apparatus.

Optionally, with reference to the sixth example implementation of the first aspect and the seventh example implementation of the first aspect, in a thirteenth example implementation, the method may further include: The signal processing apparatus obtains a second topological relationship among the signal processing apparatus, the noise source, and the electronic device. The signal processing apparatus determines the second information based on the second topological relationship.

Optionally, with reference to the sixth example implementation of the first aspect and the seventh example implementation of the first aspect, in a fourteenth example implementation, the signal processing apparatus prestores the second information.

Optionally, with reference to the first aspect or the first example implementation of the first aspect to the fourteenth example implementation of the first aspect, in a fifteenth example implementation, the method may further include: The signal processing apparatus recognizes the first sound wave signal, and determines that the first sound wave signal comes from N noise sources, where N is a positive integer greater than 1. The signal processing apparatus divides the first sound wave signal into N signals based on the N noise sources. That the signal processing apparatus processes the first sound wave signal based on first information to obtain a first audio signal may include: The signal processing apparatus processes the first sound wave signal based on the first information to obtain N first audio signals.

Optionally, with reference to the first aspect or the first example implementation of the first aspect to the fifteenth example implementation of the first aspect, in a sixteenth example implementation, the method may further include: The signal processing apparatus receives a third sound wave signal. The signal processing apparatus extracts a signal of a non-voice part from the third sound wave signal. The signal processing apparatus determines a noise spectrum of the third sound wave signal based on the signal of the non-voice part. The signal processing apparatus sends the noise spectrum to the electronic device through an electromagnetic wave, so that the electronic device determines a voice enhancement signal of a fourth sound wave signal based on the noise spectrum and the fourth sound wave signal. The fourth sound wave signal and the third sound wave signal are in a same sound field.

A second aspect of this disclosure provides an audio signal processing method. The method may include: A first electronic device receives a first audio signal through an electromagnetic wave. The first audio signal is a signal obtained by processing a first sound wave signal based on first information by a signal processing apparatus, and the first information may include position information of an electronic device relative to the signal processing apparatus. The first electronic device receives a second sound wave signal. The second sound wave signal and the first sound wave signal are in a same sound field. The first electronic device processes the first audio signal, to determine a noise reduction signal. The noise reduction signal is for performing noise reduction processing on the second sound wave signal.

Optionally, with reference to the second aspect, in a first example implementation, the method may further include: The first electronic device receives a first time point through an electromagnetic wave. The first time point is a time point at which the signal processing apparatus receives the first sound wave signal. That the first electronic device processes the first audio signal, to determine a noise reduction signal may include: The first electronic device processes the first audio signal based on the first time point, to determine to play the noise reduction signal.

Optionally, with reference to the first example implementation of the second aspect, in a second example implementation, that the first electronic device processes the first audio signal based on the first time point, to determine to play the noise reduction signal may include: The first electronic device processes the first audio signal based on a difference between first duration and second duration, to determine to play the noise reduction signal. The first duration is determined by the first electronic device based on a ratio of a third distance to the speed of sound, the second duration is a difference between a second time point and the first time point, the second time point is a time point at which the first electronic device receives the first audio signal, and the third distance is a distance between the first electronic device and the signal processing apparatus.

Optionally, with reference to the second example implementation of the second aspect, in a third example implementation, that the first electronic device processes the first audio signal based on a difference between first duration and second duration, to determine to play the noise reduction signal may include: When the first duration is greater than the second duration, the first electronic device processes the first audio signal based on the difference between the first duration and the second duration, to determine to play the noise reduction signal.

Optionally, with reference to the first example implementation of the second aspect, in a fourth example implementation, that the first electronic device processes the first audio signal based on the first time point, to determine to play the noise reduction signal may include: The first electronic device processes the first audio signal based on a difference between third duration and second duration, to determine to play the noise reduction signal. The third duration is a ratio of a difference between a first distance and a second distance to the speed of sound, the second duration is a difference between a second time point and the first time point, the second time point is a time point at which the first electronic device receives the first audio signal, the first distance is a distance between a noise source and the first electronic device, and the second distance is a distance between the noise source and the signal processing apparatus.

Optionally, with reference to the fourth example implementation of the second aspect, in a fifth example implementation, that the first electronic device processes the first audio signal based on a difference between third duration and second duration, to determine to play the noise reduction signal may include: When the third duration is greater than the second duration, the first electronic device processes the first audio signal based on the difference between the third duration and the second duration, to determine to play the noise reduction signal.

Optionally, with reference to the second example implementation of the second aspect or the third example implementation of the second aspect, in a sixth example implementation, the method may further include: The first electronic device receives the first information sent by the signal processing apparatus. The first electronic device determines the third distance based on the first information.

Optionally, with reference to the fourth example implementation of the second aspect or the fifth example implementation of the second aspect, in a seventh example implementation, the method may further include: The first electronic device receives the first information and second information that are sent by the signal processing apparatus. The second information may include position information of the noise source relative to the signal processing apparatus. The first electronic device determines the first distance and the second distance based on the first information and the second information.

Optionally, with reference to the seventh example implementation of the second aspect, in an eighth example implementation, there may be N first audio signals, where N is a positive integer greater than 1. That the first electronic device processes the first audio signal, to determine a noise reduction signal may include: The first electronic device calculates an arithmetic average value of M signals for a same noise source, where M is a positive integer not greater than N.

Optionally, with reference to the second aspect or the first example implementation of the second aspect to the seventh example implementation of the second aspect, in a ninth example implementation, that the first electronic device processes the first audio signal, to determine a noise reduction signal may include: The first electronic device performs cross-correlation processing on the first audio signal and the second sound wave signal to determine the noise reduction signal.

Optionally, with reference to the second aspect or the first example implementation of the second aspect to the seventh example implementation of the second aspect, in a tenth example implementation, that the first electronic device processes the first audio signal, to determine a noise reduction signal may include: The first electronic device determines the noise reduction signal based on a least mean square error algorithm, the first audio signal, the noise reduction signal, and the second sound wave signal.

Optionally, with reference to the second aspect or the first example implementation of the second aspect to the seventh example implementation of the second aspect, in an eleventh example implementation, the method may further include: The first electronic device determines spatial coordinates of the noise source relative to the first electronic device that are present when the first electronic device is the origin of the coordinates. The first electronic device determines a first head-related impulse response HRIR based on the spatial coordinates of the noise source. The first electronic device prestores a correspondence between the HRIR and the spatial coordinates of the noise source. The first electronic device deconvolves the noise reduction signal based on the first HRIR, to obtain a phase-inverted signal of the noise reduction signal. The first electronic device sends the phase-inverted signal of the noise reduction signal and the spatial coordinates of the noise source to a second electronic device, so that the second electronic device convolves the phase-inverted signal of the noise reduction signal with a second HRIR, to determine the noise reduction signal of the second electronic device. The second HRIR is determined by the second electronic device based on the spatial coordinates of the noise source, and the second electronic device prestores a correspondence between the HRIR and the spatial coordinates of the noise source.

Optionally, with reference to the eleventh example implementation of the second aspect, in a twelfth example implementation, the first electronic device and the second electronic device are earphones. The earphones may include a left earphone and a right earphone, and an earphone with a higher battery level in the left earphone and the right earphone is the first electronic device.

A third aspect of this disclosure provides an audio signal processing method. The method may include: A signal processing apparatus receives a first sound wave signal. The signal processing apparatus performs digital processing on the first sound wave signal to obtain a first audio signal. The signal processing apparatus determines a first time point. The first time point is a time point at which the signal processing apparatus receives the first sound wave signal. The signal processing apparatus sends the first audio signal and the first time point to an electronic device. The first audio signal and the first time point are used by the electronic device to determine a noise reduction signal, the noise reduction signal is for performing noise reduction processing on a second sound wave signal received by the electronic device, and the second sound wave signal and the first sound wave signal are in a same sound field.

Optionally, with reference to the third aspect, in a first example implementation, the method may further include: The signal processing apparatus obtains first information. The first information may include position information of the electronic device relative to the signal processing apparatus. The signal processing apparatus sends the first information to the first electronic device. The first information is used by the electronic device to determine the noise reduction signal.

Optionally, with reference to the first example implementation of the third aspect, in a second example implementation, the method may further include: The signal processing apparatus obtains second information. The second information is position information of a noise source relative to the signal processing apparatus. The signal processing apparatus sends the second information to the first electronic device. The second information is used by the electronic device to determine the noise reduction signal.

Optionally, with reference to the third aspect or the first example implementation of the third aspect or the second example implementation of the third aspect, in a third example implementation, the method may further include: The signal processing apparatus recognizes the first sound wave signal and determines that the first sound wave signal comes from N noise sources, where N is a positive integer greater than 1. The signal processing apparatus divides the first sound wave signal into N signals based on the N noise sources. That the signal processing apparatus performs digital processing on the first sound wave signal to obtain a first audio signal may include: The signal processing apparatus performs digital processing on the first sound wave signal to obtain N first audio signals.

Optionally, with reference to the third aspect or the first example implementation of the third aspect or the second example implementation of the third aspect, in a fourth example implementation, the method may further include: The signal processing apparatus receives a third sound wave signal. The signal processing apparatus extracts a signal of a non-voice part from the third sound wave signal. The signal processing apparatus determines a noise spectrum of the third sound wave signal based on the signal of the non-voice part. The signal processing apparatus sends the noise spectrum to the electronic device through an electromagnetic wave, so that the electronic device determines a voice enhancement signal of a fourth sound wave signal based on the noise spectrum and the fourth sound wave signal. The fourth sound wave signal and the third sound wave signal are in a same sound field.

A fourth aspect of this disclosure provides an audio signal processing method. The method may include: A first electronic device receives a second sound wave signal. The first electronic device receives, through an electromagnetic wave, a first audio signal sent by a signal processing apparatus. The first audio signal is a signal obtained by performing digital processing on a received first sound wave signal by the signal processing apparatus, and the first sound wave signal and the second sound wave signal are in a same sound field. The first electronic device processes the first audio signal based on first information, to obtain a noise reduction signal. The noise reduction signal is for performing noise reduction processing on the second sound wave signal received by the electronic device, and the first information may include position information of the first electronic device relative to the signal processing apparatus.

Optionally, with reference to the fourth aspect, in a first example implementation, the method may further include: The first electronic device receives a first time point through an electromagnetic wave. The first time point is a time point at which the signal processing apparatus receives the first sound wave signal. That the first electronic device processes the first audio signal based on first information, to obtain a noise reduction signal may include: The first electronic device processes the first audio signal based on a difference between first duration and second duration, to determine to play the noise reduction signal. The first duration is determined by the first electronic device based on the first information and the speed of sound, the second duration is a difference between a second time point and the first time point, and the second time point is a time point at which the first electronic device receives the first audio signal.

Optionally, with reference to the fourth aspect, in a second example implementation, the method may further include: The first electronic device receives a first time point through an electromagnetic wave. The first time point is a time point at which the signal processing apparatus receives the first sound wave signal. That the first electronic device processes the first audio signal based on first information, to obtain a noise reduction signal may include: The first electronic device processes the first audio signal based on a difference between first duration and second duration, to determine to play the noise reduction signal. The first duration is determined by the first electronic device based on the first information and the speed of sound, the second duration is a difference between a second time point and the first time point, and the second time point is a time point at which the first electronic device receives the first audio signal. The first electronic device adjusts the first audio signal based on the first information.

Optionally, with reference to the first example implementation of the fourth aspect or the second example implementation of the fourth aspect, in a third example implementation, that the first electronic device processes the first audio signal based on a difference between first duration and second duration, to determine to play the noise reduction signal may include: When the first duration is greater than the second duration, the first electronic device processes the first audio signal based on the difference between the first duration and the second duration, to determine to play the noise reduction signal.

Optionally, with reference to the fourth aspect, in a fourth example implementation, the method may further include: The first electronic device receives a first time point through an electromagnetic wave. The first time point is a time point at which the signal processing apparatus receives the first sound wave signal. That the first electronic device processes the first audio signal based on first information, to obtain a noise reduction signal may include: The first electronic device determines a first distance and a second distance based on the first information and second information. The second information is position information of a noise source relative to the signal processing apparatus, the first distance is a distance between the noise source and the first electronic device, and the second distance is a distance between the noise source and the signal processing apparatus. The first electronic device processes the first audio signal based on a difference between third duration and second duration, to determine to play the noise reduction signal. The third duration is a ratio of a difference between the first distance and the second distance to the speed of sound, the second duration is a difference between a second time point and the first time point, and the second time point is a time point at which the first electronic device receives the first audio signal.

Optionally, with reference to the fourth aspect, in a fifth example implementation, the method may further include: The first electronic device receives a first time point through an electromagnetic wave. The first time point is a time point at which the signal processing apparatus receives the first sound wave signal. That the first electronic device processes the first audio signal based on first information, to obtain a noise reduction signal may include: The first electronic device processes the first audio signal based on a difference between third duration and second duration, to determine to play the noise reduction signal. The third duration is a ratio of a difference between a first distance and a second distance to the speed of sound, the second duration is a difference between a second time point and the first time point, the second time point is a time point at which the first electronic device receives the first audio signal, the first distance is a distance between a noise source and the first electronic device, and the second distance is a distance between the noise source and the signal processing apparatus. The first electronic device determines the first distance and the second distance based on the first information and second information. The first distance is a distance between a noise source and the electronic device, the second distance is a distance between the noise source and the signal processing apparatus, and the second information is position information of the noise source relative to the signal processing apparatus. The first electronic device performs transfer adjustment on the first audio signal based on the difference between the first distance and the second distance.

Optionally, with reference to the third example implementation of the fourth aspect or the fourth example implementation of the fourth aspect, in a sixth example implementation, that the first electronic device processes the first audio signal based on a difference between third duration and second duration, to determine to play the noise reduction signal may include: When the third duration is greater than the second duration, the first electronic device processes the first audio signal based on the difference between the third duration and the second duration, to determine to play the noise reduction signal.

Optionally, with reference to the fourth aspect or the first example implementation of the fourth aspect to the sixth example implementation of the fourth aspect, in a seventh example implementation, the method may further include: The first electronic device receives, through an electromagnetic wave, the first information sent by the signal processing apparatus.

Optionally, with reference to the fourth example implementation of the fourth aspect to the sixth example implementation of the fourth aspect, in an eighth example implementation, the method may further include: The first electronic device receives, through an electromagnetic wave, the second information sent by the signal processing apparatus.

Optionally, with reference to the sixth example implementation of the fourth aspect, in a ninth example implementation, there may be N first audio signals, where N is a positive integer greater than 1. That the first electronic device processes the first audio signal based on first information, to obtain a noise reduction signal may include: The first electronic device calculates an arithmetic average value of M signals for a same noise source, where M is a positive integer not greater than N.

Optionally, with reference to the fourth aspect or the first example implementation of the fourth aspect to the sixth example implementation of the fourth aspect, in a tenth example implementation, the method may further include: The first electronic device determines spatial coordinates of the noise source relative to the first electronic device that are present when the first electronic device is the origin of the coordinates. The first electronic device determines a first head-related impulse response HRIR based on the spatial coordinates of the noise source. The first electronic device prestores a correspondence between the HRIR and the spatial coordinates of the noise source. The first electronic device deconvolves the noise reduction signal based on the first HRIR, to obtain a phase-inverted signal of the noise reduction signal. The first electronic device sends the phase-inverted signal of the noise reduction signal and the spatial coordinates of the noise source to a second electronic device, so that the second electronic device convolves the phase-inverted signal of the noise reduction signal with a second HRIR, to determine the noise reduction signal of the second electronic device. The second HRIR is determined by the second electronic device based on the spatial coordinates of the noise source, and the second electronic device prestores a correspondence between the HRIR and the spatial coordinates of the noise source.

Optionally, with reference to the tenth example implementation of the fourth aspect, in an eleventh example implementation, the first electronic device and the second electronic device are earphones. The earphones may include a left earphone and a right earphone, and an earphone with a higher battery level in the left earphone and the right earphone is the first electronic device.

Optionally, with reference to the fourth aspect or the first example implementation of the fourth aspect to the sixth example implementation of the fourth aspect, in a twelfth example implementation, the method may further include: The first electronic device receives, through an electromagnetic wave, a noise spectrum of a third sound wave signal sent by the signal processing apparatus. The noise spectrum of the third sound wave signal is determined by the signal processing apparatus based on a signal of a non-voice part of the received third sound wave signal. The first electronic device receives a fourth sound wave signal. The fourth sound wave signal and the third sound wave signal are in a same sound field. The first electronic device determines a voice enhancement signal of the fourth sound wave signal based on a difference between the fourth sound wave signal on which a fast Fourier transform FFT is performed and the noise spectrum.

Optionally, with reference to the twelfth example implementation of the fourth aspect, in a thirteenth example implementation, there may be M noise spectrums of the third sound wave signal, where M is a positive integer greater than 1. The method may further include: The first electronic device determines that any N noise spectrums in the M noise spectrums are noise spectrums determined by the signal processing apparatus for sound wave signals for a same noise source, where N is a positive integer. The first electronic device determines an arithmetic average value of the N noise spectrums.

A fifth aspect of this disclosure provides a signal processing apparatus. The signal processing apparatus may include a microphone, configured to receive a first sound wave signal;

a processor, where the processor is coupled to the microphone and is configured to process the first sound wave signal based on first information to obtain a first audio signal, and the first information includes position information of an electronic device relative to the signal processing apparatus; and a communication interface, where the communication interface is coupled to the microphone and the processor and configured to send a first audio signal to the electronic device, the first audio signal is used by the electronic device to determine a noise reduction signal, the noise reduction signal is for performing noise reduction processing on a second sound wave signal received by the electronic device, and the second sound wave signal and the first sound wave signal are in a same sound field.

Optionally, with reference to the fifth aspect, in a first example implementation, the processor is specifically configured to perform transfer adjustment on the first sound wave signal based on the first information.

Optionally, with reference to the first example implementation of the fifth aspect, in a second example implementation, the processor is further configured to determine a first time point. The first time point is a time point at which the signal processing apparatus receives the first sound wave signal. The communication interface is further configured to send the first time point and the first information to the electronic device. The first time point and the first information are used by the electronic device to determine, based on a speed of sound, to play the noise reduction signal.

Optionally, with reference to the fifth aspect, in a third example implementation, the processor is further configured to determine a first time point. The first time point is a time point at which the signal processing apparatus receives the first sound wave signal. The processor is specifically configured to: perform transfer adjustment on the first sound wave signal based on the first information; and determine, based on a difference between first duration and second duration, a time point for sending the first audio signal, where the first duration is determined by the signal processing apparatus based on the first information and the speed of sound, the second duration is a difference between a second time point and the first time point, and the second time point is a time point that is determined by the signal processing apparatus and at which the electronic device receives the first audio signal.

Optionally, with reference to the third example implementation of the fifth aspect, in a fourth example implementation, the communication interface is specifically configured to: when the first duration is greater than the second duration, send the first audio signal to the electronic device.

Optionally, with reference to the fifth aspect, in a fifth example implementation, the processor is specifically configured to perform transfer processing on the first sound wave signal based on the first information and second information. The second information is position information of a noise source relative to the signal processing apparatus.

Optionally, with reference to the fifth example implementation of the fifth aspect, in a sixth example implementation, the processor is further configured to determine a first time point. The first time point is a time point at which the signal processing apparatus receives the first sound wave signal. The communication interface is further configured to send the first time point, the first information, and second information to the electronic device. The first time point, the first information, and the second information are used by the electronic device to determine, based on the speed of sound, to play the noise reduction signal.

Optionally, with reference to the fifth aspect, in a seventh example implementation, the processor is further configured to determine a first time point. The first time point is a time point at which the signal processing apparatus receives the first sound wave signal. The processor is specifically configured to: determine a first distance and a second distance based on the first information and second information, where the first distance is a distance between a noise source and the electronic device, the second distance is a distance between the noise source and the signal processing apparatus, and the second information is position information of the noise source relative to the signal processing apparatus; perform transfer adjustment on the first sound wave signal based on a difference between the first distance and the second distance; and process the first audio signal based on a difference between third duration and second duration, to determine a time point for sending the first audio signal, where the third duration is a ratio of the difference between the first distance and the second distance to the speed of sound, the second duration is a difference between a second time point and the first time point, and the second time point is a time point that is determined by the signal processing apparatus and at which the electronic device receives the first audio signal.

Optionally, with reference to the seventh example implementation of the fifth aspect, in an eighth example implementation, the communication interface is specifically configured to: when third duration is greater than second duration, send the first audio signal to the electronic device.

Optionally, with reference to the first example implementation of the fifth aspect to the fifth example implementation of the fifth aspect, in a ninth example implementation, the processor is further configured to determine the first time point. The first time point is a time point at which the signal processing apparatus receives the first sound wave signal. The communication interface is further configured to send the first time point to the electronic device. The first time point is used by the electronic device to determine to play the noise reduction signal.

Optionally, with reference to the fifth aspect or the first example implementation of the fifth aspect to the ninth example implementation of the fifth aspect, in a tenth example implementation, the processor is further configured to: obtain a first topological relationship between the signal processing apparatus and the electronic device; and determine the first information based on the first topological relationship, where the first information is the distance between the electronic device and the signal processing apparatus, or the first information is coordinates of the electronic device and the signal processing apparatus in a same coordinate system.

Optionally, with reference to the fifth aspect or the first example implementation of the fifth aspect to the ninth example implementation of the fifth aspect, in an eleventh example implementation, the signal processing apparatus further includes a memory. The memory is coupled to the processor, the memory prestores the first information, and the first information is the distance between the electronic device and the signal processing apparatus.

Optionally, with reference to the fifth example implementation of the fifth aspect to the eighth example implementation of the fifth aspect, in a twelfth example implementation, the processor is further configured to: obtain a second topological relationship among the signal processing apparatus, the noise source, and the electronic device; and determine the second information based on the second topological relationship.

Optionally, with reference to the fifth example implementation of the fifth aspect to the eighth example implementation of the fifth aspect, in a thirteenth example implementation, the memory is further configured to prestore second information.

Optionally, with reference to the fifth aspect or the first example implementation of the fifth aspect to the thirteenth example implementation of the fifth aspect, in a fourteenth example implementation, the processor is further configured to determine a phase-inverted signal of the first sound wave signal. The processor is specifically configured to process the phase-inverted signal of the first sound wave signal based on the first information.

Optionally, with reference to the fifth aspect or the first example implementation of the fifth aspect to the fourteenth example implementation of the fifth aspect, in a fifteenth example implementation, the processor is further configured to: recognize the first sound wave signal, and determine that the first sound wave signal comes from N noise sources, where N is a positive integer greater than 1; and divide the first sound wave signal into N signals based on the N noise sources. The processor is specifically configured to process the first sound wave signal based on the first information to obtain N first audio signals.

Optionally, with reference to the fifth aspect or the first example implementation of the fifth aspect to the fifteenth example implementation of the fifth aspect, in a sixteenth example implementation, the microphone is further configured to receive a third sound wave signal. The processor is further configured to: extract a signal of a non-voice part from the third sound wave signal; and determine a noise spectrum of the third sound wave signal based on the signal of the non-voice part. The communication interface is further configured to send the noise spectrum to the electronic device, so that the electronic device determines a voice enhancement signal of a fourth sound wave signal based on the noise spectrum and the fourth sound wave signal. The fourth sound wave signal and the third sound wave signal are in a same sound field.

A sixth aspect of this disclosure provides a first electronic device. The first electronic device may include: a communication interface, configured to receive a first audio signal, where the first audio signal is a signal obtained by processing a first sound wave signal based on first information by a signal processing apparatus, and the first information includes position information of an electronic device relative to the signal processing apparatus; a microphone, configured to receive a second sound wave signal, where the second sound wave signal and the first sound wave signal are in a same sound field; and a controller, coupled to the communication interface and the microphone and configured to: process the first audio signal to determine a noise reduction signal, where the noise reduction signal is for performing noise reduction processing on the second sound wave signal.

Optionally, with reference to the sixth aspect, in a first example implementation, the communication interface is further configured to receive a first time point. The first time point is a time point at which the signal processing apparatus receives the first sound wave signal. The controller is specifically configured to process the first audio signal based on the first time point, to determine to play the noise reduction signal.

Optionally, with reference to the first example implementation of the sixth aspect, in a second example implementation, the controller is specifically configured to process the first audio signal based on a difference between first duration and second duration, to determine to play the noise reduction signal. The first duration is determined by the first electronic device based on a ratio of a third distance to the speed of sound, the second duration is a difference between a second time point and the first time point, the second time point is a time point at which the first electronic device receives the first audio signal, and the third distance is a distance between the first electronic device and the signal processing apparatus.

Optionally, with reference to the second example implementation of the sixth aspect, in a third example implementation, the controller is specifically configured to: when the first duration is greater than the second duration, process, the first audio signal based on the difference between the first duration and the second duration, to determine to play the noise reduction signal.

Optionally, with reference to the first example implementation of the sixth aspect, in a fourth example implementation, the controller is specifically configured to process the first audio signal based on a difference between third duration and second duration, to determine to play the noise reduction signal. The third duration is a ratio of a difference between a first distance and a second distance to the speed of sound, the second duration is a difference between a second time point and the first time point, the second time point is a time point at which the first electronic device receives the first audio signal, the first distance is a distance between a noise source and the first electronic device, and the second distance is a distance between the noise source and the signal processing apparatus.

Optionally, with reference to the fourth example implementation of the sixth aspect, in a fifth example implementation, the controller is specifically configured to: when the third duration is greater than the second duration, process, by the first electronic device, the first audio signal based on the difference between the third duration and the second duration, to determine to play the noise reduction signal.

Optionally, with reference to the second example implementation of the sixth aspect or the third example implementation of the sixth aspect, in a sixth example implementation, the communication interface is further configured to receive the first information sent by the signal processing apparatus. The processor is further configured to determine the third distance based on the first information. Optionally, with reference to the fourth example implementation of the sixth aspect or the fifth example implementation of the sixth aspect, in a seventh example implementation, the communication interface is further configured to receive the first information and second information that are sent by the signal processing apparatus. The second information includes position information of the noise source relative to the signal processing apparatus. The processor is further configured to determine the first distance and the second distance based on the first information and the second information.

Optionally, with reference to the seventh example implementation of the sixth aspect, in an eighth example implementation, there are N first audio signals, where N is a positive integer greater than 1. The controller is specifically configured to calculate an arithmetic average value of M signals for a same noise source, where M is a positive integer not greater than N.

Optionally, with reference to the sixth aspect or the first example implementation of the sixth aspect to the seventh example implementation of the sixth aspect, in a ninth example implementation, the controller is specifically configured to perform cross-correlation processing on the first audio signal and the second sound wave signal, to determine the noise reduction signal.

Optionally, with reference to the sixth aspect or the first example implementation of the sixth aspect to the seventh example implementation of the sixth aspect, in a tenth example implementation, the controller is specifically configured to determine the noise reduction signal based on a least mean square error algorithm, the first audio signal, the noise reduction signal, and the second sound wave signal.

Optionally, with reference to the sixth aspect or the first example implementation of the sixth aspect to the seventh example implementation of the sixth aspect, in an eleventh example implementation, the controller is further configured to: determine spatial coordinates of the noise source relative to the first electronic device that are present when the first electronic device is the origin of the coordinates; determine a first head-related impulse response HRIR based on the spatial coordinates of the noise source, where the first electronic device prestores a correspondence between the HRIR and the spatial coordinates of the noise source; and deconvolve the noise reduction signal based on the first HRIR, to obtain a phase-inverted signal of the noise reduction signal. The communication interface is further configured to send the phase-inverted signal of the noise reduction signal and the spatial coordinates of the noise source to a second electronic device, so that the second electronic device convolves the phase-inverted signal of the noise reduction signal with a second HRIR, to determine the noise reduction signal of the second electronic device. The second HRIR is determined by the second electronic device based on the spatial coordinates of the noise source, and the second electronic device prestores a correspondence between the HRIR and the spatial coordinates of the noise source.

Optionally, with reference to the eleventh example implementation of the sixth aspect, in a twelfth example implementation, the first electronic device and the second electronic device are earphones. The earphones include a left earphone and a right earphone, and an earphone with a higher battery level in the left earphone and the right earphone is the first electronic device.

A seventh aspect of this disclosure provides an audio signal processing device. The audio signal processing device may include: a microphone, configured to receive a first sound wave signal; a processor, where the processor is coupled to the microphone and is configured to perform digital processing on the first sound wave signal to obtain a first audio signal, and the processor is further configured to determine a first time point, where the first time point is a time point at which the signal processing apparatus receives the first sound wave signal; and a communication interface, where the communication interface is coupled to the processor and is configured to send the first audio signal and the first time point to an electronic device, the first audio signal and the first time point are used by the electronic device to determine a noise reduction signal, the noise reduction signal is for performing noise reduction processing on a second sound wave signal received by the electronic device, and the second sound wave signal and the first sound wave signal are in a same sound field.

Optionally, with reference to the seventh aspect, in a first example implementation, the communication interface is further configured to: send, by the signal processing apparatus, first information to a first electronic device. The first information is used by the electronic device to determine a noise reduction signal, and the first information includes position information of the electronic device relative to the signal processing apparatus.

Optionally, with reference to the first example implementation of the seventh aspect, in a second example implementation, the communication interface is further configured to: send, by the signal processing apparatus, second information to the first electronic device. The second information is used by the electronic device to determine a noise reduction signal, and the second information is position information of a noise source relative to the signal processing apparatus.

Optionally, with reference to the seventh aspect or the first example implementation of the seventh aspect or the second example implementation of the seventh aspect, in a third example implementation, the processor is further configured to: recognize the first sound wave signal, and determine that the first sound wave signal comes from N noise sources, where N is a positive integer greater than 1; and divide the first sound wave signal into N signals based on the N noise sources. The processor is specifically configured to perform digital processing on the first sound wave signal to obtain N first audio signals.

Optionally, with reference to the seventh aspect or the first example implementation of the seventh aspect or the second example implementation of the seventh aspect, in a fourth example implementation, the microphone is further configured to receive a third sound wave signal. The processor is further configured to: extract a signal of a non-voice part from the third sound wave signal; and determine a noise spectrum of the third sound wave signal based on the signal of the non-voice part.

The communication interface is further configured to send the noise spectrum to the electronic device, so that the electronic device determines a voice enhancement signal of a fourth sound wave signal based on the noise spectrum and the fourth sound wave signal. The fourth sound wave signal and the third sound wave signal are in a same sound field.

An eighth aspect of this disclosure provides a first electronic device. The first electronic device may include: a microphone, configured to receive a second sound wave signal; a communication interface, configured to receive a first audio signal sent by a signal processing apparatus. The first audio signal is a signal obtained by performing digital processing on a received first sound wave signal by the signal processing apparatus, and the first sound wave signal and the second sound wave signal are in a same sound field; and a processor, where the processor is coupled to the communication interface and the microphone and is configured to process the first audio signal based on first information to obtain a noise reduction signal, the noise reduction signal is for performing noise reduction processing on the second sound wave signal received by the electronic device, and the first information includes position information of a first electronic device relative to the signal processing apparatus.

Optionally, with reference to the eighth aspect, in a first example implementation, the communication interface is further configured to receive a first time point. The first time point is a time point at which the signal processing apparatus receives the first sound wave signal. The processor is specifically configured to process the first audio signal based on a difference between first duration and second duration, to determine to play the noise reduction signal. The first duration is determined by the first electronic device based on the first information and the speed of sound, the second duration is a difference between a second time point and the first time point, and the second time point is a time point at which the first electronic device receives the first audio signal.

Optionally, with reference to the eighth aspect, in a second example implementation, the communication interface is further configured to receive a first time point. The first time point is a time point at which the signal processing apparatus receives the first sound wave signal. The processor is specifically configured to: process the first audio signal based on a difference between first duration and second duration, to determine to play the noise reduction signal, where the first duration is determined by the first electronic device based on the first information and the speed of sound, the second duration is a difference between a second time point and the first time point, and the second time point is a time point at which the first electronic device receives the first audio signal; and adjust the first audio signal based on the first information.

Optionally, with reference to the first example implementation of the eighth aspect or the second example implementation of the eighth aspect, in a third example implementation, the processor is specifically configured to: when the first duration is greater than the second duration, process, by the first electronic device, the first audio signal based on the difference between the first duration and the second duration, to determine to play the noise reduction signal.

Optionally, with reference to the eighth aspect, in a fourth example implementation, the communication interface is further configured to receive a first time point. The first time point is a time point at which the signal processing apparatus receives the first sound wave signal. The processor is specifically configured to: determine a first distance and a second distance based on the first information and second information, where the second information is position information of a noise source relative to the signal processing apparatus, the first distance is a distance between the noise source and the first electronic device, and the second distance is a distance between the noise source and the signal processing apparatus; and process the first audio signal based on a difference between third duration and second duration, to determine to play the noise reduction signal, where the third duration is a ratio of a difference between the first distance and the second distance to the speed of sound, the second duration is a difference between a second time point and the first time point, and the second time point is a time point at which the first electronic device receives the first audio signal Optionally, with reference to the eighth aspect, in a fifth example implementation, the communication interface is further configured to receive a first time point. The first time point is a time point at which the signal processing apparatus receives the first sound wave signal. The processor is specifically configured to: process the first audio signal based on a difference between third duration and second duration, to determine to play the noise reduction signal, where the third duration is a ratio of a difference between a first distance and a second distance to the speed of sound, second duration is a difference between a second time point and the first time point, the second time point is a time point at which the first electronic device receives the first audio signal, the first distance is a distance between a noise source and the first electronic device, and the second distance is a distance between the noise source and the signal processing apparatus; determine the first distance and the second distance based on the first information and second information, where the first distance is a distance between a noise source and the electronic device, the second distance is a distance between the noise source and the signal processing apparatus, and the second information is position information of the noise source relative to the signal processing apparatus; and perform transfer adjustment on the first audio signal based on the difference between the first distance and the second distance.

Optionally, with reference to the third example implementation of the eighth aspect or the fourth example implementation of the eighth aspect, in a sixth example implementation, the processor is specifically configured to: when the third duration is greater than the second duration, process the first audio signal based on the difference between the third duration and the second duration, to determine to play the noise reduction signal.

Optionally, with reference to the eighth aspect or the first example implementation of the eighth aspect to the sixth example implementation of the eighth aspect, in a seventh example implementation, the communication interface is further configured to receive the first information sent by the signal processing apparatus.

Optionally, with reference to the fourth example implementation of the eighth aspect to the sixth example implementation of the eighth aspect, in an eighth example implementation, the communication interface is further configured to receive the second information sent by the signal processing apparatus.

Optionally, with reference to the sixth example implementation of the eighth aspect, in a ninth example implementation, there are N first audio signals, where N is a positive integer greater than 1. The processor is specifically configured to calculate an arithmetic average value of M signals for a same noise source, where M is a positive integer not greater than N.

Optionally, with reference to the eighth aspect or the first example implementation of the eighth aspect to the sixth example implementation of the eighth aspect, in a tenth example implementation, the processor is further configured to: determine spatial coordinates of the noise source relative to the first electronic device that are present when the first electronic device is the origin of the coordinates; determine a first head-related impulse response HRIR based on the spatial coordinates of the noise source, where the first electronic device prestores a correspondence between the HRIR and the spatial coordinates of the noise source; and deconvolve the noise reduction signal based on the first HRIR, to obtain a phase-inverted signal of the noise reduction signal. The communication interface is further configured to send the phase-inverted signal of the noise reduction signal and the spatial coordinates of the noise source to a second electronic device, so that the second electronic device convolves the phase-inverted signal of the noise reduction signal with a second HRIR, to determine the noise reduction signal of the second electronic device. The second HRIR is determined by the second electronic device based on the spatial coordinates of the noise source, and the second electronic device prestores a correspondence between the HRIR and the spatial coordinates of the noise source.

Optionally, with reference to the tenth example implementation of the eighth aspect, in an eleventh example implementation, the first electronic device and the second electronic device are earphones. The earphones include a left earphone and a right earphone, and an earphone with a higher battery level in the left earphone and the right earphone is the first electronic device.

Optionally, with reference to the eighth aspect or the first example implementation of the eighth aspect to the sixth example implementation of the eighth aspect, in a twelfth example implementation, the communication interface is further configured to receive a noise spectrum of a third sound wave signal sent by the signal processing apparatus. The noise spectrum of the third sound wave signal is determined by the signal processing apparatus based on a signal of a non-voice part of the received third sound wave signal. The microphone is further configured to receive a fourth sound wave signal. The fourth sound wave signal and the third sound wave signal are in a same sound field. The processor is further configured to determine a voice enhancement signal of the fourth sound wave signal based on a difference between the fourth sound wave signal on which a fast Fourier transform FFT is performed and the noise spectrum.

Optionally, with reference to the twelfth example implementation of the eighth aspect, in a thirteenth example implementation, there may be M noise spectrums of the third sound wave signal, where M is a positive integer greater than 1. The processor is further configured to: determine that any N noise spectrums in the M noise spectrums are noise spectrums determined by the signal processing apparatus for sound wave signals for a same noise source, where N is a positive integer; and determine an arithmetic average value of the N noise spectrums.

A ninth aspect of this disclosure provides a signal processing apparatus. The signal processing apparatus has functions of implementing the audio signal processing method in the first aspect or any example implementation of the first aspect. The functions may be implemented by hardware, or may be implemented by hardware by executing corresponding software. The hardware or software includes one or more modules corresponding to the functions.

A tenth aspect of this disclosure provides an electronic device. The electronic device has functions of implementing the audio signal processing method in the second aspect or any example implementation of the second aspect. The functions may be implemented by hardware, or may be implemented by hardware by executing corresponding software. The hardware or software includes one or more modules corresponding to the functions.

An eleventh aspect of this disclosure provides a signal processing apparatus. The signal processing apparatus has functions of implementing the audio signal processing method in the third aspect or any example implementation of the third aspect. The functions may be implemented by hardware, or may be implemented by hardware by executing corresponding software. The hardware or software includes one or more modules corresponding to the functions.

A twelfth aspect of this disclosure provides an electronic device. The electronic device has functions of implementing the audio signal processing method in the fourth aspect or any example implementation of the fourth aspect. The functions may be implemented by hardware, or may be implemented by hardware by executing corresponding software. The hardware or software includes one or more modules corresponding to the functions.

A thirteenth aspect of this disclosure provides a noise reduction headset. The headset has functions of implementing the audio signal processing method in the second aspect or any example implementation of the second aspect. The functions may be implemented by hardware, or may be implemented by hardware by executing corresponding software. The hardware or software includes one or more modules corresponding to the functions.

A fourteenth aspect of this disclosure provides a noise reduction headset. The headset has functions of implementing the audio signal processing method in the fourth aspect or any example implementation of the fourth aspect. The functions may be implemented by hardware, or may be implemented by hardware by executing corresponding software. The hardware or software includes one or more modules corresponding to the functions.

A fifteenth aspect of this disclosure provides a noise reduction system. The noise reduction system includes a signal processing apparatus and an electronic device. The signal processing apparatus may be the signal processing apparatus described in the first aspect or any example implementation of the first aspect. Alternatively, the signal processing apparatus may be the signal processing apparatus described in the second aspect or any example implementation of the second aspect. The electronic device may be the electronic device described in the second aspect or any example implementation of the second aspect, or the electronic device may be the electronic device described in the fourth aspect or any example implementation of the fourth aspect.

A sixteenth aspect of this disclosure provides a computer-readable storage medium. The computer-readable storage medium stores instructions. When the instructions are run on a computer, the computer is enabled to perform the audio signal processing method in the first aspect or any example implementation of the first aspect, or the computer is enabled to perform the audio signal processing method in the third aspect or any example implementation of the third aspect.

A seventeenth aspect of this disclosure provides a computer-readable storage medium. The computer-readable storage medium stores instructions. When the instructions are run on a computer, the computer is enabled to perform the audio signal processing method in the second aspect or any example implementation of the second aspect, or the computer is enabled to perform the audio signal processing method in the fourth aspect or any example implementation of the fourth aspect.

An eighteenth aspect of this disclosure provides a computer program product including instructions. When the computer program product runs on a computer, the computer is enabled to perform the audio signal processing method in the first aspect or any example implementation of the first aspect, or the computer is enabled to perform the audio signal processing method in the third aspect or any example implementation of the third aspect.

A nineteenth aspect of this disclosure provides a computer program product including instructions. When the computer program product runs on a computer, the computer is enabled to perform the audio signal processing method in the second aspect or any example implementation of the second aspect, or the computer is enabled to perform the audio signal processing method in the fourth aspect or any example implementation of the fourth aspect.

A twentieth aspect of this disclosure provides a signal processing apparatus, configured to preprocess a sound wave signal and output a processed audio signal through an electromagnetic wave. The signal processing apparatus includes: a receiving unit, where the receiving unit is configured to receive at least one sound wave signal; a conversion unit, where the conversion unit is configured to convert the at least one sound wave signal to at least one audio signal; a positioning unit, where the positioning unit is configured to determine position information related to the at least one sound wave signal; a processing unit, where the processing unit is in a signal connection to the conversion unit and the positioning unit and is configured to determine a sending time point of the at least one audio signal based on the position information and a first time point, and the first time point is a time point at which the receiving unit receives the at least one sound wave signal; and a sending unit, configured to send the at least one audio signal through the electromagnetic wave.

Optionally, with reference to the twentieth aspect, in a first example implementation, the processing unit further includes: performing phase inversion processing on the at least one audio signal; and the sending unit is configured to send, through the electromagnetic wave, the at least one audio signal on which phase inversion processing is performed.

Optionally, with reference to the twentieth aspect or the first example implementation of the twentieth aspect, in a second example implementation, the processing unit is further configured to: determine a first distance and a second distance based on the position information, where the first distance is a distance between a sound source of the at least one sound wave signal and an electronic device, and the second distance is a distance between the sound source of the at least one sound wave signal and the signal processing apparatus; and perform transfer adjustment on the at least one sound wave signal based on a difference between the first distance and the second distance, to determine a signal feature of the at least one audio signal, where the signal feature includes an amplitude feature; and the sending unit is specifically configured to send the at least one audio signal to the electronic device at the sending time point through the electromagnetic wave.

Optionally, with reference to the second example implementation of the twentieth aspect, in a third example implementation, the processing unit is specifically configured to determine, based on a difference between first duration and second duration, a time point for sending the at least one audio signal, so that the at least one audio signal and the at least one sound wave signal arrive at the electronic device synchronously, where the first duration is a ratio of the difference between the first distance and the second distance to the speed of sound, the second duration is a difference between a second time point and the first time point, and the second time point is a time point that is determined by the signal processing apparatus and at which the electronic device receives the audio signal.

Optionally, with reference to the third example implementation of the twentieth aspect, in a fourth example implementation, the processing unit is specifically configured to: when the first duration is greater than the second duration, determine, based on the difference between the first duration and the second duration, the time point for sending the at least one audio signal.

A twenty-first aspect of this disclosure provides an electronic device, including: a first receiving unit, where the first receiving unit is configured to receive at least one sound wave signal; a second receiving unit, where the second receiving unit is configured to receive at least one audio signal, a first time point, and first information through an electromagnetic wave, the at least one audio signal is at least one audio signal obtained by performing digital processing on a received sound wave signal by a signal processing apparatus, the first time point is a time point at which the signal processing apparatus receives the at least one sound wave signal, and the first information is position information related to the at least one sound wave signal; and a processing unit, where the processing unit is connected to the first receiving unit and the second receiving unit and is configured to determine a playing time point of the at least one audio signal based on the first time point and the first information, where the audio signal is for performing noise reduction processing on the at least one sound wave signal.

Optionally, with reference to the twenty-first aspect, in a first example implementation, the processing unit is further configured to perform phase inversion processing on the at least one audio signal.

Optionally, with reference to the twenty-first aspect or the first example implementation of the twenty-first aspect, in a second example implementation, the processing unit is specifically configured to: determine a first distance and a second distance based on the first information, where the first distance is a distance between a sound source of the at least one sound wave signal and the electronic device, and the second distance is a distance between the sound source of the at least one sound wave signal and the signal processing apparatus; and determine the playing time point of the at least one audio signal based on a difference between first duration and second duration, so that the electronic device plays the audio signal when receiving the at least one sound wave signal, where the first duration is a ratio of a difference between the first distance and the second distance to the speed of sound, the second duration is a difference between a second time point and the first time point, and the second time point is a time point at which the at least one audio signal is received.

Optionally, with reference to the second example implementation of the twenty-first aspect, in a third example implementation, the processing unit is further configured to: perform transfer adjustment on the at least one audio signal based on the difference between the first distance and the second distance, to determine a signal feature of the at least one audio signal, where the signal feature includes an amplitude feature.

Optionally, with reference to the twenty-first aspect or the first to the third example implementations of the twenty-first aspect, in a fourth example implementation, the at least one audio signal includes N audio signals, where N is a positive integer greater than 1. The processing unit is further configured to: calculate an arithmetic average value of M signals for a same sound source, where M is a positive integer not greater than N.

A twenty-second aspect of this disclosure provides a signal processing system, including a signal processing apparatus and an electronic device. The signal processing apparatus is the signal processing apparatus described in the twentieth aspect or any example implementation of the twentieth aspect, and the electronic device is the electronic device described in the twenty-first aspect or any example implementation of the twenty-first aspect.

A twenty-third aspect of this disclosure provides a signal processing method. The signal processing method is applied to a signal processing apparatus. The signal processing apparatus preprocesses a sound wave signal, and outputs a processed audio signal through an electromagnetic wave. The signal processing method includes: receiving at least one sound wave signal. converting the at least one sound wave signal to at least one audio signal; determining position information related to the at least one sound wave signal; determining a sending time point of the at least one audio signal based on the position information and a first time point, where the first time point is a time point at which the signal processing apparatus receives the at least one sound wave signal; and sending the at least one audio signal through the electromagnetic wave.

Optionally, with reference to the twenty-third aspect, in a first example implementation, the signal processing method further includes: performing phase inversion processing on the at least one audio signal. The sending the at least one audio signal through the electromagnetic wave includes: sending, through the electromagnetic wave, the at least one audio signal on which phase inversion processing is performed.

Optionally, with reference to the twenty-third aspect or the first example implementation of the twenty-third aspect, in a second example implementation, the signal processing method further includes: determining a first distance and a second distance based on the position information, where the first distance is a distance between a sound source of the at least one sound wave signal and an electronic device, and the second distance is a distance between the sound source of the at least one sound wave signal and the signal processing apparatus; and performing transfer adjustment on the at least one sound wave signal based on a difference between the first distance and the second distance, to determine a signal feature of the at least one audio signal, where the signal feature includes an amplitude feature. The sending the at least one audio signal through the electromagnetic wave includes: sending the at least one audio signal to the electronic device at the sending time point through the electromagnetic wave.

Optionally, with reference to the second example implementation of the twenty-third aspect, in a third example implementation, the determining a sending time point of the at least one audio signal based on the position information and a first time point includes: determining, based on a difference between first duration and second duration, a time point for sending the at least one audio signal, so that the at least one audio signal and the at least one sound wave signal arrive at the electronic device synchronously. The first duration is a ratio of the difference between the first distance and the second distance to the speed of sound, the second duration is a difference between a second time point and the first time point, and the second time point is a time point that is determined by the signal processing apparatus and at which the electronic device receives the audio signal.

Optionally, with reference to the third example implementation of the twenty-third aspect, in a fourth example implementation, the determining, based on a difference between first duration and second duration, a time point for sending the at least one audio signal includes: when the first duration is greater than the second duration, determining, based on the difference between the first duration and the second duration, the time point for sending the at least one audio signal.

A twenty-fourth aspect of this disclosure provides a signal processing method. The signal processing method is applied to an electronic device and includes: receiving at least one sound wave signal; receiving at least one audio signal, a first time point, and first information through an electromagnetic wave, where the at least one audio signal is at least one audio signal obtained by performing digital processing on a received sound wave signal by a signal processing apparatus, the first time point is a time point at which the signal processing apparatus receives the at least one sound wave signal, and the first information is position information related to the at least one sound wave signal; and determining a playing time point of the at least one audio signal based on the first time point and the first information, where the audio signal is for performing noise reduction processing on the at least one sound wave signal.

Optionally, with reference to the twenty-fourth aspect, in a first example implementation, the signal processing method further includes: performing phase inversion processing on the at least one audio signal.

Optionally, with reference to the twenty-fourth aspect or the first example implementation of the twenty-fourth aspect, in a second example implementation, the determining a playing time point of the at least one audio signal based on the first time point and the first information includes: determining a first distance and a second distance based on the first information, where the first distance is a distance between a sound source of the at least one sound wave signal and the electronic device, and the second distance is a distance between the sound source of the at least one sound wave signal and the signal processing apparatus; and determining the playing time point of the at least one audio signal based on a difference between first duration and second duration, so that the electronic device plays the audio signal when receiving the at least one sound wave signal, where the first duration is a ratio of a difference between the first distance and the second distance to the speed of sound, the second duration is a difference between a second time point and the first time point, and the second time point is a time point at which the at least one audio signal is received.

Optionally, with reference to the second example implementation of the twenty-fourth aspect, in a third example implementation, the signal processing method further includes: performing transfer adjustment on the at least one audio signal based on the difference between the first distance and the second distance, to determine a signal feature of the at least one audio signal, where the signal feature includes an amplitude feature.

Optionally, with reference to the twenty-fourth aspect or the first to the third example implementations of the twenty-fourth aspect, in a fourth example implementation, the at least one audio signal includes N audio signals, where N is a positive integer greater than 1. The signal processing method further includes: calculating an arithmetic average value of M signals for a same sound source, where M is a positive integer not greater than N.

A twenty-fifth aspect of this disclosure provides a signal processing system. The signal processing system includes a signal processing apparatus and an electronic device, and the signal processing apparatus is the signal processing apparatus described in the twenty-third aspect or any example implementation of the twenty-third aspect. The electronic device is the electronic device described in the twenty-fourth aspect or any example implementation of the twenty-fourth aspect.

According to the technical solutions provided in this disclosure, the electronic device and the signal processing apparatus receive the sound wave signals from the same sound field. After receiving the signal sent by the noise source, the signal processing apparatus processes the received signal based on the position information of the electronic device relative to the signal processing apparatus to obtain the first audio signal, and sends the first audio signal to the electronic device through the electromagnetic wave. The electronic device may obtain the information about the noise in advance based on the first audio signal. In addition, because the signal processing apparatus processes the first audio signal based on the distance between the signal processing apparatus and the electronic device, for example, may perform transfer adjustment or sending time point adjustment on the first audio signal based on the distance between the signal processing apparatus and the electronic device, the noise reduction signal determined by the electronic device based on the first audio signal can be superimposed with and cancel out the signal that is sent by the noise source and received by the electronic device. This enhances a noise reduction effect.

DESCRIPTION OF EMBODIMENTS

Figure 1:
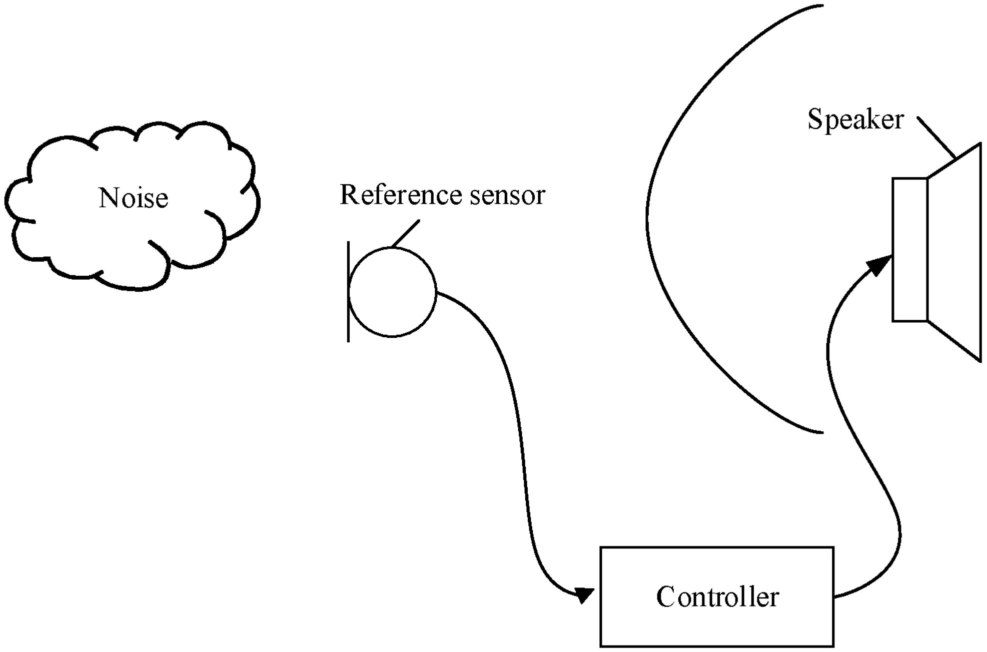
FIG. 1 is a schematic diagram of a feedforward active noise reduction system.

The following describes embodiments of this disclosure with reference to the accompanying drawings. It is clear that the described embodiments are merely a part rather than all of embodiments of this disclosure. A person of ordinary skill in the art may learn that, with technology development and emergence of a new scenario, the technical solutions provided in embodiments of this disclosure are also applicable to a similar technical problem.

In the specification, claims, and accompanying drawings of this disclosure, terms "first", "second", and the like are intended to distinguish between similar objects but do not necessarily indicate a specific order or sequence. It should be understood that the data used in such a way are interchangeable in appropriate circumstances, so that embodiments described herein can be implemented in an order other than the content illustrated or described herein. Moreover, terms "include", "comprise", and any other variant thereof are intended to cover non-exclusive inclusion. For example, a process, a method, a system, a product, or a device that includes a series of steps or modules is not necessarily limited to those expressly listed steps or modules, but may include other steps or modules not expressly listed or inherent to the process, the method, the product, or the device. Names or numbers of steps in this disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into the modules in this disclosure is logical division. In actual application, there may be another division manner. For example, a plurality of modules may be combined or integrated into another system, or some features may be ignored or not performed. In addition, the displayed or discussed mutual coupling or direct coupling or communication connection may be implemented through some ports, and the indirect coupling or communication connection between modules may be in an electrical form or another similar form. This is not limited in this disclosure. In addition, modules or submodules described as separate components may be or may not be physically separated, or may be or may not be physical modules, or may be distributed on a plurality of circuit modules. Objectives of the solutions of this disclosure may be achieved by selecting some or all of the modules based on actual demands.

Current noise reduction technologies include active noise reduction and passive noise reduction. An active noise reduction function is to superimpose a cancellation sound wave and an environmental noise, to cancel out impact of the environmental noise, where the cancellation sound wave has a same frequency and amplitude as the environmental noise, but a phase of the cancellation sound wave differs from a phase of the environmental noise by 180°. In this way, a noise reduction effect is achieved. A passive noise reduction headset mainly surrounds ears to form a closed space, or uses a sound insulation material such as a silicone earplug to block an external noise. Because the passive noise reduction headset usually needs to block an ear canal or wear a thick earmuff to achieve a noise reduction effect, wearing experience and a noise reduction effect of users are poor. However, an active noise reduction headset can overcome a disadvantage that the noise reduction effect of the passive noise reduction headset is not ideal. Therefore, the active noise reduction headset may become a standard configuration of a smartphone in the future, and is to play an important role in fields such as wireless connection, intelligent noise reduction, voice interaction, and biological monitoring.

Generally, active noise reduction (active noise cancellation, ANC) includes three types: feedforward noise reduction, feedback noise reduction, and integrated noise reduction. To better understand this solution, the following describes principles of the three types of active noise reduction. It should be noted that, in the conventional technology, there are mature technologies about how to implement a feedforward active noise reduction headset, a feedback active noise reduction headset, and an integrated active noise reduction headset. How to implement the three types of active noise reduction is not an inventive point of this disclosure.

FIG. 1 is a schematic diagram of a feedforward active noise reduction system. The feedforward active noise reduction system exposes a sensor to a noise and isolates the sensor from a speaker. In other words, a sensor is deployed outside a headset (the sensor deployed outside the headset is referred to as a reference sensor below). The reference sensor is configured to collect an external noise signal. For example, the reference sensor may be a microphone. The reference sensor inputs the collected noise signal into a controller to obtain a phase-inverted signal y(n), where a phase of the phase-inverted signal y(n) is opposite to that of a noise signal x(n). Then, y(n) is played by a headset speaker. In this way, a noise reduction effect is achieved. For example, a method for calculating the phase-inverted signal y(n) is as follows: A headset receives an audio signal by using a microphone, and performs digital processing on the audio signal to obtain an audio signal x(n), where x(n) is a series of audio sampling points, and the headset inverts a phase of a symbol of each sampling point in the audio signal x(n), to obtain the phase-inverted signal y(n).

Figure 2:
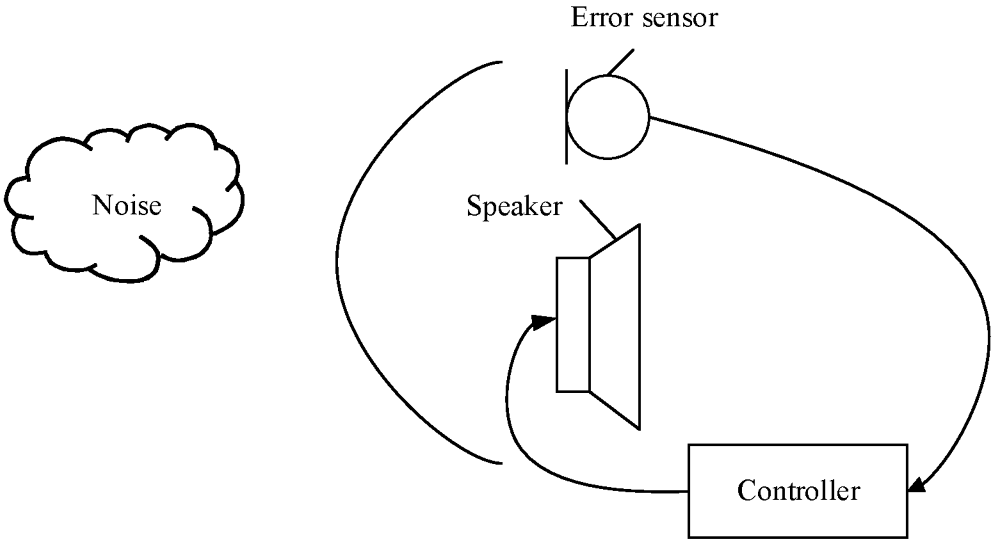
FIG. 2 is a schematic diagram of a feedback active noise reduction system.

FIG. 2 is a schematic diagram of a feedback active noise reduction system. In the feedback active noise reduction system, a sensor is deployed as close to a speaker as possible. In other words, a sensor is deployed inside a headset (the sensor deployed inside the headset is referred to as an error sensor below). The error sensor is configured to collect an internal audio signal obtained after noise reduction. For example, the error sensor may be a microphone. Then, the error sensor inputs a collected error signal e(n) obtained after noise reduction into a controller, that is, the error sensor obtains a residual noise obtained after destructive interference and sends the residual noise to the controller to obtain a phase-inverted signal y(n), so as to minimize e(n) obtained by superimposing y(n) and an external noise signal.

Figure 3:
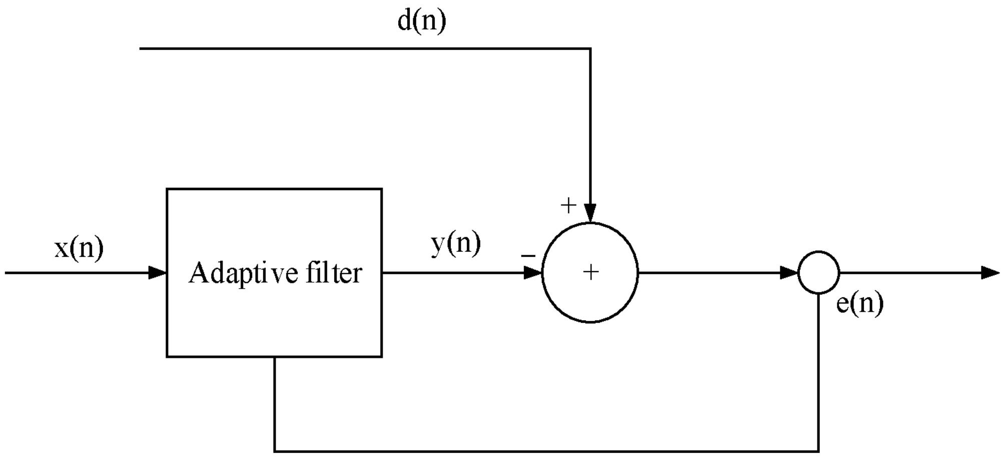
FIG. 3 is a schematic diagram of an integrated active noise reduction system.

In addition to the foregoing feedforward active noise reduction system and feedback noise reduction system, there is an integrated noise reduction system. As shown in FIG. 3, the integrated noise reduction system may be considered as a combination of the foregoing feedforward active noise reduction system and feedback noise reduction system. The integrated noise reduction system includes two sensors. To be specific, an error sensor is deployed inside a headset, and a reference sensor is deployed outside the headset. In addition, analog filters are used for most controllers in the foregoing feedforward noise reduction system and feedback noise reduction system. A digital filter is used in the integrated active noise reduction system, and is more powerful than an analog filter in functions. The digital filter may be used for eliminating a noise according to an adaptive filtering method. Adaptive filtering is to automatically adjust a filter parameter at a current time point based on a result such as a filter parameter obtained at a previous time point, to adapt to an unknown signal and noise. In this way, optimal filtering is implemented. Optimality is measured according to specific criteria. Common criteria include the filtered-X least mean square error (filtered-X least mean square, FxLMS) criterion. The following describes a working principle of the integrated active noise reduction system with reference to FIG. 3. The reference sensor collects an external noise reference signal x(n), and the error sensor collects an error signal e(n) obtained after noise reduction. If the external signal is d(n), and d(n) is a sum of a wanted signal and a noise signal, a required phase-inverted signal y(n) may be calculated according to the FxLMS criterion, and a derivation process belongs to a conventional technology. In this disclosure, only results are listed, and the derivation process is not described in detail. The results are as follows:

$$y(n)=w^T(n)\times(n)$$

$$e(n)=d(n)-y(n)$$

$$w(n+1)=w(n)+ue(n)\times(n).$$

In the foregoing expression, w(n) represents a weight coefficient of an adaptive filter, the third formula is a filter coefficient update formula, and u represents a convergence factor (a value may be random). That is, a weight coefficient at a next time point may be obtained by adding a weight coefficient at a current time point and an input proportional to an error function. A purpose of the system is to obtain y(n) through continuous prediction based on e(n) and x(n), so as to minimize e(n).

In the foregoing three active noise reduction systems, because a sensor is disposed on a headset, a distance between the sensor and ears is excessively small, and the headset needs to collect a noise within an extremely short period of time and process the noise, for example, a headset in the market has only dozens of microseconds to sample, process, and play signals. Such a short period of time greatly limits performance of an active noise reduction headset, and reduces an upper limit of an active noise reduction frequency of the headset. To resolve this problem, one manner is to remove a sensor (for example, the sensor may be a microphone) that is usually embedded in a headset, and the sensor becomes an external sensor. For example, a headset user sits in an office and wears a noise reduction headset. A microphone is installed at a door of the office to sense a noise in the corridor and transmit the noise to the headset at a speed of light. Because a speed of a wireless signal is greatly faster than a speed of sound, the headset has more time to process the signal and calculate a noise cancellation signal.

This time advantage enables the headset to obtain information about a noise several milliseconds in advance, which is hundreds of times faster than dozens of microseconds of a conventional headset. In this way, noise reduction calculation is better performed. However, this solution also has a disadvantage. In this solution, a microphone can be used to sense and eliminate only a single noise source. Consequently, this solution can be used only in an indoor environment dominated by a single noise source, and is not applicable to a scenario with a plurality of noise sources. For example, when there are a plurality of noise sources, the headset may receive, at different time points, noise signals collected by different microphones. This solution does not provide, in a case of the plurality of noise sources, a solution about how the headset performs processing based on noise reduction signals sent by a plurality of microphones, to achieve a noise reduction effect. In addition, in this solution, it cannot be ensured that a noise reduction signal obtained by processing, by the headset, the noise collected by the microphone can exactly cancel out a noise received by the headset. In other words, this solution provides only an idea of separating noise collection from noise reduction signal playing, but does not describe how to specifically achieve a noise reduction effect after a sensor for collecting an external noise is externally disposed. As a result, this solution cannot be actually applied. To resolve this problem, this disclosure provides an audio signal processing method. The method is described in detail below.

Figure 4:
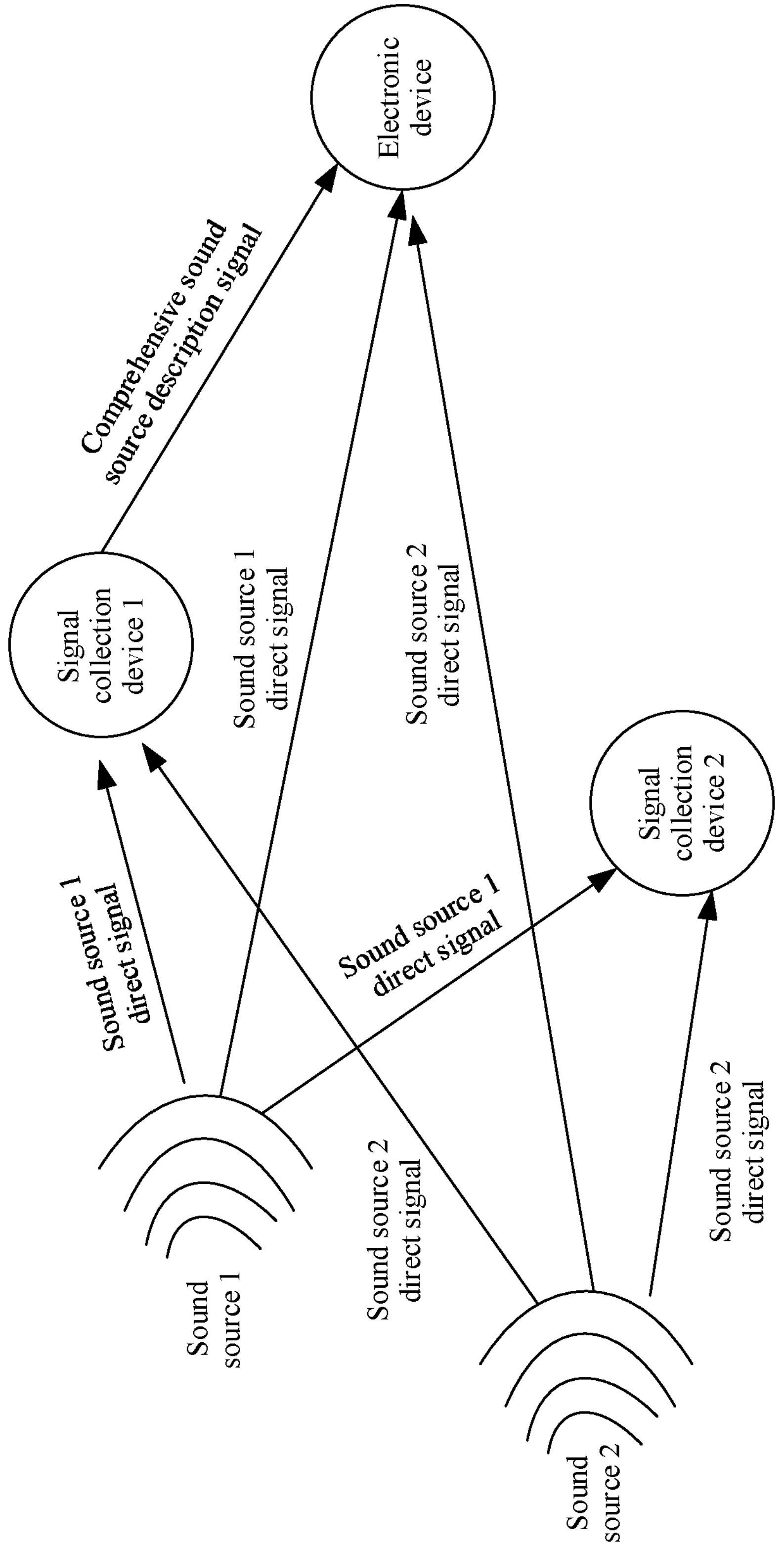
FIG. 4 is a schematic diagram of a system architecture according to an embodiment of this disclosure.

Descriptions are first provided for a system architecture of this disclosure and a scenario to which this disclosure is applicable. FIG. 4 is a schematic diagram of a system architecture according to an embodiment of this disclosure. The system architecture of this application may include one electronic device and a plurality of signal processing apparatuses. The electronic device is configured to play a noise reduction signal. The electronic device may be a noise reduction headset or another device that plays voices to ears, for example, the electronic device may be glasses with a noise reduction function. The signal processing apparatus is configured to collect a noise signal. The signal processing apparatus may be any signal processing apparatus that supports wireless transmission. For example, the signal processing apparatus may be a mobile phone, a sensor, or a smart television.

In this disclosure, any sound causing interference to a sound that a user wants to listen to is referred to as a noise. For example, when the user is using a headset, any sound causing interference to audio transmitted in the headset is a noise. For example, the noise may be a sound from an ambient environment. The technical solutions provided in this disclosure are applicable to a scenario in which there is one or more noise sources, and in particular, to a scenario in which there are a plurality of noise sources. In this disclosure, a noise source is sometimes referred to as a sound source or an acoustic source. When a difference between the noise source, the sound source, and the acoustic source is not emphasized, the noise source, the sound source, and the acoustic source have a same meaning. As shown in FIG. 4, two sound sources are used as an example to describe the system architecture of this application. One or more signal processing apparatuses may be disposed near one or more sound sources. As shown in FIG. 4, a signal processing apparatus 1 and a signal processing apparatus 2 are deployed near a sound source 1 and a sound source 2. It should be noted that a quantity and positions of deployed signal processing apparatuses are not limited in this disclosure. For example, a plurality of signal processing apparatuses may be deployed around the sound source 1, or a plurality of signal processing apparatuses may be deployed around the sound source 2. The plurality of signal processing apparatuses may be deployed in positions close to the sound sources, or positions of the signal processing apparatuses may be deployed according to an actual requirement of a user. The plurality of signal processing apparatuses transmit collected audio signals to the electronic device through wireless links. After receiving the audio signals from the plurality of collection devices, the electronic device may perform active noise reduction. In this disclosure, a sound wave signal sent by a sound source and received by the signal processing apparatus or the electronic device is sometimes referred to as an acoustic source direct signal, and a signal sent by the signal processing apparatus to the electronic device is referred to as a comprehensive acoustic source description signal. Scenarios to which the technical solutions provided in this disclosure are applicable include but are not limited to an office scenario and a home scenario. For example, in an office scenario, a user wears a noise reduction headset in an office, and a signal processing apparatus is installed at a door of the office or on a window of the office. The signal processing apparatus may be a sensor or the like. In a home scenario, the signal processing apparatus may be any signal processing apparatus supporting wireless transmission at home. For example, the signal processing apparatus may be a television, a home gateway, a smart desk lamp, or a smart doorbell.

The foregoing describes the system architecture and example applicable scenarios provided in this disclosure. The following describes a principle of how the signal processing apparatus and the electronic device cooperate with each other to implement noise reduction. In the technical solutions provided in this disclosure, transfer adjustment and time adjustment need to be performed on the audio signal collected by the signal processing apparatus. Transfer adjustment is performed, so that the noise reduction signal played by the electronic device can have a same or similar signal feature as the audio signal of the noise collected by the electronic device. Time adjustment is performed, so that the noise reduction signal played by the electronic device and the noise audio signal of the noise collected by the electronic device can cancel out each other. This enhances a noise reduction effect. Transfer adjustment may be performed by the signal processing apparatus or the electronic device. Time adjustment may be performed by the signal processing apparatus or the electronic device. The following separately describes whether transfer adjustment is performed by the signal processing apparatus or the electronic device, and whether time adjustment is performed by the signal processing apparatus or the electronic device. In addition, transfer adjustment and time adjustment may be performed based on an actual path or an estimated path. In addition, when receiving signals sent by a plurality of signal processing apparatuses, the electronic device needs to process the received signals sent by the plurality of devices. In addition, the signal processing apparatus may recognize acoustic sources, to separate signals into a plurality of channels of audio signals based on the acoustic sources. This can perform noise reduction processing more accurately. In addition, considering that noise perception is different due to different positions of the two ears, noise reduction processing may be further separately performed for the two ears. This disclosure further describes these specific cases.

Figure 5:
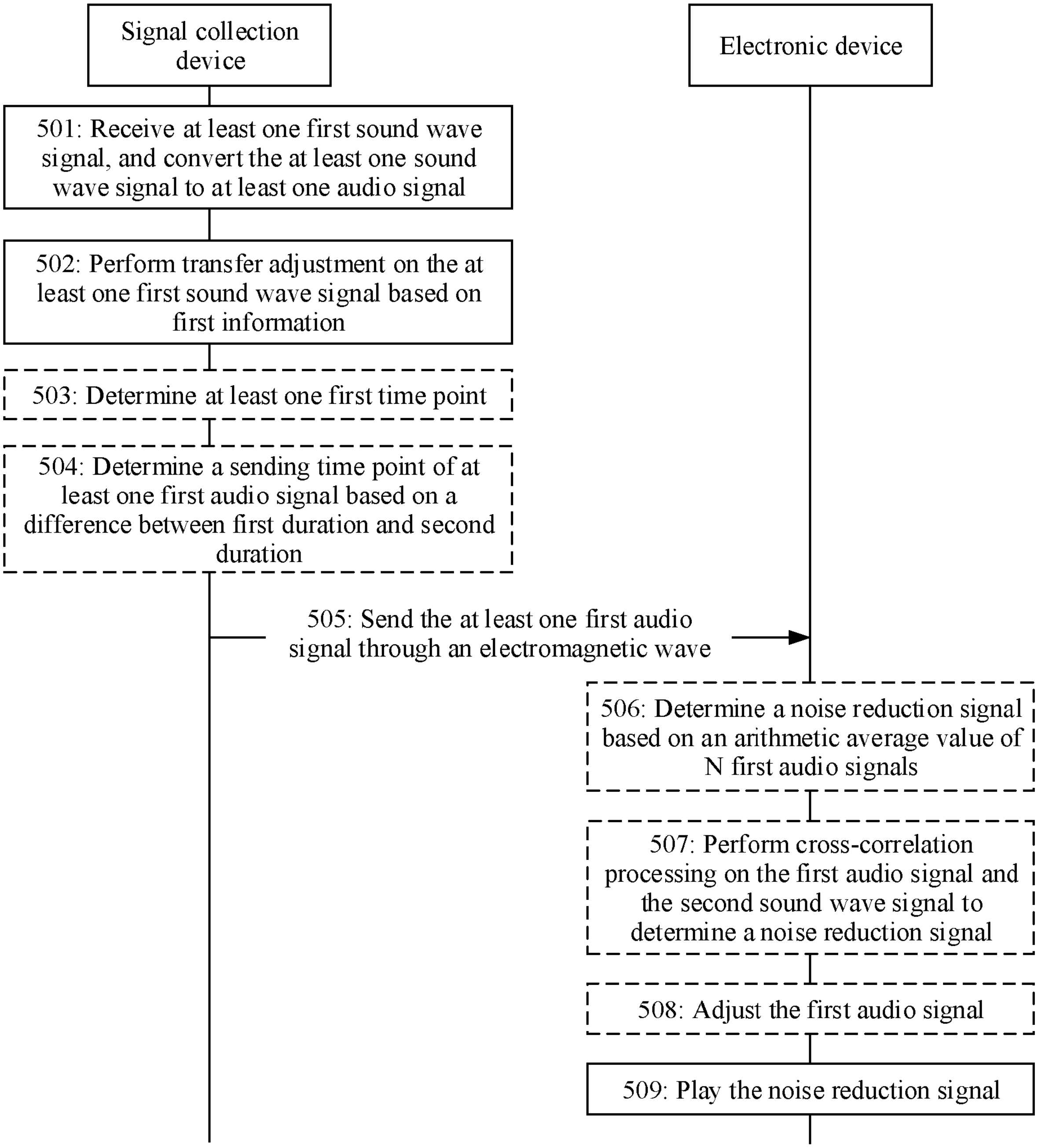
FIG. 5 is a schematic flowchart of an audio signal processing method according to this disclosure.

FIG. 5 is a schematic flowchart of an audio signal processing method provided in this disclosure.

As shown in FIG. 5, the audio signal processing method provided in this disclosure may include the following steps.

501: A signal processing apparatus receives at least one first sound wave signal, and converts the at least one sound wave signal to at least one audio signal.

The signal processing apparatus may receive the first sound wave signal by using a microphone device, or the signal processing apparatus may receive the first sound wave signal by using a microphone array. The microphone array is a system that includes a specific quantity of acoustic sensors (which are usually microphones) and that is configured to sample and process a spatial feature of a sound field. In other words, the microphone array includes a plurality of sensors distributed in space according to a particular topology structure. The microphone may convert a sound wave signal to an audio signal. In this disclosure, the signal processing apparatus converts the received first sound wave signal to the audio signal by using the microphone or the microphone array.

502: The signal processing apparatus performs transfer adjustment on the at least one first sound wave signal based on first information.

The first information includes position information of an electronic device relative to the signal processing apparatus. The signal processing apparatus performs transfer adjustment on the first sound wave signal based on the first information.

In this embodiment of this disclosure, the position information of the electronic device relative to the signal processing apparatus may be obtained in a plurality of manners. All methods for obtaining distances between several devices in a conventional technology can be used in this embodiment of this disclosure. For example, a distance between the electronic device and the signal processing apparatus is pre-specified. In an actual application process, a distance of the electronic device relative to the signal processing apparatus is adjusted based on the pre-specified distance, the distance between the electronic device and the signal processing apparatus may be measured in advance, or a topology relationship between the electronic device and the signal processing apparatus may be obtained according to a positioning method, to obtain the position information of the electronic device relative to the signal processing apparatus. This disclosure protects how to use the position information of the electronic device relative to the signal processing apparatus. How to obtain the position information of the electronic device relative to the signal processing apparatus is not specifically limited in embodiments of this disclosure. The following uses a delay estimation positioning method as an example to describe how the signal processing apparatus performs transfer adjustment on the first sound wave signal based on the first information so that a signal feature of a first audio signal is the same as or close to a signal feature of a second sound wave signal.

Time delay estimation positioning method is a sound source positioning method widely used in the industry. When the signal processing apparatus receives the first sound wave signal by using a vector microphone, or the signal processing apparatus receives the first sound wave signal by using a microphone array, the signal processing apparatus may position a sound source that sends the sound wave signal, or may position the electronic device. The following provides descriptions by using an example in which the signal processing apparatus receives the first sound wave signal by using a microphone array.

Figure 6:
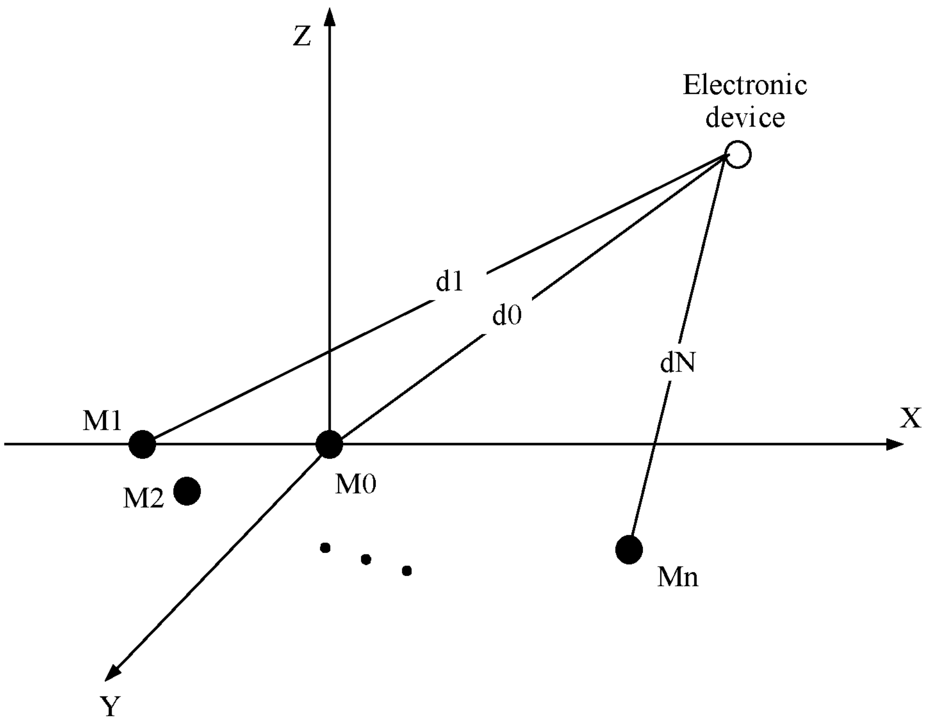
FIG. 6 is a schematic diagram of a sound source positioning method.

The electronic device may send a sound wave signal with a fixed frequency or fixed content at intervals, and the signal processing apparatus receives the sound wave signal by using a microphone matrix. As shown in FIG. 6, M0, M1, M2, . . . , and Mn represent microphones, and the plurality of microphones form a microphone array, where spatial coordinates of an $i^{th}$ microphone may be expressed as $r_i=(x_i, y_i, z_i)$, i=0, 1, . . . , N, and N is a positive integer. Coordinates of the microphone M0 may be considered as the origin of spatial coordinates, that is, $r_0=(0, 0, 0)$. It is assumed that spatial coordinates of the electronic device are $r_d=(x, y, z)$.

In this case, a distance from the electronic device to each microphone satisfies $d_i=\sqrt{(x-x_i)^2+(y-y_i)^2+(z-z_i)^2}$.

Differences between distances from the electronic device to the microphones satisfy $d_{ij}=d_i-d_j$, where i=0, 1, . . . , N, and j=0, 1, . . . , N.

A relative delay between different microphones satisfies $\hat{d}_{ij}=c\tau_{ij}$, where i=0, 1, . . . , N, and j=0, 1, . . . , N; c represents a speed of sound, and the speed of sound in this disclosure is a propagation speed of sound in the air; and $\tau_{ij}$ represents a delay between the $i^{th}$ microphone and a $j^{th}$ microphone.

In the foregoing expressions, a distance between microphones is known, and the speed of sound is also known. An approximate spatial position of the electronic device may be obtained by comprehensively solving the foregoing expressions. It is assumed that spatial coordinates of the electronic device are determined through calculation as $p2=(x_d, y_d, z_d)$. The coordinates of the signal processing apparatus satisfy $p1=(0, 0, 0)$, that is, the signal processing apparatus is set to the origin of the spatial coordinates. Because the coordinates of the electronic device are known, a distance d1 between the signal processing apparatus and the electronic device may be calculated as follows: $d1=\sqrt{(0-x_d)^2+(0-y_d)^2+(0-z_d)^2}$.

In a specific implementation, the first information may be the distance d1 between the signal processing apparatus and the electronic device.

In a specific implementation, the first information may be spatial coordinates of the electronic device and the signal processing apparatus in a same spatial coordinate system.

When a sound wave signal is propagated in the air, amplitude attenuation and phase shift occur. Amplitude attenuation and phase shift are related to a transfer distance of a sound wave. A relationship between the transfer distance of the sound wave, and amplitude attenuation and phase shift belong to the conventional technology. For example, this disclosure provides a method for performing transfer adjustment based on a distance. Transfer adjustment in this disclosure includes amplitude adjustment or phase shift adjustment. In an ideal propagation condition, a relationship between a signal received by a receive end and a signal sent by a transmit end is as follows:

$$x(t)=s(t)*h(t)=as(t-\tau).$$

h(t) represents an impulse response of a linear time-invariant system, a represents amplitude attenuation, and r represents a transmission delay.

A frequency domain expression is as follows:

$$X(\omega)=S(\omega)H(\omega)=S(\omega)G(r,r_0,w).$$

$r_0$ represents a spatial coordinate point of the transmit end, $G(r, r_0, w)$ represents a Green's function, and an expression is as follows:

$$G(r, r_0, \omega) = \frac{e^{jk\|r-r_0\|}}{4\pi\|r-r_0\|}.$$

In a specific implementation, $r-r_0$ represents the distance d1 between the signal processing apparatus and the electronic device. A signal X(ω) obtained after transmission is performed by d1 may be obtained by using a frequency domain function, and then a time-domain signal x(n) may be obtained by transforming the signal X(ω) to a time domain. This process is a process in which the signal processing apparatus performs transfer adjustment on the first sound wave signal based on the first information. To be specific, the signal processing apparatus may learn, based on a value of d1, a signal received by the electronic device after the signal is transmitted by the distance d1, so that the signal processing apparatus may perform transfer adjustment on the first audio signal. It may be understood that the signal processing apparatus predicts, in advance, a signal feature of an audio signal corresponding to a signal that is sent by a sound source and that is received by the electronic device. The prediction may specifically include amplitude prediction and phase prediction. It should be noted that, in this embodiment of this disclosure, transfer adjustment is performed only based on an estimated path. A scenario to which this embodiment of this disclosure is applicable includes but is not limited to a scenario in which a topology node cannot obtain position information of the sound source, or a distance between the sound source and the signal processing apparatus is very short. For example, the signal processing apparatus is deployed at a position of the sound source. In these scenarios, it may be considered that the distance d1 between the signal processing apparatus and the electronic device is a transmission path of the first audio signal, and a signal obtained after the audio signal corresponding to the first sound wave signal is transferred by the distance d1 is used by the electronic device to determine a noise reduction signal.

It should be noted that, in some embodiments, before the signal processing apparatus performs transfer adjustment on the first sound wave signal, the signal processing apparatus may further perform phase inversion processing on the audio signal corresponding to the first sound wave signal, that is, the signal processing apparatus may perform phase inversion processing on the collected audio signal, so that a phase of the first audio signal is opposite to a phase of the collected audio signal. Phase inversion processing may be performed on the collected audio signal in different manners. For example, it is assumed that the audio signal collected by the signal processing apparatus is p1(n). In this case, the signal processing apparatus may directly perform phase inversion on a sampled and quantized audio signal p1(n), that is, invert a phase of a symbol at each sampling point to obtain a phase-inverted signal of p1(n). A complete active noise reduction system may be further deployed on the signal processing apparatus to obtain a phase-inverted signal y(n). The active noise reduction system may be the foregoing feedforward active noise reduction system, feedback active noise reduction system, or integrated active noise reduction system. How to obtain the phase-inverted signal based on the active noise reduction system belongs to the conventional technology, and has been described above. Details are not described herein again.

In a specific implementation, the method may further include 503: The signal processing apparatus determines at least one first time point.

The first time point is a time point at which the signal processing apparatus receives the at least one first sound wave signal.

Corresponding to step 503, the method may further include step 504: The signal processing apparatus determines a sending time point of at least one first audio signal based on a difference between first duration and second duration.

The first duration is determined by the signal processing apparatus based on the first information and the speed of sound, the second duration is a difference between a second time point and the first time point, and the second time point is a time point that is determined by the signal processing apparatus and at which the electronic device receives the first audio signal. For example, it is assumed that the distance between the signal processing apparatus and the electronic device is d1, the time point at which the signal processing apparatus receives the first sound wave signal is T1, and a time point at which the signal processing apparatus determines that the electronic device receives the first audio signal is T2. In this case, the signal processing apparatus performs delay processing on the audio signal corresponding to the first sound wave signal. Delay duration may be $\Delta t = d1/c-(T2-T1)$, where c represents the speed of sound.

In order that when the first audio signal arrives at the electronic device, the electronic device can obtain the noise reduction signal by performing only a small amount of processing, the sending time point of the first audio signal may be adjusted. For example, after the electronic device receives the first audio signal, the electronic device can play the first audio signal after performing only phase inversion processing on the first audio signal. If the signal processing apparatus has performed phase inversion processing on the obtained first sound wave signal so that the phase of the first audio signal is opposite to a phase of the first sound wave signal, the electronic device may directly play the first audio signal after receiving the first audio signal, that is, the first audio signal may be superimposed with and cancel out a noise signal received by the electronic device.

It should be noted that, in some specific application scenarios, if the signal processing apparatus does not perform step 504, the signal processing apparatus may send the first time point to the electronic device, or send the first time point and the first information to the electronic device. The electronic device performs, based on the first time point and the first information, time adjustment on the audio signal received by the electronic device. How the electronic device adjusts the received audio signal based on the first time point and the first information is described in an embodiment corresponding to FIG. 9.

In a specific implementation, if Δt is less than 0, it indicates that the electronic device first receives a sound wave signal sent by a sound source, and then receives the at least one first audio signal sent by the electronic device through an electromagnetic wave. In this case, the electronic device does not learn of a signal feature of a noise in advance. If the noise reduction signal determined by the electronic device based on the received first audio signal cannot achieve a good noise reduction effect, the signal processing apparatus directly discards the first audio signal, without performing delay processing on the first audio signal.

505: The signal processing apparatus sends the at least one first audio signal to the electronic device through an electromagnetic wave.

The first audio signal is used by the electronic device to determine a noise reduction signal, the noise reduction signal is for performing noise reduction processing on a second sound wave signal received by the electronic device, and the second sound wave signal and the first sound wave signal are signals sent by a same sound source. In a specific implementation, the signal processing apparatus may compress the phase-inverted signal in a G.711 manner. A delay needs to be less than or equal to 1 ms, or only 0.125 ms.

In a specific implementation, the signal processing apparatus sends the first audio signal in a wireless manner such as Wi-Fi or Bluetooth, to ensure that a signal carrying a noise feature arrive at the electronic device earlier than a direct signal. The signal carrying the noise feature is the first audio signal, and the direct signal is the second sound wave signal sent by the sound source.

In a specific implementation, if there are a plurality of signal processing apparatuses, each of the plurality of signal processing apparatuses sends a first audio signal to the electronic device. It is assumed that there are N signal processing apparatuses, the electronic device receives N first audio signals. In this scenario, the method may further include 506: The electronic device determines a noise reduction signal based on an arithmetic average value of the N first audio signals. When the N signal processing apparatuses each send a first audio signal to the electronic device, where N is a positive integer, the electronic device receives N first audio signals. The N first audio signals may be obtained by processing, by different signal processing apparatuses, sound wave signals sent by one sound source, or the N first audio signals may be obtained by processing, by different signal processing apparatuses, sound wave signals sent by sound sources in different positions. The electronic device may determine, based on information (for example, second information in an implementation of this application) that is related to a sound source position and that is sent by the different signal processing apparatuses, whether the first audio signals are for the same sound source. It is assumed that the first audio signals are for the same sound source. For example, M first audio signals are for a first sound source. That is, M signal processing apparatuses each process a received sound wave signal sent by the first sound source, to obtain a first audio signal; and send the first audio signal to the electronic device. In this case, the electronic device determines an arithmetic average value of the first audio signals sent by the M signal processing apparatuses. It should be noted that, if the M signal processing apparatuses can separate sound sources (an acoustic source separation technology is described below), the M signal processing apparatuses may send a plurality of first audio signals to the electronic device. Each of the plurality of first audio signals may be obtained by processing, by the signal processing apparatus, received sound wave signals sent by different sound sources. When receiving a plurality of first audio signals, the electronic device may calculate an arithmetic average value of first audio signals obtained through processing for a same sound source, and may finally obtain a plurality of arithmetic average values. Each of the plurality of arithmetic average values may be considered as a noise reduction signal, and the electronic device may directly play the noise reduction signal or play a noise reduction signal determined based on each of the plurality of arithmetic average values. If P first audio signals in the received N first audio signals are for different sound sources, and no other first audio signals in the N first audio signals are for a same sound source as the P first audio signals, the electronic device may directly play the first audio signal or play a noise reduction signal determined based on any one of the P first audio signals, where P is an integer. In other words, in a scenario with a plurality of sound sources, when the electronic device processes first audio signals, if the electronic device determines that the received first audio signals are signals obtained by processing signals for different sound sources by the signal processing apparatus, the electronic device determines only an arithmetic average value of first audio signals for a same sound source, without calculating an arithmetic average value of the plurality of received first audio signals.

In a specific implementation, the method may further include 507: The electronic device performs cross-correlation processing on the first audio signal and the second sound wave signal to determine a noise reduction signal.

A cross-correlation function represents a degree of correlation between two time sequences, that is, describes a degree of correlation between values of two signals at any two different time points. The two signals may be aligned in time by performing cross-correlation processing on the two signals. For example, a noise reduction effect may be further optimized by performing cross-correlation processing on the sound wave signal received by the electronic device and an electromagnetic wave signal received by the electronic device. It is assumed that the sound wave signal received by the electronic device is p2(n). In this case, the electronic device performs cross-correlation processing on p2(n) and the first audio signal received by the electronic device:

$$R(t)=p2(n)*p1_c^t(n-t).$$

$p1_c^t(n)$ represents the first audio signal, and records Δt corresponding to a minimum value of R(t) in the foregoing formula, Δt represents a delay value. $p1_c^t(n)$ is delayed by duration of Δt to obtain a signal $p1_{c\Delta t}^t(n)$, where the signal is a phase-inverted signal aligned with p2(n) in time.

In a specific implementation, the method may further include 508: The electronic device adjusts the first audio signal.

Figure 7:
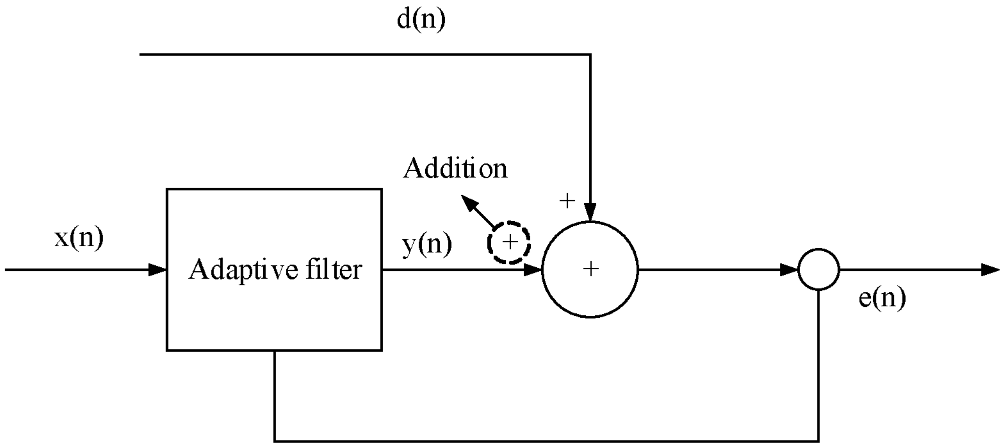
FIG. 7 is a schematic diagram of a structure of determining a noise reduction signal according to an embodiment of this disclosure.

An error sensor may be deployed on the electronic device to collect an error signal e(n). A principle of calculating the required phase-inverted signal y(n) according to the FxLMS criterion has been described above. In the foregoing expression for calculating the required phase-inverted signal y(n) according to the FxLMS criterion, the reference signal x(n) is a collected external noise. In this embodiment, the first audio signal is used as the reference signal x(n). x(n) is an initial phase-inverted signal. FIG. 7 is a schematic diagram of a structure of determining a noise reduction signal according to an embodiment of this disclosure. Therefore, in the foregoing formula, "−" in e(n)=d(n)−y(n) is changed to "+". Details are as follows:

$$y(n)=w^T(n)\times(n)$$

$$e(n)=d(n)+y(n)$$

$$w(n+1)=w(n)+ue(n)\times(n).$$

Prediction is performed continuously based on e(n) and x(n) to obtain y(n), so as to minimize e(n).

In a specific implementation, alternatively, the first audio signal and a sound wave signal that is sent by a sound source and received by the electronic device and may be superimposed, and a superimposed signal is used as the reference signal x(n).

509: The electronic device plays the noise reduction signal.

After obtaining the final noise reduction signal, the electronic device may play the noise reduction signal by using a speaker of the electronic device, to implement an active noise reduction function. The noise reduction signal is for cancelling out the sound wave signal sent by the sound source and received by the electronic device.

It can be learned from the embodiment corresponding to FIG. 5 that the signal processing apparatus may perform transfer adjustment on the collected audio signal, the signal processing apparatus may further perform time adjustment on the collected audio signal, to obtain the first audio signal. The signal processing apparatus may send the first audio signal to the electronic device through the electromagnetic wave, so that the electronic device can determine, based on the first audio signal, the noise reduction signal meeting a noise reduction condition. This enhances a noise reduction effect.

In the embodiment corresponding to FIG. 5, the signal processing apparatus performs transfer adjustment and time adjustment on the first audio signal based on the distance between the signal processing apparatus and the electronic device. However, in some scenarios, the signal processing apparatus may be at a specific distance from the sound source. In such a scenario, if the first audio signal is still processed based on the distance between the signal processing apparatus and the electronic device, accuracy of noise reduction may be affected. An audio signal or a noise signal actually collected by the electronic device is an audio signal corresponding to a sound wave signal sent from a sound source and transmitted by a distance d3, where the distance d3 is a distance between the sound source and the electronic device. It is assumed that a signal collected by the signal processing apparatus is p1(n), a signal corresponding to a sound wave signal sent by the sound source to the electronic device is p2(n), and a difference between transmission distances of the two signals is Δd=d3−d2, where d2 represents a distance between the sound source and the signal processing apparatus. The distance between the sound source and the signal processing apparatus and the distance between the sound source and the electronic device may be measured in advance or preset, or may be obtained according to a positioning method. For example, a position relationship between the signal processing apparatus and the sound source may be determined according to the foregoing delay estimation positioning method. It is assumed that spatial coordinates of the sound source are $s=(x_s, y_s, z_s)$. In this case, the distance d2 between the signal processing apparatus and the sound source may be further determined:

$$d2=\sqrt{(0-x_s)^2+(0-y_s)^2+(0-z_s)^2}.$$

A distance d3 between the sound source and the electronic device may be further determined:

$$d3=\sqrt{(x_d-x_s)^2+(y_d-y_x)^2+(z_d-z_x)^2}.$$

According to the foregoing analysis, in some embodiments, to achieve a better noise reduction effect, the first sound wave signal may be processed based on the first information and the second information to obtain the first audio signal. The second information is position information of the sound source relative to the signal processing apparatus. The following describes this implementation.

Figure 8:
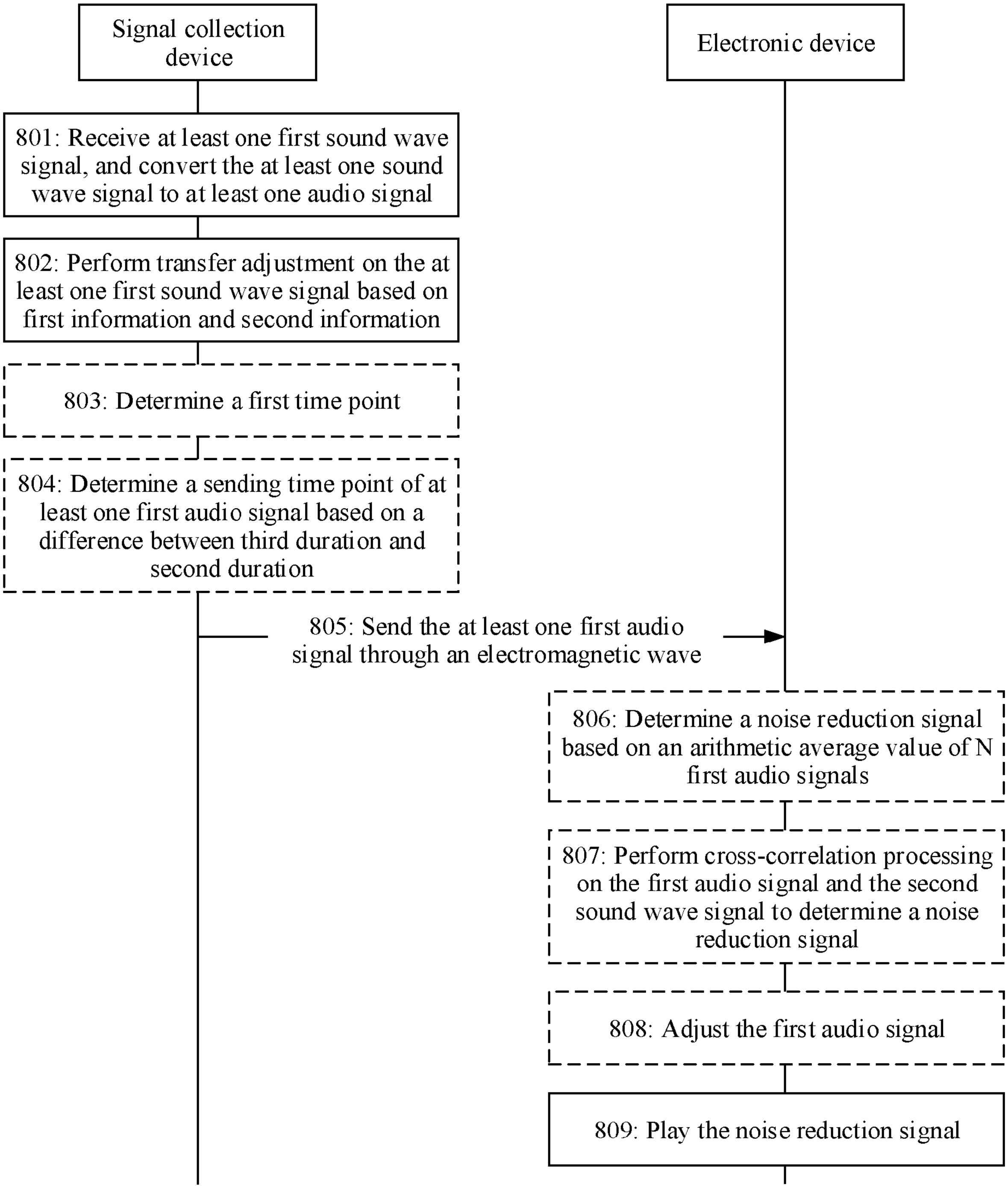
FIG. 8 is a schematic flowchart of another audio signal processing method according to this disclosure.

FIG. 8 is a schematic flowchart of an audio signal processing method provided in this disclosure.

As shown in FIG. 8, the audio signal processing method provided in this disclosure may include the following steps.

801: A signal processing apparatus receives at least one first sound wave signal, and converts the at least one sound wave signal to at least one audio signal.

Step 801 may be understood with reference to step 501 in the embodiment corresponding to FIG. 5. Details are not described herein again.

802: The signal processing apparatus performs transfer adjustment on the at least one first sound wave signal based on first information and second information.

The first information may be understood with reference to descriptions about the first information in the embodiment corresponding to FIG. 5. Details are not described herein again. The second information is position information of a sound source relative to the signal processing apparatus. In this embodiment of this disclosure, the position information of the sound source relative to the signal processing apparatus may be obtained in a plurality of manners. All methods for obtaining distances between several devices in the conventional technology can be used in this embodiment of this disclosure. For example, a distance between the sound source and the signal processing apparatus is pre-specified. In an actual application process, a distance of the sound source relative to the signal processing apparatus is adjusted based on the pre-specified distance, the distance between the sound source and the signal processing apparatus may be measured in advance, or a topology relationship between the sound source and the signal processing apparatus may be obtained according to a positioning method, to obtain position information of the electronic device relative to the signal processing apparatus.

In a specific implementation, the second information may be a distance d2 between the sound source and the signal processing apparatus.

In a specific implementation, the second information may be spatial coordinates of the sound source and the signal processing apparatus in a same spatial coordinate system.

As described in the embodiment corresponding to FIG. 5, when a sound wave signal is propagated in the air, amplitude attenuation and phase shift occur. Amplitude attenuation and phase shift are related to a transfer distance of a sound wave. In an ideal propagation condition, a relationship between a signal received by a receive end and a signal sent by a transmit end is as follows:

$$x(t)=s(t)*h(t)=as(t-\tau).$$

h(t) represents an impulse response of a linear time-invariant system, a represents amplitude attenuation, and τ represents a transmission delay.

A frequency domain expression is as follows:

$$X(\omega)=S(\omega)H(\omega)=S(\omega)G(r,r_0,w).$$

r0 represents a spatial coordinate point of the transmit end, $G(r, r_0, w)$ represents a Green's function, and an expression is as follows:

$$G(r, r_0, \omega) = \frac{e^{jk\|r-r_0\|}}{4\pi\|r-r_0\|}.$$

In this embodiment of this disclosure, r−r0 is Δd, and Δd=d3−d2. How to determine values of d3 and d2 has been described above. Details are not described herein again. A signal X(ω) obtained after transmission is performed by Δd may be obtained by using a frequency domain function, and then a time-domain signal x(n) may be obtained by transforming the signal X(ω) to a time domain. This process is a process in which the signal processing apparatus performs transfer adjustment on the first sound wave signal based on the first information and the second information.

In a specific implementation, the method may further include 803: The signal processing apparatus determines a first time point.

The first time point is a time point at which the signal processing apparatus receives the first sound wave signal.

Corresponding to step 803, the method may further include step 804: The signal processing apparatus determines a sending time point of at least one first audio signal based on a difference between third duration and second duration.

The third duration is a ratio of a difference between a first distance and a second distance to a speed of sound, the second duration is a difference between a second time point and the first time point, and the second time point is a time point that is determined by the signal processing apparatus and at which the electronic device receives the first audio signal. For example, it is assumed that the distance between the signal processing apparatus and the sound source is d2, a distance between the sound source and the electronic device is d3, a time point at which the signal processing apparatus receives the first sound wave signal is T1, and the signal processing apparatus determines that a time point at which the electronic device receives the first audio signal is T2. In this case, the signal processing apparatus performs delay processing on the audio signal corresponding to the first sound wave signal. Delay duration may be $\Delta t=(d3-d2)/c-(T2-T1)$, where c represents the speed of sound.

In order that when the first audio signal arrives at the electronic device, the electronic device can obtain the noise reduction signal by performing only a small amount of processing, the sending time point of the first audio signal may be adjusted. For example, after the electronic device receives the first audio signal, the electronic device can play the first audio signal after performing only phase inversion processing on the first audio signal. If the signal processing apparatus has performed phase inversion processing on the obtained first sound wave signal so that a phase of the first audio signal is opposite to a phase of the first sound wave signal, the electronic device may directly play the first audio signal after receiving the first audio signal, that is, the first audio signal may be superimposed with and cancel out a noise signal received by the electronic device.

It should be noted that, in some specific application scenarios, if the signal processing apparatus does not perform step 804, the signal processing apparatus may send the first time point to the electronic device, or send the first time point, the first information, and the second information to the electronic device. The electronic device performs, based on the first time point, the first information, and the second information, time adjustment on the audio signal received by the electronic device. How the electronic device adjusts the received audio signal based on the first time point, the first information, and the second information is described in the embodiment corresponding to FIG. 9.

It should be noted that, if the signal processing apparatus performs phase inversion processing on the audio signal corresponding to the first sound wave signal, that is, if the signal processing apparatus performs phase inversion processing on a collected audio signal so that the phase of the first audio signal is opposite to a phase of the collected audio signal, there may be different manners. For example, it is assumed that the audio signal collected by the signal processing apparatus is p1(n). In this case, the signal processing apparatus may directly perform phase inversion on a sampled and quantized audio signal p1(n), that is, invert a phase of a symbol at each sampling point, to obtain a phase-inverted signal of p1(n). A complete active noise reduction system may be further deployed on the signal processing apparatus to obtain a phase-inverted signal y(n). The active noise reduction system may be the foregoing feedforward active noise reduction system, feedback active noise reduction system, or integrated active noise reduction system. How to obtain the phase-inverted signal based on the active noise reduction system belongs to the conventional technology, and has been described above. Details are not described herein again.

In a specific implementation, if Δt is less than 0, it indicates that the electronic device first receives a sound wave signal sent by a sound source, and then receives the at least one first audio signal sent by the electronic device through an electromagnetic wave. In this case, the electronic device does not learn of a signal feature of a noise in advance. If the noise reduction signal determined by the electronic device based on the received first audio signal cannot achieve a good noise reduction effect, the signal processing apparatus directly discards the first audio signal, without performing delay processing on the first audio signal.

805: The signal processing apparatus sends the at least one first audio signal to the electronic device through an electromagnetic wave.

Step 805 may be understood with reference to step 505 in the embodiment corresponding to FIG. 5. Details are not described herein again.

In a specific implementation, the method may further include 806: The electronic device determines a noise reduction signal based on an arithmetic average value of N first audio signals. Step 806 may be understood with reference to step 506 in the embodiment corresponding to FIG. 5. Details are not described herein again.

In a specific implementation, the method may further include 807: The electronic device performs cross-correlation processing on the first audio signal and the second sound wave signal to determine a noise reduction signal.

Step 807 may be understood with reference to step 507 in the embodiment corresponding to FIG. 5. Details are not described herein again.

In a specific implementation, the method may further include 808: The signal processing apparatus adjusts the first audio signal.

Step 808 may be understood with reference to step 508 in the embodiment corresponding to FIG. 5. Details are not described herein again.

809: The electronic device plays the noise reduction signal.

Step 809 may be understood with reference to step 509 in the embodiment corresponding to FIG. 5. Details are not described herein again.

It can be learned from the embodiment corresponding to FIG. 8 that the signal processing apparatus may perform transfer adjustment and time adjustment on the first audio signal based on an actual path for transferring the sound wave signal, that is, a difference between d3 and d2, to obtain the first audio signal. The signal processing apparatus may send the first audio signal to the electronic device through the electromagnetic wave, so that the electronic device can determine, based on the first audio signal, the noise reduction signal meeting a noise reduction condition. This further enhances a noise reduction effect.

In the embodiments corresponding to FIG. 5 and FIG. 8, the signal processing apparatus performs transfer adjustment and time adjustment on the collected audio signal. In some implementations, the signal processing apparatus may alternatively send the collected audio signal to the electronic device, and the electronic device performs transfer adjustment and time adjustment on the received audio signal. The following describes a case in which the electronic device performs transfer adjustment and time adjustment on the received audio signal sent by the signal processing apparatus.

Figure 9:
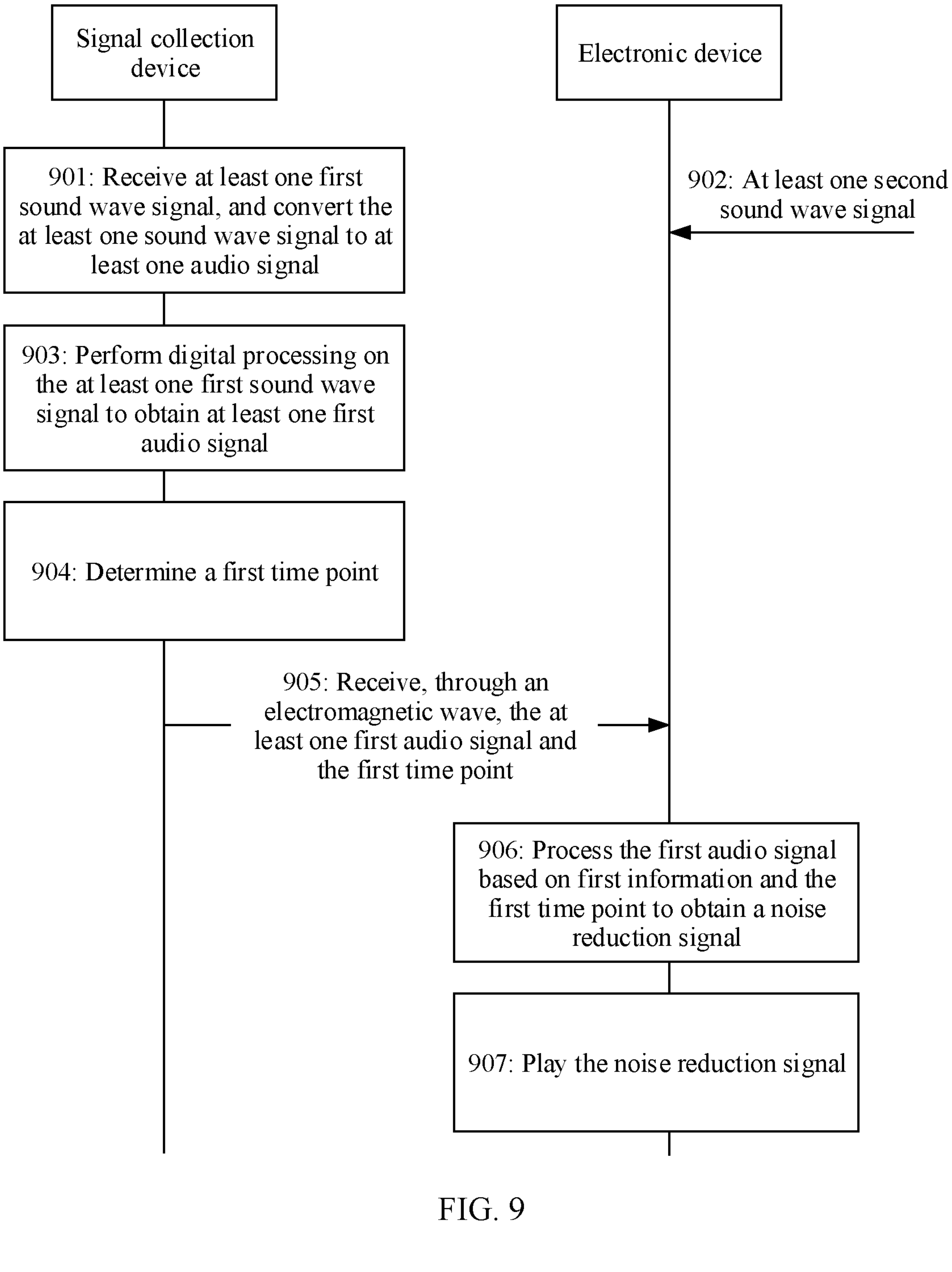
FIG. 9 is a schematic flowchart of another audio signal processing method according to this disclosure.

FIG. 9 is a schematic flowchart of an audio signal processing method provided in this disclosure.

As shown in FIG. 9, the audio signal processing method provided in this disclosure may include the following steps.

901: A signal processing apparatus receives at least one first sound wave signal, and converts the at least one sound wave signal to at least one audio signal.

Step 901 may be understood with reference to step 501 in the embodiment corresponding to FIG. 5. Details are not described herein again.

902: An electronic device receives at least one second sound wave signal.

The electronic device may receive the second sound wave signal by using a microphone device, or the electronic device may receive the second sound wave signal by using a microphone array. In this application, the electronic device converts the received second sound wave signal to an audio signal by using the microphone or the microphone array.

903: The signal processing apparatus performs digital processing on the at least one first sound wave signal to obtain at least one first audio signal.

904: The signal processing apparatus determines a first time point, where the first time point is a time point at which the signal processing apparatus receives the at least one first sound wave signal.

905: The electronic device receives, through an electromagnetic wave, the at least one first audio signal and the first time point that are sent by the signal processing apparatus.

The first audio signal is a signal obtained by performing digital processing on the received first sound wave signal by the signal processing apparatus, the first sound wave signal and the second sound wave signal are signals sent by a same sound source, and the first time point is a time point at which the signal processing apparatus receives the first sound wave signal.

906: The electronic device processes the first audio signal based on first information and the first time point to obtain a noise reduction signal.

The first information includes position information of the electronic device relative to the signal processing apparatus. The noise reduction signal is for performing noise reduction processing on the second sound wave signal received by the electronic device.

In a specific implementation, the electronic device processes the first audio signal based on a difference between first duration and second duration, to determine a time point for playing the noise reduction signal. The first duration is determined by the electronic device based on the first information and a speed of sound, the second duration is a difference between a second time point and the first time point, and the second time point is a time point at which the electronic device receives the first audio signal. For example, it is assumed that a distance between the signal processing apparatus and the electronic device is d1, a time point at which the signal processing apparatus receives the first sound wave signal is T1, and a time point at which the electronic device receives the first audio signal is T2. In this case, the signal processing apparatus performs delay processing on the first audio signal. Delay duration may be $\Delta t = d1/c-(T2-T1)$, where c represents the speed of sound. In this implementation and the following implementations, the first information may be information prestored in the electronic device, or the first information may be sent by the signal processing apparatus to the electronic device. Specifically, the signal processing apparatus may send d1 to the electronic device; or the signal processing apparatus may send spatial coordinates, determined by the signal processing apparatus, of the signal processing apparatus and the electronic device in a same coordinate system. Alternatively, the first information may be obtained by the electronic device through measurement. For example, a vector audio collection manner may be configured on the electronic device to position the signal processing apparatus. The vector collection manner includes two methods: According to one method, a microphone array is deployed on the electronic device to perform vector collection. According to the other method, after another electronic device transmits scalar audio signals to the electronic device, the electronic device combines these audio signals and scalar audio signals collected by the electronic device into a virtual microphone array to perform vector collection. Obtaining distances between several devices according to a positioning method has been described in the embodiment corresponding to FIG. 5. Details are not described herein again.

In a specific implementation, the electronic device processes the first audio signal based on a difference between first duration and second duration, to determine a time point for playing the noise reduction signal. The first duration is determined by the electronic device based on the first information and a speed of sound, the second duration is a difference between a second time point and the first time point, and the second time point is a time point at which the electronic device receives the first audio signal.

The electronic device performs transfer adjustment on the first audio signal based on the first information. As described above, when a sound wave signal is propagated in the air, amplitude attenuation and phase shift occur. Amplitude attenuation and phase shift are related to a transfer distance of a sound wave. The electronic device performs transfer adjustment on the first audio signal based on the first information.

In a specific implementation, when the first duration is greater than the second duration, the electronic device processes the first audio signal based on the difference between the first duration and the second duration, to determine the time point for playing the noise reduction signal. In other words, when the first duration is less than the second duration, it indicates that the electronic device first receives a sound wave signal sent by a sound source, and then receives the at least one first audio signal sent by the electronic device through the electromagnetic wave. In this case, the electronic device does not learn of a signal feature of a noise in advance. If the noise reduction signal determined by the electronic device based on the received first audio signal cannot achieve a good noise reduction effect, the electronic device directly discards the first audio signal, without performing delay processing on the first audio signal.

In a specific implementation, the electronic device determines a first distance and a second distance based on the first information and second information. The second information is position information of the sound source relative to the signal processing apparatus, the first distance is a distance between the sound source and the electronic device, and the second distance is a distance between the sound source and the signal processing apparatus.

The electronic device processes the first audio signal based on a difference between third duration and second duration, to determine a time point for playing the noise reduction signal. The third duration is a ratio of a difference between the first distance and the second distance to a speed of sound, the second duration is a difference between a second time point and the first time point, and the second time point is a time point at which the electronic device receives the first audio signal. For example, it is assumed that the distance between the signal processing apparatus and the sound source is d2, the distance between the sound source and the electronic device is d3, a time point at which the signal processing apparatus receives the first sound wave signal is T1, and a time point at which the electronic device receives the first audio signal is T2. In this case, the electronic device performs delay processing on the first audio signal. Delay duration may be $\Delta t=(d3-d2)/c-(T2-T1)$, where c represents the speed of sound. In this embodiment of this disclosure, the second information may be prestored in the electronic device, or the second information may be sent by the signal processing apparatus to the electronic device. Specifically, the second information may be the distance between the sound source and the signal processing apparatus; or the second information may be spatial coordinates, determined by the signal processing apparatus, of the sound source and the signal processing apparatus in a same spatial coordinate system. Alternatively, the second information may be obtained by the electronic device through measurement. For example, a vector audio collection manner may be configured on the electronic device to position the sound source. The vector collection manner includes two methods: According to one method, a microphone array is deployed on the electronic device to perform vector collection. According to the other method, after another electronic device transmits scalar audio signals to the electronic device, the electronic device combines these audio signals and scalar audio signals collected by the electronic device into a virtual microphone array to perform vector collection. Obtaining distances between several devices according to a positioning method has been described in the embodiment corresponding to FIG. 5. Details are not described herein again.

In a specific implementation, the electronic device processes the first audio signal based on a difference between third duration and second duration, to determine a time point for playing the noise reduction signal. The third duration is a ratio of a difference between a first distance and a second distance to a speed of sound, the second duration is a difference between a second time point and the first time point, the second time point is a time point at which the electronic device receives the first audio signal, the first distance is a distance between a sound source and the electronic device, and the second distance is a distance between the sound source and the signal processing apparatus.

The electronic device determines the first distance and the second distance based on the first information and second information. The first distance is the distance between the sound source and the electronic device, the second distance is the distance between the sound source and the signal processing apparatus, and the second information is position information of the sound source relative to the signal processing apparatus.

The electronic device performs transfer adjustment on the first audio signal based on the difference between the first distance and the second distance. As described above, when a sound wave signal is propagated in the air, amplitude attenuation and phase shift occur. Amplitude attenuation and phase shift are related to a transfer distance of a sound wave. In an ideal propagation condition, a relationship between a signal received by a receive end and a signal sent by a transmit end is as follows:

$$x(t)=s(t)*h(t)=as(t-\tau).$$

h(t) represents an impulse response of a linear time-invariant system, a represents amplitude attenuation, and $\tau$ represents a transmission delay.

A frequency domain expression is as follows:

$$X(\omega)=S(\omega)H(\omega)=S(\omega)G(r,r_0,w).$$

r0 represents a spatial coordinate point of the transmit end, G(r, r0, w) represents a Green's function, and an expression is as follows:

$$G(r, r_0, \omega) = \frac{e^{jk\|r-r_0\|}}{4\pi\|r-r_0\|}.$$

In this embodiment of this disclosure, r−r0 is Δd, and Δd=d3−d2. How to determine values of d3 and d2 has been described above. Details are not described herein again. A signal X(ω) obtained after transmission is performed by Δd may be obtained by using a frequency domain function, and then a time-domain signal x(n) may be obtained by transforming the signal X(ω) to a time domain. This process is a process in which the electronic device performs transfer adjustment on the first audio signal based on the difference between the first distance and the second distance.

In a specific implementation, when the third duration is greater than the second duration, the electronic device processes the first audio signal based on the difference between the third duration and the second duration, to determine the time point for playing the noise reduction signal. In other words, when the third duration is less than the second duration, it indicates that the electronic device first receives a sound wave signal sent by the sound source, and then receives the at least one first audio signal sent by the electronic device through the electromagnetic wave. In this case, the electronic device does not learn of a signal feature of a noise in advance. If the noise reduction signal determined by the electronic device based on the received first audio signal cannot achieve a good noise reduction effect, the electronic device directly discards the first audio signal, without performing delay processing on the first audio signal.

In a specific implementation, the electronic device may further perform cross-correlation processing on the second sound wave signal and the first audio signal that is processed based on the first information and the first time point, to determine the noise reduction signal.

In a specific implementation, the electronic device determines the noise reduction signal based on an arithmetic average value of first audio signals. When N signal processing apparatuses each send a first audio signal to the electronic device, where N is a positive integer, the electronic device receives N first audio signals. The N first audio signals may be obtained by processing, by different signal processing apparatuses, sound wave signals sent by one sound source, or the N first audio signals may be obtained by processing, by different signal processing apparatuses, sound wave signals sent by sound sources in different positions. The electronic device may determine, based on information (for example, second information in an implementation of this disclosure) that is related to a sound source position and that is sent by the different signal processing apparatuses, whether the first audio signals are for the same sound source. It is assumed that the first audio signals are for the same sound source. For example, M first audio signals are for a first sound source. That is, M signal processing apparatuses each process a received sound wave signal sent by the first sound source, to obtain a first audio signal; and send the first audio signal to the electronic device. In this case, the electronic device determines an arithmetic average value of the first audio signals sent by the M signal processing apparatuses. It should be noted that, if the M signal processing apparatuses can separate sound sources (an acoustic source separation technology is described below), the M signal processing apparatuses may send a plurality of first audio signals to the electronic device. Each of the plurality of first audio signals may be obtained by processing, by the signal processing apparatus, received sound wave signals sent by different sound sources. When receiving a plurality of first audio signals, the electronic device may calculate an arithmetic average value of first audio signals obtained through processing for a same sound source, and may finally obtain a plurality of arithmetic average values. Each of the plurality of arithmetic average values may be considered as a noise reduction signal, and the electronic device may directly play the noise reduction signal.

In a specific implementation, if the signal processing apparatus does not perform phase inversion processing on the collected audio signal, the electronic device further needs to perform phase inversion processing on the first audio signal after receiving the first audio signal sent by the signal processing apparatus. For example, the electronic device may directly perform phase inversion on the first audio signal, that is, invert a phase of a symbol at each sampling point to obtain a phase-inverted signal of the first audio signal. Alternatively, a complete active noise reduction system may be deployed on the electronic device to obtain the phase-inverted signal. The active noise reduction system may be the foregoing feedforward active noise reduction system, feedback active noise reduction system, or integrated active noise reduction system. How to obtain the phase-inverted signal based on the active noise reduction system belongs to the conventional technology, and has been described above. Details are not described herein again.

In a specific implementation, the electronic device may further adjust the first audio signal. This can be understood with reference to step 508 in the embodiment corresponding to FIG. 5. Details are not described herein again.

907: The electronic device plays the noise reduction signal.

Step 906 may be understood with reference to step 509 in the embodiment corresponding to FIG. 5. Details are not described herein again.

It can be learned from the embodiment corresponding to FIG. 9 that, after collecting the first audio signal, the signal processing apparatus sends the first audio signal and the time point at which the first audio signal is received to the electronic device, without processing the first audio signal; and the electronic device processes the received first audio signal, to obtain the noise reduction signal meeting a condition.

In the embodiments corresponding to FIG. 5, FIG. 8, and FIG. 9, the signal processing apparatus may perform transfer adjustment, may perform time adjustment, or may perform neither transfer adjustment nor time adjustment, and only send the collected audio signal to the electronic device, so that the electronic device processes the audio signal to obtain the noise reduction signal. In some specific application scenarios, if there are N signal processing apparatuses, after collecting an audio signal, each of the signal processing apparatuses may flexibly select a signal processing manner based on a processing capability of the signal processing apparatus, for example, whether to perform phase inversion processing, whether to perform time adjustment on the audio signal, or whether to perform transfer adjustment on the audio signal. After receiving audio signals sent by all of the signal processing apparatuses, the electronic device processes a summarized audio signal based on processing degrees of the received signals, and determines a noise reduction signal.

There may be more than one sound source in the embodiments corresponding to FIG. 5, FIG. 8, and FIG. 9. In the scenario shown in FIG. 4, for example, a schematic diagram of a scenario in which there are two sound sources is provided. A example application scenario of the solution may be understood with reference to FIG. 4. It should be noted that two sound sources do not represent a limitation on a quantity, and the quantity of sound sources is not limited in this disclosure. When there is more than one sound source, acoustic source recognition (which may also be referred to as sound source recognition) may be performed to provide more accurate noise reduction processing. To be specific, the signal processing apparatus may separate collected audio signals into a plurality of channels of audio signals based on sound sources, and then process the plurality of recognizable sound sources.

All sound source extraction and separation technologies in the conventional technology can be used in embodiments of this disclosure. The following provides a sound source extraction and separation method.

N independent sound sources and M microphones are disposed. The M microphones may be deployed on a signal processing apparatus, or may be deployed on an electronic device. It is assumed that a sound source vector is as follows:

$$s(n)=[s_1(n), \ldots, s_N(n)]^T,$$

an observation vector x(n) satisfies $x(n)=[x_1(n), \ldots, x_N(n)]^T$, and a length of a hybrid filter is P. In this case, a convolutional mixing process may be expressed as follows:

$$x(n) = H(n) * s(n) = \sum_{P=0}^{P-1} H(p)s(n-p).$$

A hybrid network H(n) is an M×N matrix sequence and includes an impulse response of the hybrid filter. It is assumed that a length of a separation filter is L, and an estimated sound source vector y(n) satisfies $y(n)=[y_1(n), \ldots, y_N(n)]^T$. In this case, an expression of y(n) is as follows:

$$y(n) = W(n) * x(n) = \sum_{l-0}^{L-1} W(l) \times (n-1).$$

A separation network W(n) is an N×M matrix sequence and includes an impulse response of the separation filter, and "*" represents a matrix convolution operation.

The separation network W(n) may be obtained according to a frequency-domain blind source separation algorithm. Time-domain convolution is transformed to a frequency-domain product through an L-point short-time Fourier transform (short-time Fourier transform, STFT), that is, $$X(m,f)=H(f)S(m,f)$$

$$Y(m,f)=W(f)X(m,f).$$

m is obtained by performing L-point down-sampling on a time index value n, X(m,f) and Y(m,f) are obtained by performing an STFT on x(n) and y(n) respectively, and H(f)

and W(f) are Fourier transform forms of H(n) and W(n), where $f \in [f_0, \ldots, f_{L/2}]$, and f represents a frequency.

Y(m,f) obtained through blind source separation is inversely transformed back to a time domain, to obtain estimated sound source signals $y_1(n), \ldots,$ and $y_N(n)$.

In scenarios with a plurality of noise sources, the signal processing apparatus may separate collected audio signals into a plurality of channels of audio signals based on an acoustic source separation technology, and then process each channel of audio signal according to the embodiments corresponding to FIG. 5, FIG. 8, and FIG. 9, to provide more accurate noise reduction processing.

In particular, in addition to a scenario in which there are really a plurality of sound sources, the scenarios with the plurality of sound sources mentioned in this embodiment also include a scenario with a plurality of transmission paths in each sound source (for example, reflection of a sound wave by a wall in a room). In this scenario, these reflection paths may be considered as virtual sound sources, the virtual sound sources have directions different from a direction of an initial sound source, and are positions of specific reflection points. However, the reflection points may be considered as positions of the virtual sound sources, and are processed as independent sound sources. This is also a scenario with a plurality of sound sources. A recognition method for the sound source may be the same as the algorithm in this embodiment.

In a specific implementation, when the electronic device is for dual-ear playback, for example, the electronic device is a noise reduction headset, considering that noise perception is different due to different positions of two ears, noise reduction processing may be further separately performed for the two ears in this application. The following describes this case.

Perception of a person for a spatial orientation of a sound: A spatial sound source is transferred to two ears of the person over the air. Phases at sound wave frequencies and sound pressure of sound waves heard by the left ear and the right ear of the person both are different because distances and orientations at which the sound wave arrives at the two ears both are different. Perception of the person for a spatial direction and a distance of audio is formed based on the information.

A head-related transfer function (head-related transfer function, HRTF) describes a scattering effect of the head, pinnae, and the like on a sound wave, and an interaural time difference (interaural time difference, ITD) and an interaural level difference (interaural level difference, ILD) that result from the scattering effect, and reflects a process of transmitting the sound wave from a sound source to the two ears. A human auditory system compares the ITD with past auditory experience to precisely position the sound source. A signal processing method is used for virtual sound based on the HRTF to simulate and retransmit sound space information. In this way, a subjective space sense of a sound is reproduced for a listener.

That is, a binaural HRTF function essentially includes spatial orientation information, and HRTF functions for different spatial orientations are totally different. Common audio information of any single audio channel is convolved by using binaural HRTF functions of corresponding spatial positions separately to obtain audio information corresponding to the two ears. 3D audio can be experienced by playing the audio information by using a headset. Therefore, the HRTF function actually includes spatial information, and represents a function of transferring the sound wave from spatially different sound sources to the two ears.

The HRTF function is a frequency domain function. An expression of the HRTF function in time domain is referred to as a head-related impulse response (head-related impulse response, HRIR) or a binaural impulse response. The HRIR and the head-related transfer function HRTF function are a Fourier transform pair.

Figure 10:
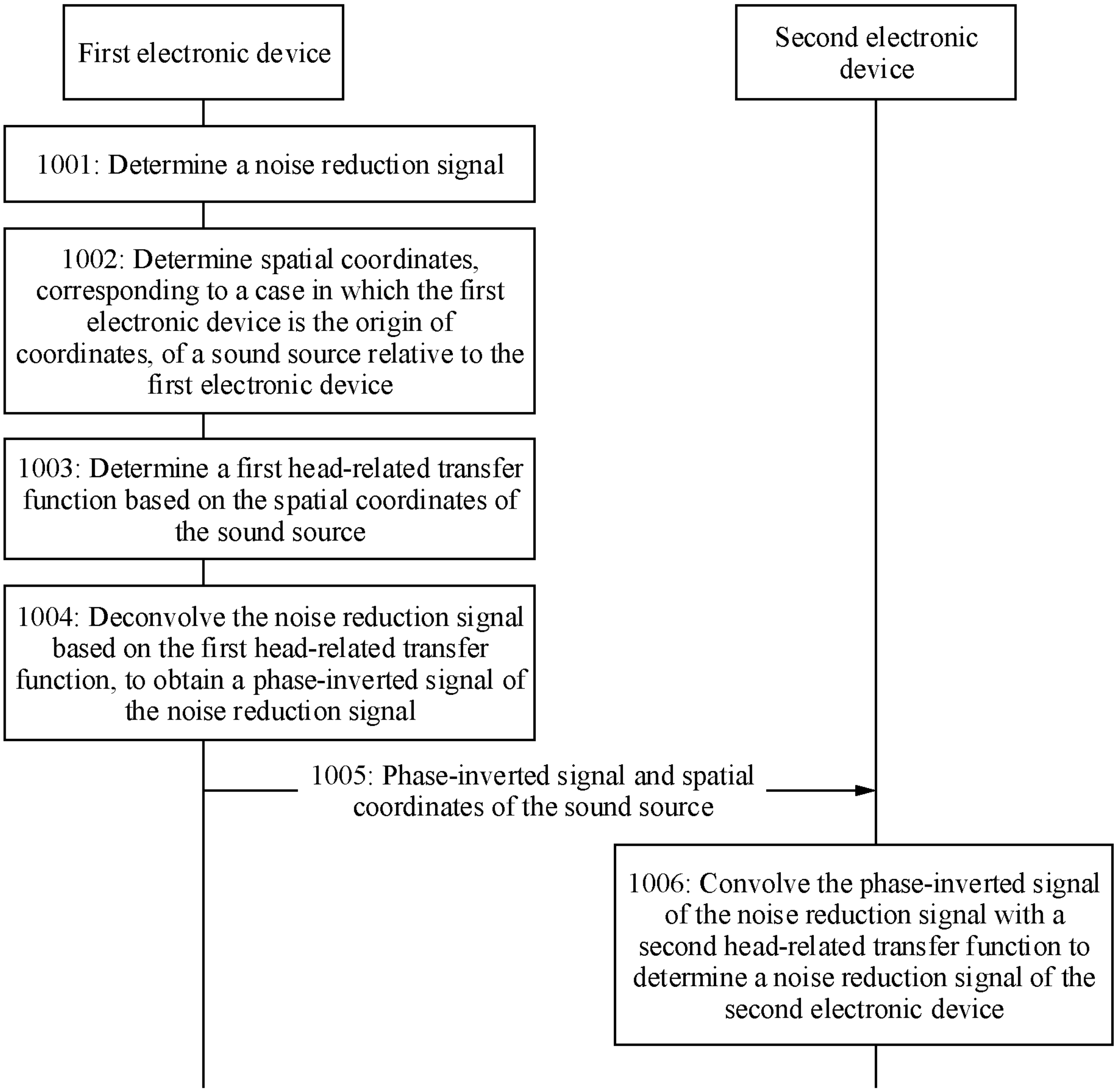
FIG. 10 is a schematic flowchart of another audio signal processing method according to this disclosure.

FIG. 10 is a schematic flowchart of an audio signal processing method provided in this disclosure.

As shown in FIG. 10, the audio signal processing method provided in this disclosure may include the following steps.

1001: A first electronic device determines a noise reduction signal.

In a specific implementation, the first electronic device may determine the noise reduction signal with reference to the manner in which the electronic device determines the noise reduction signal in the embodiment corresponding to FIG. 5.

In a specific implementation, the first electronic device may determine the noise reduction signal with reference to the manner in which the electronic device determines the noise reduction signal in the embodiment corresponding to FIG. 8.

In a specific implementation, the first electronic device may determine the noise reduction signal with reference to the manner in which the electronic device determines the noise reduction signal in the embodiment corresponding to FIG. 9.

1002: The first electronic device determines spatial coordinates, corresponding to a case in which the first electronic device is the origin of coordinates, of a sound source relative to the first electronic device.

Based on coordinates $S=(x_s, y_s, z_s)$ of the sound source sent by a signal processing apparatus and coordinates $(x_d, y_d, z_d)$ of the first electronic device, the first electronic device calculates coordinates $s'=(x'_s, y'_s, z'_s)$ of the sound source relative to the first electronic device, that is, the coordinates, corresponding to a case in which the first electronic device is used as the origin of the coordinates (0, 0, 0), of the sound source relative to the first electronic device. A method is as follows:

$$x_s' = x_s - x_d$$

$$y_s' = y_s - y_d$$

$$y_s' = y_s - y_d.$$

In a specific implementation, when the first electronic device receives spatial coordinates of a plurality of sound sources sent by a plurality of topology nodes, the first electronic device may calculate an arithmetic average value of the received spatial coordinates of the plurality of sound sources, to obtain the coordinates $\overline{s'}=(\overline{x_s'}, \overline{y_s'}, \overline{z_s'})$ of the sound sources.

1003: The first electronic device determines a first head-related transfer function (head-related transfer function, HRTF) based on the spatial coordinates of the sound source.

The first electronic device prestores a correspondence between an HRTF and the spatial coordinates of the sound source.

1004: The first electronic device deconvolves the noise reduction signal based on the first HRTF, to obtain a phase-inverted signal of the noise reduction signal.

The first electronic device deconvolves the obtained noise reduction signal based on an HRTF corresponding to the first electronic device, to obtain a phase-inverted signal of the noise source. Because the HRTF function is a frequency domain function, actual convolution and deconvolution processing are both based on a time-domain corresponding head-related impulse response (head related impulse response, HRIR). A method is as follows:

Based on the coordinates $\overline{s'}=(\overline{x_s'}, \overline{y_s'}, \overline{z_s'})$ of the sound source, an HRIR database of the first electronic device is searched for an HRIR function ha(n), corresponding to the position, of the first electronic device.

A phase-inverted signal $p3_r^A(n)$ of the first electronic device is deconvolved based on ha(n), to obtain a phase-inverted signal s_p3(n) of a noise signal.

1005: The first electronic device sends the phase-inverted signal of the noise reduction signal and the spatial coordinates of the sound source to a second electronic device.

1006: The second electronic device convolves the phase-inverted signal of the noise reduction signal with a second HRTF to determine a noise reduction signal of the second electronic device.

Based on the coordinates $\overline{s'}=(\overline{x_s'}, \overline{y_s'}, \overline{z_s'})$ of the sound source, a database of the second electronic device is searched for an HRIR function hb(n), corresponding to the position, of the second electronic device.

The signal s_p3(n) is convolved with hb(n) to obtain a signal $p3_r^B(n)$.

$p3_r^B(n)$ is a phase-inverted signal on a side of the second electronic device, and the phase-inverted signal herein is the noise reduction signal on the side of the second electronic device.

If signals are from a plurality of topology nodes, processing is performed by each of the topology nodes, and then arithmetic average values are obtained and added.

The second HRTF is determined by the second electronic device based on the spatial coordinates of the sound source, and the second electronic device prestores a correspondence between the HRTF and the spatial coordinates of the sound source.

In this disclosure, the first electronic device and the second electronic device may respectively represent left and right earphones of a headset.

In the embodiment corresponding to FIG. 10, the noise reduction signal of the second electronic device is obtained according to a time domain method. In a specific implementation, the noise reduction signal of the second electronic device may alternatively be obtained according to a frequency domain method. Specific descriptions are as follows:

In a specific implementation, the signal $p3_r^A(n)$ of the first electronic device is transformed to a frequency domain, to obtain $p3_r^A(\omega)$.

Based on the coordinates $\overline{s'}=(\overline{x_s'}, \overline{y_s'}, \overline{z_s'})$ of the sound source, the HRIR database of the first electronic device is searched for an HRIR function $H_A(\omega)$, corresponding to the position, of the first electronic device.

The phase-inverted signal $p3_r^A(n)$ of the first electronic device is divided by $H_A(\omega)$ to obtain a frequency domain form S_P3(ω) of the phase-inverted signal of the noise signal.

S_P3(ω) is multiplied by an HRTF function $H_B(M)$ of the second electronic device, and an obtained signal is transformed to a time domain, to obtain a noise reduction signal on the side of the second electronic device.

Based on the coordinates$\overline{s'}=(\overline{x_s'}, \overline{y_s'}, \overline{z_s'})$ of the sound source, the database of the second electronic device is searched for an HRTF function $H_B(\omega)$, corresponding to the position, of the second electronic device.

The signal S_P3(ω) is multiplied by $H_B(\omega)$, to obtain a signal $P3_r^B(\omega)$.

The signal $P3_r^B(\omega)$ is inversely transformed to a time domain to obtain the signal $p3_r^B(n)$.

$p3_r^B(n)$ is the phase-inverted signal of the second electronic device, and the phase-inverted signal is the noise reduction signal on the side of the second electronic device.

In a specific implementation, if the first electronic device and the second electronic device respectively correspond to left and right earphones of a headset, because a calculation amount required by the first electronic device is large, a side with a higher battery level on the left and right earphones of the headset may be used as the first electronic device.

In a specific implementation, the second electronic device may adjust the signal $p3_r^B(n)$. An adjustment method may be understood with reference to step 508 in the embodiment corresponding to FIG. 5. That is, an error sensor is deployed on a side B to collect an error signal e(n). $p3_r^B(n)$ is used as a reference signal x(n), and then a final phase-inverted signal on the side B is calculated according to the FxLMS algorithm.

An embodiment of this disclosure further provides a voice enhancement method. The method may be used in combination with the foregoing embodiments corresponding to FIG. 5, FIG. 8, FIG. 9, and FIG. 10. The following describes the voice enhancement method provided in this embodiment of this disclosure.

Figure 11:
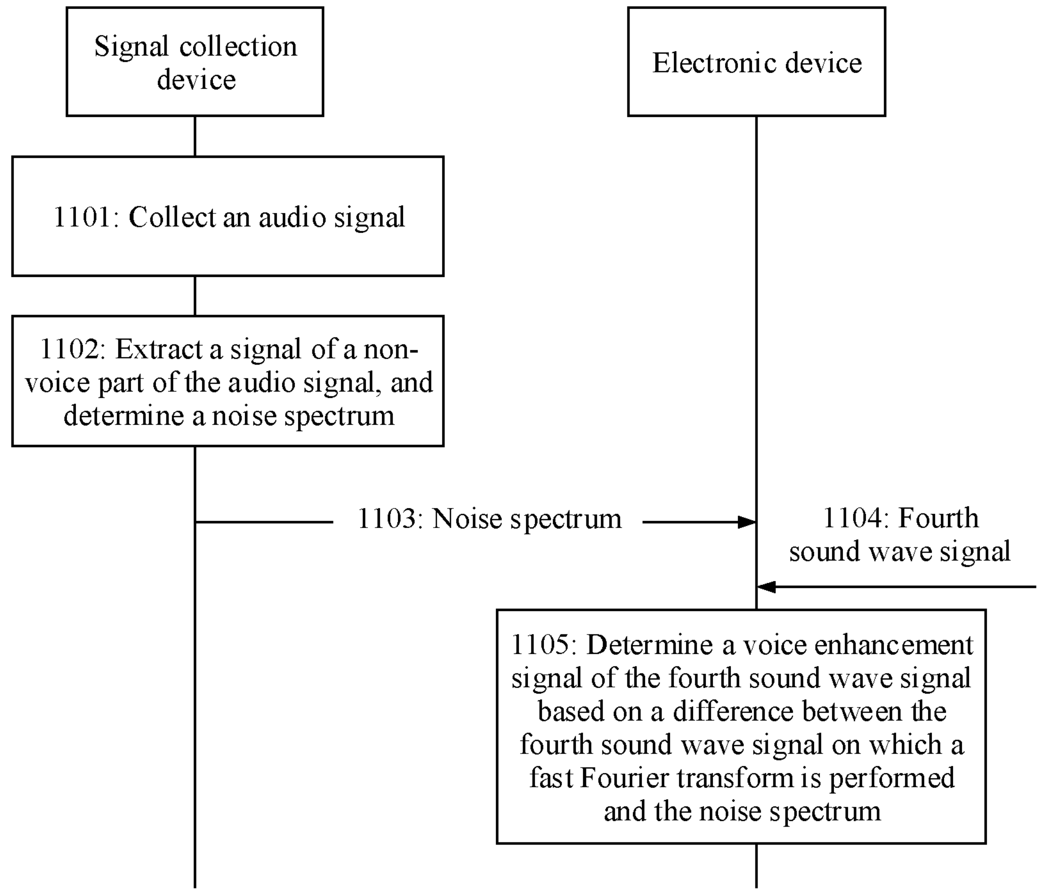
FIG. 11 is a schematic flowchart of another audio signal processing method according to this disclosure.

FIG. 11 is a schematic flowchart of an audio signal processing method provided in this disclosure.

As shown in FIG. 11, the audio signal processing method provided in this disclosure may include the following steps.

1101: A signal processing apparatus collects an audio signal.

The signal processing apparatus receives a third sound wave signal by using a microphone or a microphone array. The microphone or the microphone array may convert the received sound wave signal to an audio signal.

1102: The signal processing apparatus extracts a signal of a non-voice part of the audio signal, and determines a noise spectrum.

Voice activity detection (voice activity detection, VAD) is performed on the audio signal to extract the signal of the non-voice part of the audio signal. It is assumed that the extracted signal of the non-voice part is x1_n(n). In this case, the signal processing apparatus performs a fast Fourier transform (fast Fourier transform, FFT) on x1_n(n) to obtain X1_N(ω), that is, the noise spectrum.

1103: The signal processing apparatus sends the noise spectrum to an electronic device through an electromagnetic wave.

1104: The electronic device receives a fourth sound wave signal.

1105: The electronic device determines a voice enhancement signal of the fourth sound wave signal based on a difference between the fourth sound wave signal on which the FFT is performed and the noise spectrum.

In a specific implementation, if the electronic device receives a plurality of noise spectrums sent by a plurality of signal processing apparatuses, the electronic device determines an arithmetic average value of the received plurality of noise spectrums to obtain a noise spectrum X3_N(ω).

In a specific implementation, the electronic device may determine the noise spectrum based on all obtained noise spectrums, including those calculated by the electronic device (that is, an electronic device 3 also calculates a local noise spectrum X3_N(ω) of the electronic device 3 in the manner in step 1102). In a specific implementation, different weights may be further set for noise spectrums determined by different devices (the signal processing apparatus and the electronic device), to obtain the noise spectrum X3_N(ω). For example, a weight for a noise spectrum calculated by the electronic device is greater, for example, 0.5, and a weight for a noise spectrum calculated by another device is 0.25. An expression may be as follows:

$$X3\_N(\omega)=0.5\cdot X3\_N(\omega)+0.25\cdot X1\_N(\omega)+0.25\cdot X2\_N(\omega).$$

An FFT is performed on an audio signal collected by a topology node 3 to obtain X3(ω), and then the noise spectrum X3_N(ω) is subtracted from X3(ω) to obtain a signal spectrum Y3(ω) of a pure voice:

$$Y3(\omega)=X3(\omega)-X3\_N(\omega).$$

Then, an inverse fast Fourier transform (inverse fast Fourier transform, IFFT) is performed on Y3(ω) to obtain y3(n), that is, a voice enhanced signal.

It can be learned from the embodiment corresponding to FIG. 11 that the plurality of signal processing apparatuses determine the noise spectrum, so that features of the noise spectrum are more comprehensive, and a voice enhancement effect is more stable.

The foregoing mainly describes the solutions provided in embodiments of this disclosure from a perspective of interaction between the electronic device and the signal processing apparatus. It may be understood that, to implement the foregoing functions, the electronic device and the signal processing apparatus include corresponding hardware structures and/or software modules for performing the functions. A person skilled in the art should be easily aware that, with reference to modules and algorithm steps in examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

From a perspective of a hardware structure, the signal processing apparatus and the electronic device in FIG. 5 to FIG. 11 may be implemented by one physical device, may be jointly implemented by a plurality of physical devices, or may be a logical function module in a physical device. This is not specifically limited in embodiments of this disclosure.

Figure 12:
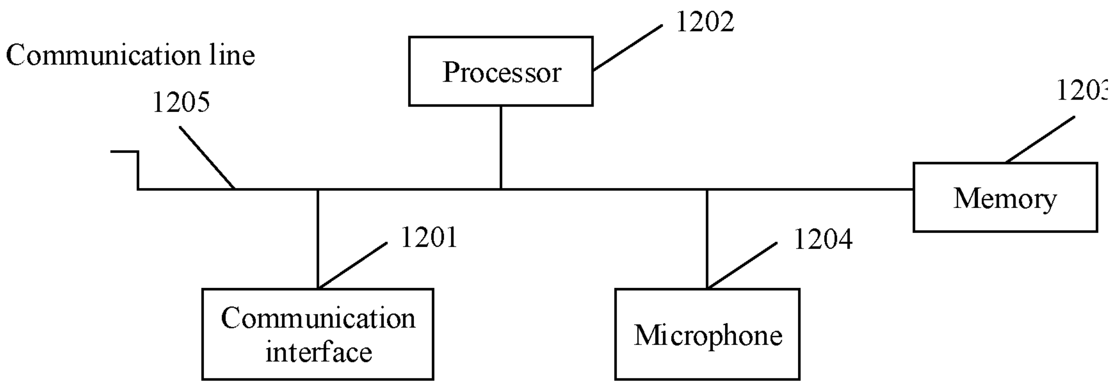
FIG. 12 is a schematic diagram of a structure of a signal processing apparatus according to this disclosure.

For example, the signal processing apparatus may be implemented by a device in FIG. 12. FIG. 12 is a schematic diagram of a hardware structure of a signal processing apparatus according to an embodiment of this disclosure. The signal processing apparatus includes a communication interface 1201 and a processor 1202, and may further include a memory 1203 and a microphone 1204.

The communication interface 1201 may be any apparatus such as a transceiver, and is configured to communicate with another device or a communication network, for example, the Ethernet, a radio access network (radio access network, RAN), or a wireless local area network (wireless local area network, WLAN).

The processor 1202 includes but is not limited to one or more of a central processing unit (central processing unit, CPU), a network processor (network processor, NP), an application-specific integrated circuit (application-specific integrated circuit, ASIC), or a programmable logic device (programmable logic device, PLD). The PLD may be a complex programmable logic device (complex programmable logic device, CPLD), a field-programmable logic gate array (field-programmable gate array, FPGA), generic array logic (generic array logic, GAL), or any combination thereof. The processor 1202 is responsible for a communication line 1205 and general processing; and may further provide various functions, including timing, peripheral interfacing, voltage regulation, power management, and another control function. The memory 1203 may be configured to store data used by the processor 1202 when the processor 1202 performs an operation.

The memory 1203 may be a read-only memory (read-only memory, ROM) or another type of static storage device that can store static information and instructions, a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor 1202 through the communication line 1205. Alternatively, the memory 1203 may be integrated with the processor 1202. If the memory 1203 and the processor 1202 are mutually independent components, the memory 1203 is connected to the processor 1202. For example, the memory 1203 and the processor 1202 may communicate with each other through the communication line. The communication interface 1201 and the processor 1202 may communicate with each other through a communication line, and the communication interface 1201 may alternatively be connected to the processor 1202 directly.

The microphone 1204 should be understood in a broad sense, and the microphone 1204 should also be understood as including a microphone array. The microphone may alternatively be a mic or a micro-speaker. The microphone is an energy conversion device that converts a sound signal to an electrical signal. Types of microphones include but are not limited to capacitive microphones, crystal microphones, carbon microphones, and dynamic microphones.

The communication line 1205 may include any quantity of interconnected buses and bridges, and the communication line 1205 links together various circuits including one or more processors 1202 represented by the processor 1202 and a memory represented by the memory 1203. The communication line 1205 may further link various other circuits such as a peripheral device, a voltage stabilizer, and a power management circuit. These are well known in the art, and therefore are not further described in this disclosure.

In a specific implementation, the signal processing apparatus may include:

a microphone, configured to receive a first sound wave signal.

The signal processing apparatus may further include a memory, configured to store computer-readable instructions. The signal processing apparatus may further include a processor that is coupled to the memory and that is configured to execute the computer-readable instructions in the memory to perform the following operation:

processing the first sound wave signal based on first information to obtain a first audio signal, where the first information includes position information of an electronic device relative to the signal processing apparatus.

The signal processing apparatus may further include a communication interface that is coupled to the processor and that is configured to send the first audio signal to the electronic device through an electromagnetic wave. The first audio signal is used by the electronic device to determine a noise reduction signal, the noise reduction signal is for performing noise reduction processing on a second sound wave signal received by the electronic device, and the second sound wave signal and the first sound wave signal are in a same sound field.

In a specific implementation, the processor is specifically configured to perform transfer adjustment on the first sound wave signal based on the first information.

In a specific implementation, the processor is further configured to determine a first time point. The first time point is a time point at which the signal processing apparatus receives the first sound wave signal. The communication interface is further configured to send the first time point and the first information to the electronic device. The first time point and the first information are used by the electronic device to determine, based on a speed of sound, to play the noise reduction signal.

In a specific implementation, the processor is further configured to: determine a first time point, where the first time point is a time point at which the signal processing apparatus receives the first sound wave signal; perform transfer adjustment on the first sound wave signal based on the first information; and determine, based on a difference between first duration and second duration, a time point for sending the first audio signal, where the first duration is determined by the signal processing apparatus based on the first information and the speed of sound, the second duration is a difference between a second time point and the first time point, and the second time point is a time point that is determined by the signal processing apparatus and at which the electronic device receives the first audio signal.

In a specific implementation, the processor is specifically configured to: when the first duration is greater than the second duration, send the first audio signal to the electronic device.

In a specific implementation, the processor is specifically configured to perform transfer processing on the first sound wave signal based on the first information and second information. The second information is position information of a sound source relative to the signal processing apparatus.

In a specific implementation, the processor is further configured to: determine a first time point. The first time point is a time point at which the signal processing apparatus receives the first sound wave signal. The communication interface is further configured to send the first time point, the first information, and the second information to the electronic device. The first time point, the first information, and the second information are used by the electronic device to determine, based on the speed of sound, to play the noise reduction signal.

In a specific implementation, the processor is further configured to: determine a first time point, where the first time point is a time point at which the signal processing apparatus receives the first sound wave signal; determine a first distance and a second distance based on the first information and second information, where the first distance is a distance between a sound source and the electronic device, the second distance is a distance between the sound source and the signal processing apparatus, and the second information is position information of the sound source relative to the signal processing apparatus; perform transfer adjustment on the first sound wave signal based on a difference between the first distance and the second distance; and process the first audio signal based on a difference between third duration and second duration, to determine a time point for sending the first audio signal, where the third duration is a ratio of the difference between the first distance and the second distance to the speed of sound, the second duration is a difference between a second time point and the first time point, and the second time point is a time point that is determined by the signal processing apparatus and at which the electronic device receives the first audio signal.

In a specific implementation, the communication interface is specifically configured to: when the third duration is greater than the second duration, send, by the signal processing apparatus, the first audio signal to the electronic device through an electromagnetic wave.

In a specific implementation, the processor is further configured to determine a first time point. The first time point is a time point at which the signal processing apparatus receives the first sound wave signal. The communication interface is further configured to send the first time point to the electronic device. The first time point is used by the electronic device to determine to play the noise reduction signal.

In a specific implementation, the processor is further configured to: obtain a first topological relationship between the signal processing apparatus and the electronic device, and determine the first information based on the first topological relationship, where the first information is a distance between the electronic device and the signal processing apparatus, or the first information is coordinates of the electronic device and the signal processing apparatus in a same coordinate system.

In a specific implementation, the memory prestores the first information, and the first information is a distance between the electronic device and the signal processing apparatus.

In a specific implementation, the processor is further configured to: obtain a second topological relationship among the signal processing apparatus, a sound source, and the electronic device; and determine the second information based on the second topological relationship.

In a specific implementation, the memory prestores the second information.

In a specific implementation, the processor is further configured to determine a phase-inverted signal of the first sound wave signal.

The processor is specifically configured to process the phase-inverted signal of the first sound wave signal based on the first information.

In a specific implementation, the processor is further configured to: recognize the first sound wave signal, and determine that the first sound wave signal comes from N sound sources, where N is a positive integer greater than 1; divide the first sound wave signal into N signals based on the N sound sources; and process the first sound wave signal based on the first information to obtain N first audio signals.

In a specific implementation, the microphone is further configured to receive a third sound wave signal. The processor is further configured to: extract a signal of a non-voice part from the third sound wave signal; and determine a noise spectrum of the third sound wave signal based on the signal of the non-voice part. The communication interface is further configured to send the noise spectrum to the electronic device through an electromagnetic wave, so that the electronic device determines a voice enhancement signal of a fourth sound wave signal based on the noise spectrum and the fourth sound wave signal. The fourth sound wave signal and the third sound wave signal are in a same sound field.

In a specific implementation, the signal processing apparatus may include:

a microphone, configured to: receive at least one sound wave signal, and convert the at least one sound wave signal to at least one audio signal.

The signal processing apparatus may further include a memory, configured to store computer-readable instructions. The signal processing apparatus may further include a processor that is coupled to the memory and that is configured to execute the computer-readable instructions in the memory to perform the following operations:

determining position information related to the at least one sound wave signal; and determining a sending time point of the at least one audio signal based on the position information and the first time point. The first time point is a time point at which the receiving unit receives at least one sound wave signal.

The signal processing apparatus may further include a communication interface that is coupled to the processor and configured to send the at least one audio signal through the electromagnetic wave.

In a specific implementation, the processor is further configured to perform phase inversion processing on the at least one audio signal. The communication interface is specifically configured to send, through an electromagnetic wave, the at least one audio signal on which phase inversion processing is performed.

In a specific implementation, the processor is further configured to: determine a first distance and a second distance based on position information, where the first distance is a distance between a sound source of the at least one sound wave signal and the electronic device, and the second distance is a distance between the sound source of the at least one sound wave signal and the signal processing apparatus; and perform transfer adjustment on the at least one sound wave signal based on a difference between the first distance and the second distance, to determine a signal feature of the at least one audio signal, where the signal feature includes an amplitude feature. The communication interface is specifically configured to send the at least one audio signal to the electronic device at the sending time point through the electromagnetic wave.

In a specific implementation, the processor is specifically configured to determine, based on a difference between first duration and second duration, a time point for sending the at least one audio signal, so that the at least one audio signal and the at least one sound wave signal arrive at the electronic device synchronously. The first duration is a ratio of the difference between the first distance and the second distance to the speed of sound, the second duration is a difference between a second time point and the first time point, and the second time point is a time point that is determined by the signal processing apparatus and at which the electronic device receives the audio signal.

In a specific implementation, the processor is specifically configured to: when the first duration is greater than the second duration, determine, based on the difference between the first duration and the second duration, the time point for sending the at least one audio signal.

Figure 13:
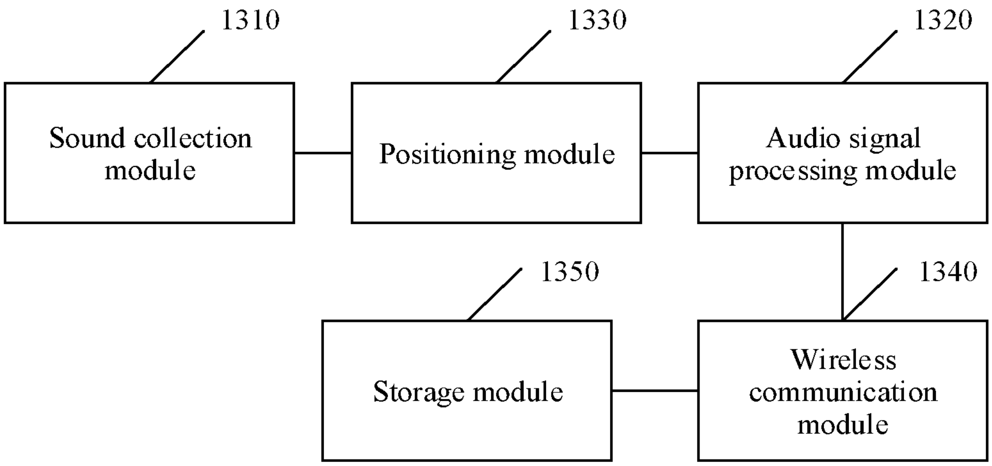
FIG. 13 is a schematic diagram of a structure of another signal processing apparatus according to this disclosure.

In this embodiment of this disclosure, the communication interface may be considered as a signal receiving module, a signal sending module, or a wireless communication module of the signal processing apparatus, the processor having a processing function may be considered as an audio signal processing module/unit and a positioning module/unit of the signal processing apparatus, the memory may be considered as a storage module/unit of the signal processing apparatus, and the microphone may be considered as a sound collection module of the signal processing apparatus or another signal receiving module/unit. For example, as shown in FIG. 13, the signal processing apparatus includes a sound collection module 1310, an audio signal processing module 1320, a positioning module 1330, a wireless communication module 1340, and a storage module 1350. The wireless communication module may also be referred to as a transceiver, a transceiver machine, a transceiver apparatus, or the like. The audio signal processing module may also be referred to as a processor, a processing board, a processing module, a processing apparatus, or the like. Optionally, a component that is in the wireless communication module 1340 and that is configured to implement a receiving function may be considered as a receiving unit, and a component that is in the wireless communication module 1340 and that is configured to implement a sending function may be considered as a sending unit. In other words, the wireless communication module 1340 includes a receiving unit and a sending unit. The wireless communication module sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmission circuit, or the like.

In a specific implementation, the sound collection module 1310 is configured to perform the sound wave signal receiving operation on the side of the signal processing apparatus in step 501 in FIG. 5, and/or the sound collection module 1310 is further configured to perform other audio signal collection steps on the side of the signal processing apparatus in the embodiment corresponding to FIG. 5. The audio signal processing module 1320 is configured to perform steps 502, 503, and 504 in FIG. 5, and/or the audio signal processing module 1320 is further configured to perform other processing steps on the side of the signal processing apparatus in the embodiment corresponding to FIG. 5. The wireless communication module 1340 is configured to perform step 505 in FIG. 5, and/or the wireless communication module 1340 is further configured to perform other sending steps on the side of the signal processing apparatus in the embodiment corresponding to FIG. 5.

In a specific implementation, the sound collection module 1310 is configured to perform the sound wave signal receiving operation on the side of the signal processing apparatus in step 801 in FIG. 8, and/or the sound collection module 1310 is further configured to perform other audio signal collection steps on the side of the signal processing apparatus in the embodiment corresponding to FIG. 8. The audio signal processing module 1320 is configured to perform steps 802, 803, and 804 in FIG. 8, and/or the audio signal processing module 1320 is further configured to perform other processing steps on the side of the signal processing apparatus in the embodiment corresponding to FIG. 8. The wireless communication module 1340 is configured to perform step 805 in FIG. 8, and/or the wireless communication module 1340 is further configured to perform other sending steps on the side of the signal processing apparatus in the embodiment corresponding to FIG. 8.

In a specific implementation, the sound collection module 1310 is configured to perform the sound wave signal receiving operation on the side of the signal processing apparatus in step 901 in FIG. 9, and/or the sound collection module 1310 is further configured to perform other audio signal collection steps on the side of the signal processing apparatus in the embodiment corresponding to FIG. 9. The audio signal processing module 1320 is configured to perform steps 902 and 903 in FIG. 9, and/or the audio signal processing module 1320 is further configured to perform other processing steps on the side of the signal processing apparatus in the embodiment corresponding to FIG. 9. The wireless communication module 1340 is configured to perform step 904 in FIG. 9, and/or the wireless communication module 1340 is further configured to perform other sending steps on the side of the signal processing apparatus in the embodiment corresponding to FIG. 9.

In a specific implementation, the sound collection module 1310 is configured to perform the sound wave signal receiving operation on the side of the signal processing apparatus in step 1101 in FIG. 11, and/or the sound collection module 1310 is further configured to perform other audio signal collection steps on the side of the signal processing apparatus in the embodiment corresponding to FIG. 11. The audio signal processing module 1320 is configured to perform step 1102 in FIG. 11, and/or the audio signal processing module 1320 is further configured to perform other processing steps on the side of the signal processing apparatus in the embodiment corresponding to FIG. 11. The wireless communication module 1340 is configured to perform step 1103 in FIG. 11, and/or the wireless communication module 1340 is further configured to perform other sending steps on the side of the signal processing apparatus in the embodiment corresponding to FIG. 11.

Figure 14:
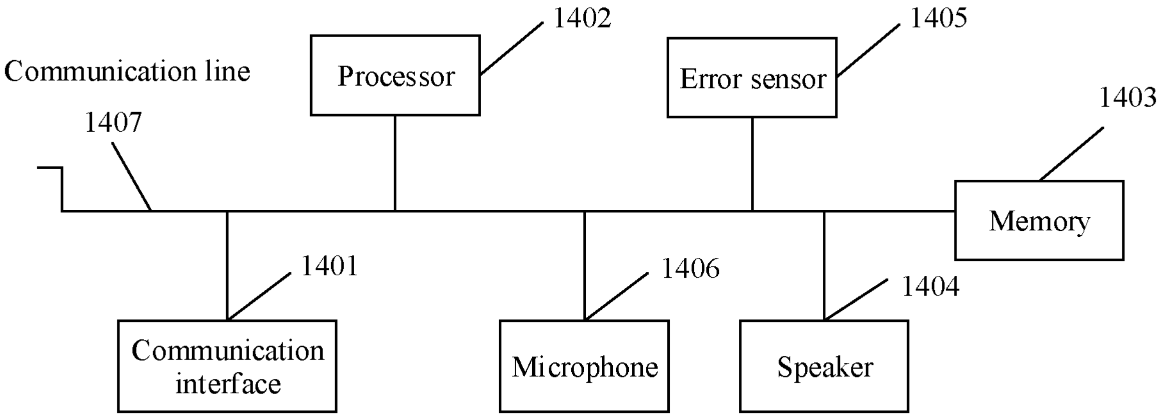
FIG. 14 is a schematic diagram of a structure of an electronic device according to this disclosure.

In addition, the electronic device may be implemented by a device in FIG. 14. FIG. 14 is a schematic diagram of a hardware structure of an electronic device according to an embodiment of this disclosure. The electronic device includes a communication interface 1401 and a processor 1402; may further include a memory 1403 and a speaker 1404; and may further include an error sensor 1405 and a microphone 1406.

The communication interface 1401 may be any apparatus such as a transceiver, and is configured to communicate with another device or a communication network, for example, the Ethernet, a radio access network (radio access network, RAN), or a wireless local area network (wireless local area network, WLAN).

The processor 1402 includes but is not limited to one or more of a central processing unit (central processing unit, CPU), a network processor (network processor, NP), an application-specific integrated circuit (application-specific integrated circuit, ASIC), or a programmable logic device (programmable logic device, PLD). The PLD may be a complex programmable logic device (complex programmable logic device, CPLD), a field-programmable logic gate array (field-programmable gate array, FPGA), generic array logic (generic array logic, GAL), or any combination thereof. The processor 1402 is responsible for a communication line 1407 and general processing; and may further provide various functions, including timing, peripheral interfacing, voltage regulation, power management, and another control function. The memory 1403 may be configured to store data used by the processor 1402 when the processor 1402 performs an operation.

The memory 1403 may be a read-only memory (read-only memory, ROM) or another type of static storage device that can store static information and instructions, a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited thereto. The memory may exist independently, and is connected to the processor 1402 through the communication line 1407. Alternatively, the memory 1403 may be integrated with the processor 1402. If the memory 1403 and the processor 1402 are mutually independent components, the memory 1403 is connected to the processor 1402. For example, the memory 1403 and the processor 1402 may communicate with each other through the communication line. The communication interface 1401 and the processor 1402 may communicate with each other through a communication line, and the communication interface 1401 may alternatively be connected to the processor 1402 directly.

The microphone 1406 should be understood in a broad sense, and the microphone 1406 should also be understood as including a microphone array. The microphone may alternatively be a mic or a micro-speaker. The microphone is an energy conversion device that converts a sound signal to an electrical signal. Types of microphones include but are not limited to capacitive microphones, crystal microphones, carbon microphones, and dynamic microphones.

The communication line 1407 may include any quantity of interconnected buses and bridges, and the communication line 1407 links together various circuits including one or more processors 1402 represented by the processor 1402 and a memory represented by the memory 1403. The communication line 1407 may further link various other circuits such as a peripheral device, a voltage stabilizer, and a power management circuit. These are well known in the art, and therefore are not further described in this disclosure.

In a specific implementation, the signal processing apparatus may include: a microphone, configured to receive at least one sound wave signal; a communication interface, configured to receive at least one audio signal, a first time point, and first information through an electromagnetic wave, where the at least one audio signal is at least one audio signal obtained by performing digital processing on a received sound wave signal by the signal processing apparatus, the first time point is a time point at which the signal processing apparatus receives the at least one sound wave signal, and the first information is position information related to at least one sound wave signal; and a processor, configured to determine a playing time point of the at least one audio signal based on the first time point and the first information, where the audio signal is for performing noise reduction processing on the at least one sound wave signal.

In a specific implementation, the processor is further configured to perform phase inversion processing on the at least one audio signal.

In a specific implementation, the processor is specifically configured to: determine a first distance and a second distance based on the first information, where the first distance is a distance between a sound source of the at least one sound wave signal and the electronic device, and the second distance is a distance between the sound source of the at least one sound wave signal and the signal processing apparatus; and determine the playing time point of the at least one audio signal based on a difference between first duration and second duration, so that the electronic device plays the audio signal when receiving the at least one sound wave signal. The first duration is a ratio of a difference between the first distance and the second distance to the speed of sound, the second duration is a difference between a second time point and the first time point, and the second time point is a time point at which the at least one audio signal is received.

In a specific implementation, the at least one audio signal includes N audio signals, where N is a positive integer greater than 1. The processor is further configured to calculate an arithmetic average value of M signals for a same sound source, where M is a positive integer not greater than N.

In a specific implementation, the communication interface is further configured to receive a first time point. The first time point is a time point at which the signal processing apparatus receives the first sound wave signal. The processor is specifically configured to process the first audio signal based on the first time point, to determine to play the noise reduction signal by using a speaker.

In a specific implementation, the processor is specifically configured to process the first audio signal based on a difference between first duration and second duration, to determine to play the noise reduction signal. The first duration is determined by a first electronic device based on a ratio of a third distance to the speed of sound, the second duration is a difference between a second time point and the first time point, the second time point is a time point at which the first electronic device receives the first audio signal, and the third distance is a distance between the first electronic device and the signal processing apparatus.

In a specific implementation, the processor is specifically configured to: when the first duration is greater than the second duration, process, by the first electronic device, the first audio signal based on the difference between the first duration and the second duration, to determine to play the noise reduction signal by using a speaker.

In a specific implementation, the processor is specifically configured to process the first audio signal based on a difference between third duration and second duration, to determine to play the noise reduction signal. The third duration is a ratio of a difference between a first distance and a second distance to the speed of sound, the second duration is a difference between a second time point and the first time point, the second time point is a time point at which the first electronic device receives the first audio signal, the first distance is a distance between a sound source and the first electronic device, and the second distance is a distance between the sound source and the signal processing apparatus.

In a specific implementation, the processor is specifically configured to: when the third duration is greater than the second duration, process the first audio signal based on the difference between the third duration and the second duration, to determine to play the noise reduction signal by using a speaker.

In a specific implementation, the communication interface is further configured to receive first information sent by the signal processing apparatus. The processor is further configured to determine the third distance based on the first information.

In a specific implementation, the communication interface is further configured to receive first information and second information that are sent by the signal processing apparatus. The second information includes position information of a sound source relative to the signal processing apparatus. The processor is further configured to determine the first distance and the second distance based on the first information and the second information.

In a specific implementation, there are N first audio signals, where N is a positive integer greater than 1. The processor is specifically configured to: determine, based on the second information, that M first audio signals are signals obtained by processing sound wave signals for a same sound source by the signal processing apparatus, the M first audio signals are any M signals in the N first audio signals, and M is a positive integer; and determine the noise reduction signal based on P first audio signals and an arithmetic average value of the M first audio signals, where P is a positive integer, and the P first audio signals are signals in the M first audio signals other than the M first audio signals.

In a specific implementation, the processor is specifically configured to perform cross-correlation processing on the first audio signal and the second sound wave signal, to determine the noise reduction signal.

In a specific implementation, the processor is specifically configured to determine the noise reduction signal based on the first audio signal, the noise reduction signal, and the second sound wave signal according to a least mean square error algorithm.

In a specific implementation, the processor is further configured to: determine spatial coordinates, corresponding to a case in which the first electronic device is the origin of the coordinates, of a sound source relative to the first electronic device; determine a first head-related transfer function HRTF based on the spatial coordinates of the sound source, where the memory prestores a correspondence between the HRTF and the spatial coordinates of the sound source; and deconvolve the noise reduction signal based on the first HRTF, to obtain a phase-inverted signal of the noise reduction signal.

The communication interface is further configured to send the phase-inverted signal of the noise reduction signal and the spatial coordinates of the sound source to a second electronic device, so that the second electronic device convolves the phase-inverted signal of the noise reduction signal with a second HRTF, to determine a noise reduction signal of the second electronic device. The second HRTF is determined by the second electronic device based on the spatial coordinates of the sound source, and the second electronic device prestores a correspondence between the HRTF and the spatial coordinates of the sound source.

In a specific implementation, the first electronic device and the second electronic device are earphones. The earphones include a left earphone and a right earphone, and an earphone with a higher battery level in the left earphone and the right earphone is the first electronic device.

In a specific implementation, the electronic device includes: a microphone, configured to receive a second sound wave signal; and a communication interface, configured to receive a first audio signal sent by a signal processing apparatus, where the first audio signal is a signal obtained by performing digital processing on the received first sound wave signal by the signal processing apparatus, and the first sound wave signal and the second sound wave signal are in a same sound field. The electronic device may further include a memory, configured to store computer-readable instructions. The electronic device may further include a processor coupled to the memory and configured to execute the computer-readable instruction in the memory to perform the following operations: processing the first audio signal based on first information to obtain a noise reduction signal.

The noise reduction signal is for performing noise reduction processing on the second sound wave signal received by the electronic device, and the first information includes position information of the first electronic device relative to the signal processing apparatus.

In a specific implementation, the communication interface is further configured to receive a first time point. The first time point is a time point at which the signal processing apparatus receives the first sound wave signal. The processor is specifically configured to process the first audio signal based on a difference between first duration and second duration, to determine to play the noise reduction signal. The first duration is determined by the first electronic device based on the first information and the speed of sound, the second duration is a difference between a second time point and the first time point, and the second time point is a time point at which the first electronic device receives the first audio signal.

In a specific implementation, the communication interface is further configured to receive a first time point. The first time point is a time point at which the signal processing apparatus receives the first sound wave signal. The processor is specifically configured to: process the first audio signal based on a difference between first duration and second duration, to determine to play the noise reduction signal, where the first duration is determined by the first electronic device based on the first information and the speed of sound, the second duration is a difference between a second time point and the first time point, and the second time point is a time point at which the first electronic device receives the first audio signal; and adjust the first audio signal based on the first information.

In a specific implementation, the processor is specifically configured to: when the first duration is greater than the second duration, process, by the first electronic device, the first audio signal based on the difference between the first duration and the second duration, to determine to play the noise reduction signal by using a speaker.

In a specific implementation, the communication interface is further configured to receive a first time point. The first time point is a time point at which the signal processing apparatus receives the first sound wave signal. The processor is specifically configured to: determine a first distance and a second distance based on the first information and second information, where the second information is position information of a sound source relative to the signal processing apparatus, the first distance is a distance between the sound source and the first electronic device, and the second distance is a distance between the sound source and the signal processing apparatus; and process the first audio signal based on a difference between third duration and second duration, to determine to play the noise reduction signal by using a speaker, where the third duration is a ratio of a difference between the first distance and the second distance to the speed of sound, the second duration is a difference between a second time point and the first time point, and the second time point is a time point at which the first electronic device receives the first audio signal.

In a specific implementation, the communication interface is further configured to receive a first time point. The first time point is a time point at which the signal processing apparatus receives the first sound wave signal. The processor is specifically configured to: process the first audio signal based on a difference between third duration and second duration, to determine to play the noise reduction signal, where the third duration is a ratio of a difference between a first distance and a second distance to the speed of sound, the second duration is a difference between a second time point and the first time point, the second time point is a time point at which the first electronic device receives the first audio signal, the first distance is a distance between a sound source and the first electronic device, and the second distance is a distance between the sound source and the signal processing apparatus; determine the first distance and the second distance based on the first information and second information, where the first distance is the distance between the sound source and the electronic device, the second distance is the distance between the sound source and the signal processing apparatus, and the second information is position information of the sound source relative to the signal processing apparatus; and perform transfer adjustment on the first audio signal based on the difference between the first distance and the second distance.

In a specific implementation, the processor is specifically configured to: when the third duration is greater than the second duration, process the first audio signal based on the difference between the third duration and the second duration, to determine to play the noise reduction signal by using a speaker.

In a specific implementation, the communication interface is further configured to receive the first information sent by the signal processing apparatus.

In a specific implementation, the communication interface is further configured to receive the second information sent by the signal processing apparatus.

In a specific implementation, there are N first audio signals, where N is a positive integer greater than 1. The processor is specifically configured to: determine, based on the second information, that M first audio signals are signals obtained by processing sound wave signals for a same sound source by the signal processing apparatus, the M first audio signals are any M signals in the N first audio signals, and M is a positive integer; and determine the noise reduction signal based on P first audio signals and an arithmetic average value of the M first audio signals, where P is a positive integer, and the P first audio signals are signals in the M first audio signals other than the M first audio signals.

In a specific implementation, the processor is further configured to determine spatial coordinates, corresponding to a case in which the first electronic device is the origin of the coordinates, of a sound source relative to the first electronic device; determine a first head-related transfer function HRTF based on the spatial coordinates of the sound source, where the first electronic device prestores a correspondence between the HRTF and the spatial coordinates of the sound source; and deconvolve the noise reduction signal based on the first HRTF, to obtain a phase-inverted signal of the noise reduction signal. The communication interface is further configured to send the phase-inverted signal of the noise reduction signal and the spatial coordinates of the sound source to a second electronic device, so that the second electronic device convolves the phase-inverted signal of the noise reduction signal with a second HRTF, to determine a noise reduction signal of the second electronic device. The second HRTF is determined by the second electronic device based on the spatial coordinates of the sound source, and the second electronic device prestores a correspondence between the HRTF and the spatial coordinates of the sound source.

In a specific implementation, the first electronic device and the second electronic device are earphones. The earphones include a left earphone and a right earphone, and an earphone with a higher battery level in the left earphone and the right earphone is the first electronic device.

In a specific implementation, the communication interface is further configured to receive a noise spectrum of a third sound wave signal sent by a signal processing apparatus. The noise spectrum of the third sound wave signal is determined by the signal processing apparatus based on a signal of a non-voice part of the received third sound wave signal. The microphone is further configured to receive a fourth sound wave signal, where the fourth sound wave signal and the third sound wave signal are in a same sound field. The processor is further configured to determine a voice enhancement signal of the fourth sound wave signal based on a difference between the fourth sound wave signal on which a fast Fourier transform FFT is performed and the noise spectrum.

In a specific implementation, there are M noise spectrums of the third sound wave signal, where M is a positive integer greater than 1. The processor is further configured to: determine that any N noise spectrums in the M noise spectrums are noise spectrums determined by the signal processing apparatus for sound wave signals for a same sound source, where N is a positive integer; and determine an arithmetic average value of the N noise spectrums.

Figure 15:
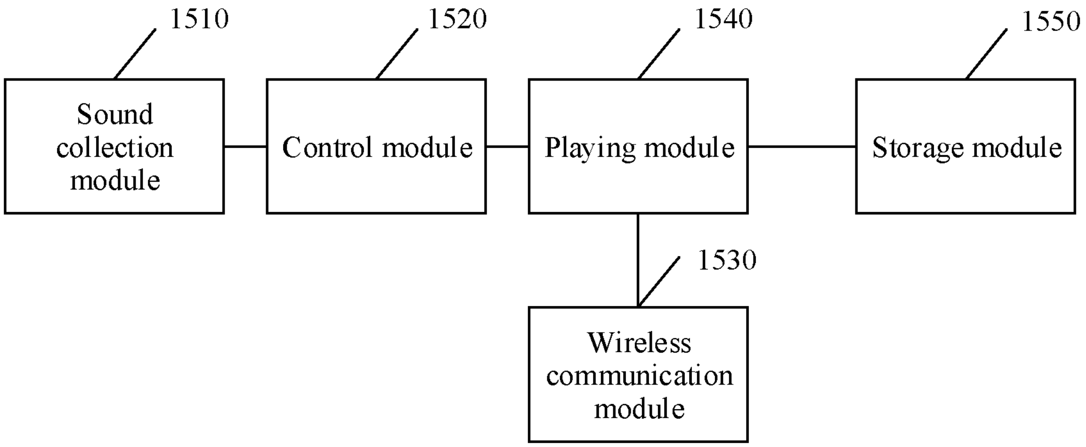
FIG. 15 is a schematic diagram of a structure of another electronic device according to this disclosure.

In this embodiment of this disclosure, the communication interface may be considered as a wireless communication module of the signal processing apparatus or a signal receiving module or a signal sending module of the signal processing apparatus, the processor having a processing function may be considered as a control module or a processing module of the signal processing apparatus, the memory may be considered as a storage module of the signal processing apparatus, the microphone may be considered as a sound collection module of the signal processing apparatus or another signal receiving module of the signal processing apparatus. The speaker may be considered as a playing module of the signal processing apparatus. As shown in FIG. 15, the signal processing apparatus includes a sound collection module 1510, a control module 1520, a wireless communication module 1530, a playing module 1540, and a storage module 1550. The wireless communication module may also be referred to as a transceiver, a transceiver machine, a transceiver apparatus, or the like. The control module may also be referred to as a controller, a control board, a control module, a control apparatus, or the like. Optionally, a component that is in the wireless communication module 1530 and that is configured to implement a receiving function may be considered as a receiving unit, and a component that is in the wireless communication module 1530 and that is configured to implement a sending function may be considered as a sending unit. In other words, the wireless communication module 1530 includes a receiving unit and a sending unit. The wireless communication module sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmission circuit, or the like.

In a specific implementation, the sound collection module 1510 is configured to perform the audio signal collection step on the side of electronic device in the embodiment corresponding to FIG. 5. The control module 1520 is configured to perform steps 506, 507, and 508 in FIG. 5, and/or the control module 1520 is further configured to perform other processing steps on the side of the electronic device in the embodiment corresponding to FIG. 5. The wireless communication module 1530 is configured to perform step 505 in FIG. 5, and/or the wireless communication module 1530 is further configured to perform other sending steps on the side of the electronic device in the embodiment corresponding to FIG. 5. The playing module 1540 is configured to perform step 509 in FIG. 5.

In a specific implementation, the sound collection module 1510 is configured to perform the audio signal collection step on the side of electronic device in the embodiment corresponding to FIG. 8. The control module 1520 is configured to perform steps 806, 807, and 808 in FIG. 8, and/or the control module 1520 is further configured to perform other processing steps on the side of the electronic device in the embodiment corresponding to FIG. 8. The wireless communication module 1530 is configured to perform step 805 in FIG. 8, and/or the wireless communication module 1530 is further configured to perform other sending steps on the side of the electronic device in the embodiment corresponding to FIG. 8. The playing module 1540 is configured to perform step 809 in FIG. 8.

In a specific implementation, the sound collection module 1510 is configured to perform the sound wave signal receiving operation on the side of the electronic device in step 902 in FIG. 9, and/or the sound collection module 1510 is further configured to perform other audio signal collection steps on the side of the electronic device in the embodiment corresponding to FIG. 9. The control module 1520 is configured to perform step 905 in FIG. 9, and/or the control module 1520 is further configured to perform other processing steps on the side of the electronic device in the embodiment corresponding to FIG. 9. The wireless communication module 1530 is configured to perform step 904 in FIG. 9, and/or the wireless communication module 1530 is further configured to perform other sending steps on the side of the electronic device in the embodiment corresponding to FIG. 9. The playing module 1540 is configured to perform step 906 in FIG. 9.

In a specific implementation, when the electronic device is a first electronic device, the sound collection module 1510 is configured to perform the audio signal collection step on the side of the electronic device in the embodiment corresponding to FIG. 10. The control module 1520 is configured to perform steps 1001, 1002, 1003, and 1004 in FIG. 10, and/or the control module 1520 is further configured to perform other processing steps on the side of the electronic device in the embodiment corresponding to FIG. 10. The wireless communication module 1530 is configured to perform step 1005 in FIG. 10, and/or the wireless communication module 1530 is further configured to perform other sending steps on the side of the electronic device in the embodiment corresponding to FIG. 10. When the first electronic device is a second electronic device, the sound collection module 1510 is configured to perform other audio signal collection steps on the side of the electronic device in the embodiment corresponding to FIG. 10. The control module 1520 is configured to perform step 1006 in FIG. 10, and/or the control module 1520 is further configured to perform other processing steps on the side of the electronic device in the embodiment corresponding to FIG. 10. The wireless communication module 1530 is configured to perform step 1005 in FIG. 10, and/or the wireless communication module 1530 is further configured to perform other sending steps on the side of the electronic device in the embodiment corresponding to FIG. 10. The playing module 1540 is configured to perform step 1006 in FIG. 10.

In a specific implementation, the sound collection module 1510 is configured to perform the sound wave signal receiving operation on the side of the electronic device in step

1104 in FIG. 11, and/or the sound collection module 1510 is further configured to perform other audio signal collection steps on the side of the electronic device in the embodiment corresponding to FIG. 11. The control module 1520 is configured to perform step 1105 in FIG. 11, and/or the control module 1520 is further configured to perform other processing steps on the side of the electronic device in the embodiment corresponding to FIG. 11. The wireless communication module 1530 is configured to perform step 1103 in FIG. 11, and/or the wireless communication module 1530 is further configured to perform other sending steps on the side of the electronic device in the embodiment corresponding to FIG. 11. The playing module 1540 is configured to perform step 1105 in FIG. 11.

All or a part of the foregoing embodiments may be implemented by using software, hardware, firmware, or any combination thereof. When software is used to implement embodiments, all or a part of embodiments may be implemented in a form of a computer program product.

The computer program product includes one or more computer instructions. When the computer program instructions are loaded and executed on a computer, all or a part of the procedures or the functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or a part of the steps of the methods in the foregoing embodiments may be implemented by a program instructing related hardware. The program may be stored in a computer-readable storage medium. The storage medium may include a ROM, a RAM, a magnetic disk, an optical disc, or the like.

The audio signal processing method, the signal processing apparatus, the electronic device, the noise reduction system, and the storage medium provided in embodiments of this disclosure are described in detail above. This specification describes principles and implementations of this disclosure by using specific examples. The foregoing embodiments are merely used to help understand the methods and core ideas of this disclosure. In addition, a person of ordinary skill in the art can make variations and modifications to the specific implementations and application scopes according to the ideas of this disclosure. Therefore, this specification shall not be construed as a limitation to this disclosure.

What is claimed is:

1. A signal processing method for performing noise reduction processing, wherein the signal processing method is applied to a signal processing apparatus, the signal processing apparatus preprocesses a sound wave signal and outputs a processed audio signal through an electromagnetic wave, the signal processing method comprising:
- receiving at least one sound wave signal;
- converting the at least one sound wave signal to at least one audio signal;
- determining position information related to the at least one sound wave signal;
- determining a sending time point of the at least one audio signal based on the position information and a first time point, the first time point comprising a receiving time point at which the signal processing apparatus receives the at least one sound wave signal, the determining the sending time point comprising:
  - determining, based on a duration difference between a first duration and a second duration, the sending time point for sending the at least one audio signal so the at least one audio signal and the at least one sound wave signal arrive at an electronic device synchronously, the first duration comprising a ratio of a distance difference between a first distance and a second distance to a speed of sound, the second duration comprising a time difference between a second time point and the first time point, and the second time point comprising a receiving time point at which the electronic device receives the at least one audio signal;
- determining the first distance between a sound source of the at least one sound wave signal and the electronic device and determining the second distance between the sound source of the at least one sound wave signal and the signal processing apparatus;
- performing a transfer adjustment on the at least one sound wave signal based on the distance difference between the first distance and the second distance to determine a signal feature of the at least one audio signal, the signal feature comprising an amplitude feature; and
- sending the at least one audio signal to the electronic device through the electromagnetic wave at the sending time point.

2. The method according to claim 1, further comprising:
- performing phase inversion processing on the at least one audio signal; and
- the sending the at least one audio signal through the electromagnetic wave comprises:
- sending, through the electromagnetic wave, the at least one audio signal on which phase inversion processing is performed.

3. The method according to claim 1, further comprising:
- determining the first distance and the second distance based on the position information.

4. The method according to claim 1, wherein the determining, based on the duration difference between the first duration and the second duration, a sending time point for sending the at least one audio signal comprises:
- when the first duration is greater than the second duration, determining, based on the duration difference between the first duration and the second duration, the sending time point for sending the at least one audio signal.

5. A signal processing method for performing noise reduction processing, the signal processing method is applied to an electronic device, the signal processing method comprising:
- receiving at least one sound wave signal;
- receiving at least one audio signal, a first time point, and first information through an electromagnetic wave from a signal processing apparatus, the first time point comprising a time point at which the signal processing apparatus receives the at least one sound wave signal, and the first information is position information related to the at least one sound wave signal;

determining a playing time point of the at least one audio signal based on the first time point and the first information, the at least one audio signal being provided for performing the noise reduction processing on the at least one sound wave signal, the determining the playing time point comprising:

determining a first distance between a sound source of the at least one sound wave signal and the electronic device, and determining a second distance between the sound source of the at least one sound wave signal and the signal processing apparatus; and determining the playing time point based on a duration difference between a first duration and a second duration so that the electronic device plays the at least one audio signal when synchronously receiving the at least one sound wave signal; and performing a transfer adjustment on the at least one audio signal based on a distance difference between the first distance and the second distance to determine a signal feature of the at least one audio signal, the signal feature comprising an amplitude feature.

6. The method according to claim 5, further comprising: performing phase inversion processing on the at least one audio signal.

7. The method according to claim 5, further comprising determining the first distance and the second distance based on the first information; and the first duration comprising a ratio of the distance difference between the first distance and the second distance to a speed of sound, the second duration is a time difference between a second time point and the first time point, and the second time point is a time point at which the at least one audio signal is received.

8. The method according to claim 5, wherein the at least one audio signal comprises N audio signals, wherein N is a positive integer greater than 1; and the method further comprises:

calculating an arithmetic average value of M signals for a same sound source, wherein M is a positive integer not greater than N.

9. A signal processing apparatus for performing noise reduction processing, the signal processing apparatus comprising:

a microphone configured to receive at least one sound wave signal;

a communication interface;

a memory storing instructions; and at least one processor in communication with the microphone, the communication interface, and the memory, the at least one processor configured, upon execution of the instructions, to perform the following steps:

convert the at least one sound wave signal to at least one audio signal;

determine position information related to the at least one sound wave signal;

determine a sending time point of the at least one audio signal based on the position information and a first time point, the first time point comprising a time point at which the microphone receives the at least one sound wave signal, the determining the sending time point comprising:

determine, based on a difference between a first duration and a second duration, a time point for sending the at least one audio signal so the at least one audio signal and the at least one sound wave signal arrive at an electronic device synchronously, the first duration comprising a ratio of the difference between a first distance and a second distance to a speed of sound, the second duration comprising a difference between a second time point and the first time point, and the second time point comprising a time point at which the electronic device receives the at least one audio signal;

determine the first distance between a sound source of the at least one sound wave signal and the electronic device and determining the second distance between the sound source of the at least one sound wave signal and the signal processing apparatus;

perform a transfer adjustment on the at least one sound wave signal based on a difference between the first distance and the second distance to determine a signal feature of the at least one audio signal, the signal feature comprising an amplitude feature; and send the at least one audio signal to the electronic device through an electromagnetic wave at the sending time point.

10. The signal processing apparatus according to claim 9, wherein the processor is further configured to invoke the program instructions to perform phase inversion processing on the at least one audio signal; and the communication interface is configured to send, through the electromagnetic wave, the at least one audio signal on which the phase inversion processing is performed.

11. The signal processing apparatus according to claim 9, wherein the processor is further configured to invoke the program instructions to:

determine the first distance and the second distance based on the position information.

12. The signal processing apparatus according to claim 9, wherein the processor is further configured to invoke the program instructions to:

when the first duration is greater than the second duration, determine, based on the duration difference between the first duration and the second duration, the sending time point for sending the at least one audio signal.

13. An electronic device for performing noise reduction processing, the electronic device comprising:

a microphone configured to receive at least one sound wave signal;

a communication interface;

a memory storing instructions; and at least one processor in communication with the microphone, the communication interface, and the memory, the at least one processor configured, upon execution of the instructions, to perform the following steps:

receive at least one audio signal, a first time point, and first information through an electromagnetic wave from a signal processing apparatus, the first time point comprising a time point at which the signal processing apparatus receives the at least one sound wave signal, and the first information comprising position information related to the at least one sound wave signal;

determine a playing time point of the at least one audio signal based on the first time point and the first information, the at least one audio signal being provided for performing noise reduction processing on the at least one sound wave signal, the determining the playing time point comprising:

determine a first distance between a sound source of the at least one sound wave signal and the electronic device;

determine a second distance between the sound source of the at least one sound wave signal and the signal processing apparatus; and determine the playing time point based on a duration difference between first duration and second duration so that the electronic device plays the at least one audio signal when synchronously receiving the at least one sound wave signal; and perform a transfer adjustment on the at least one audio signal based on a distance difference between the first distance and the second distance to determine a signal feature of the at least one audio signal, the signal feature comprising an amplitude feature.

14. The electronic device according to claim 13, wherein the processor is further configured to invoke the program instructions to perform phase inversion processing on the at least one audio signal.

15. The electronic device according to claim 13, wherein the processor is further configured to invoke the program instructions to:

determine the first distance and the second distance based on the first information; and the first duration comprising a ratio of the distance difference between the first distance and the second distance to a speed of sound, the second duration is a difference between the first time point and a second time point, and the second time point is a time point at which the at least one audio signal is received.

16. The electronic device according to claim 13, wherein the at least one audio signal comprises N audio signals, wherein N is a positive integer greater than 1; and the processor is further configured to invoke the program instructions to:

calculate an arithmetic average value of M signals for a same sound source, wherein M is a positive integer not greater than N.

* * * * *